(12) United States Patent
Ishikawa et al.

(10) Patent No.: US 6,639,620 B2
(45) Date of Patent: Oct. 28, 2003

(54) LIGHT BEAM SCANNING APPARATUS

(75) Inventors: Daisuke Ishikawa, Tokyo (JP); Koji Tanimoto, Kawasaki (JP); Kenichi Komiya, Kawasaki (JP); Koji Kawai, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 39 days.

(21) Appl. No.: 09/970,990

(22) Filed: Oct. 5, 2001

(65) Prior Publication Data

US 2003/0067530 A1 Apr. 10, 2003

(51) Int. Cl.[7] .................................................. B41J 2/435
(52) U.S. Cl. ........................................ 347/235; 347/250
(58) Field of Search ................................. 347/234, 235, 347/248, 250; 250/214 R, 206.1, 234

(56) References Cited

U.S. PATENT DOCUMENTS 5,451,778 A * 9/1995 Hubble, III et al. ........ 250/234
5,773,816 A * 6/1998 Grodevant ............. 250/214 R

* cited by examiner

Primary Examiner—Hai Pham
(74) Attorney, Agent, or Firm—Foley & Lardner

(57) ABSTRACT

A light beam is scanned in the main scanning direction on a scanned face. The light beam is detected by a pair of sensors arranged on the scanned face or a position equivalent thereto and is converted to an electric signal. A processing circuit having a plurality of operational amplifiers corrects electric signals from the pair of sensors based on a correction signal and integrates a difference between these electric signals. A correction amount of the correction signal is set based on a value integrated by the processing circuit and an offset amount present in the processing circuit.

64 Claims, 42 Drawing Sheets

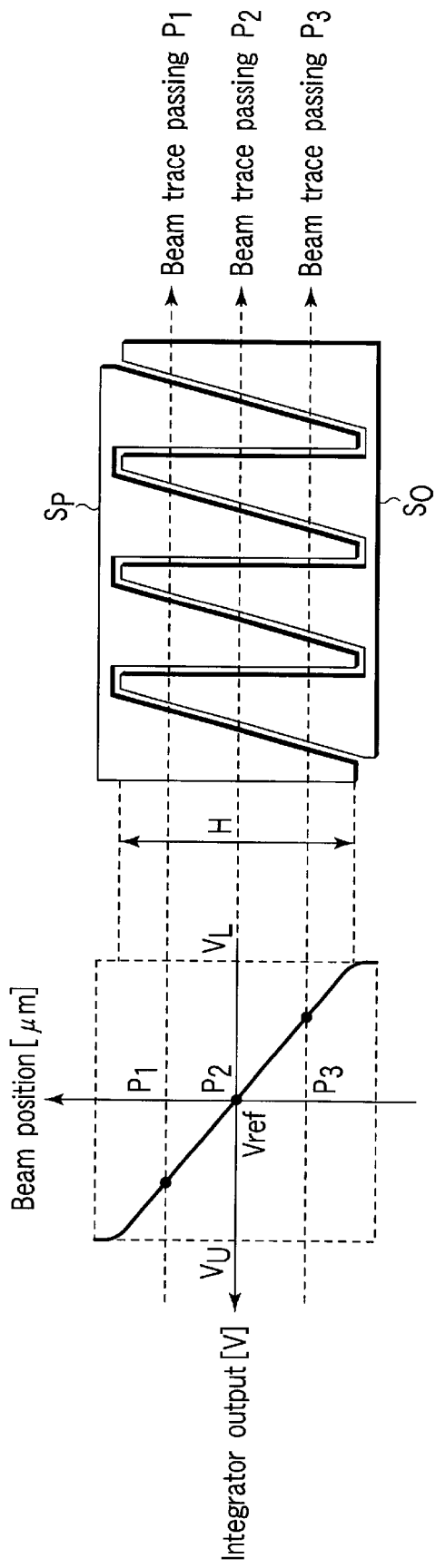
F I G. 10

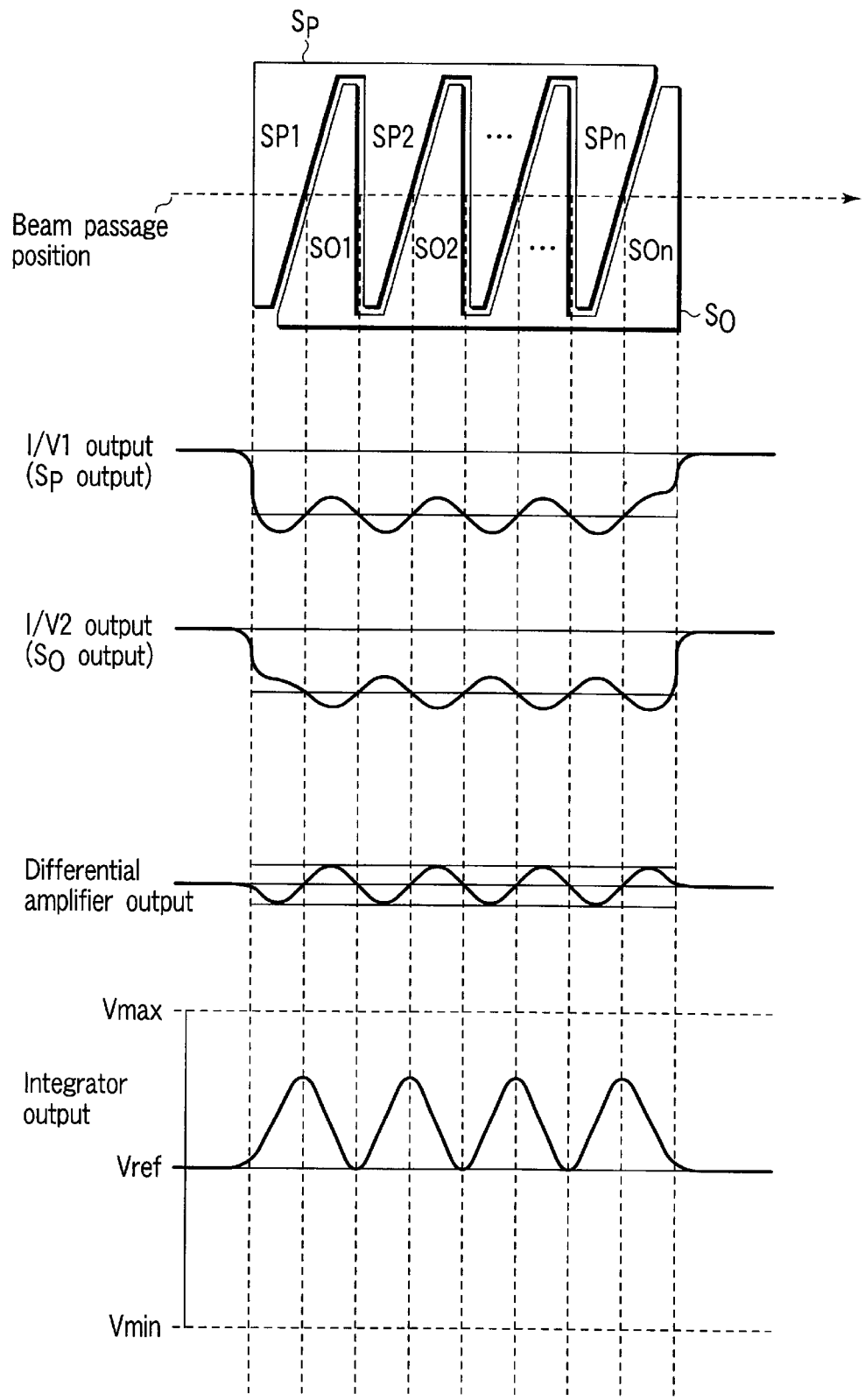
F I G. 14

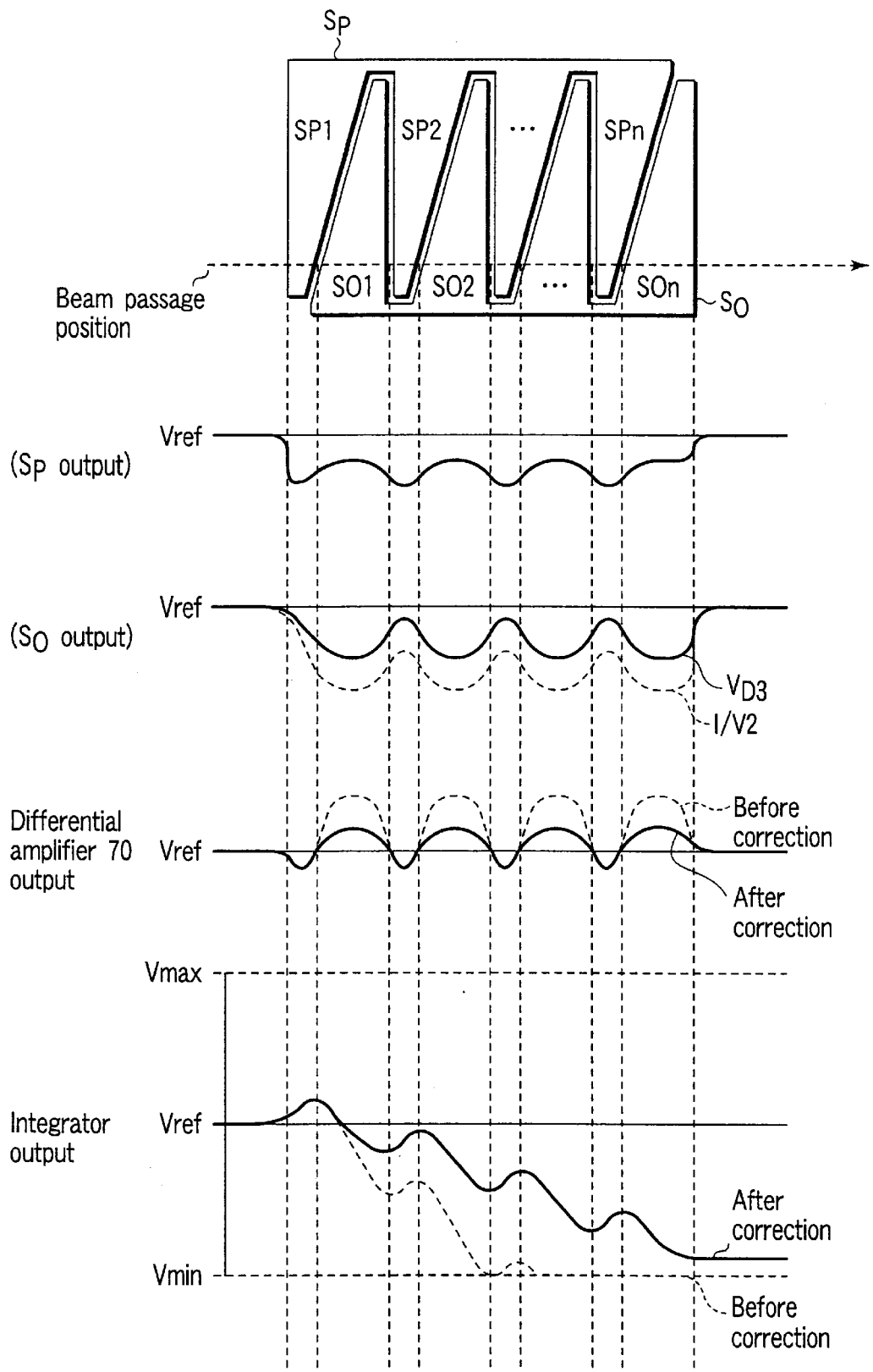
F I G. 16

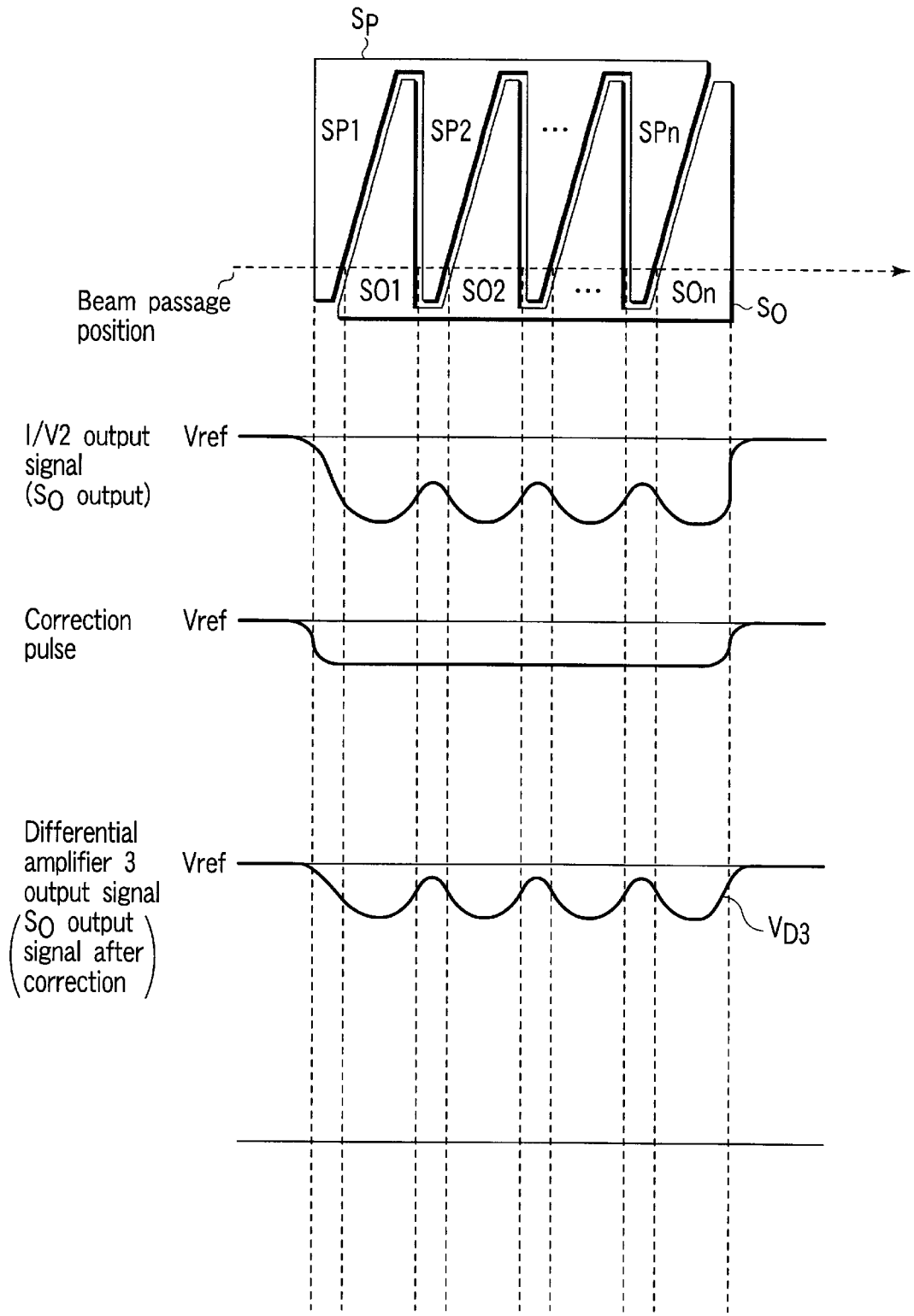
F I G. 17

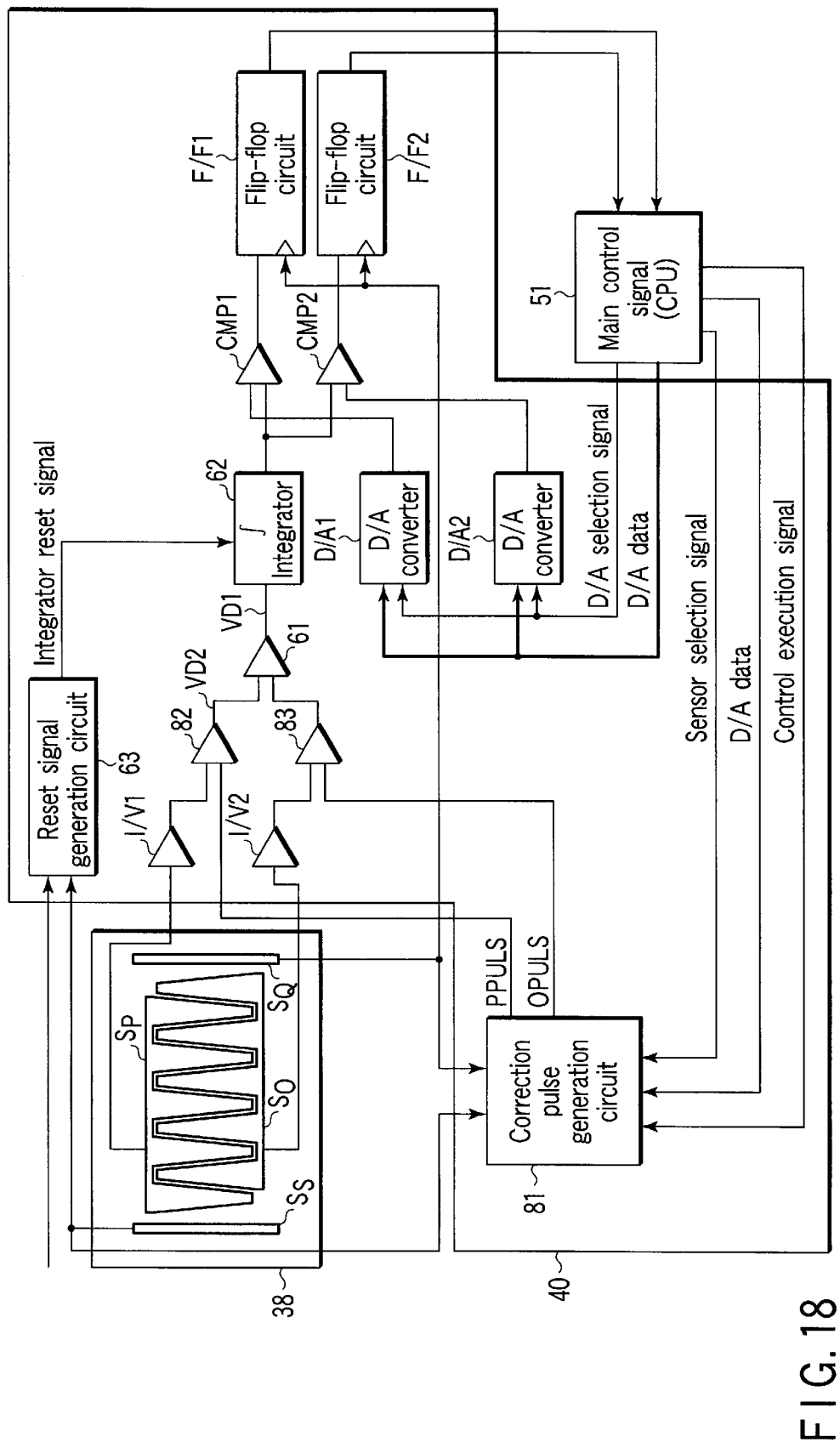
F I G. 18

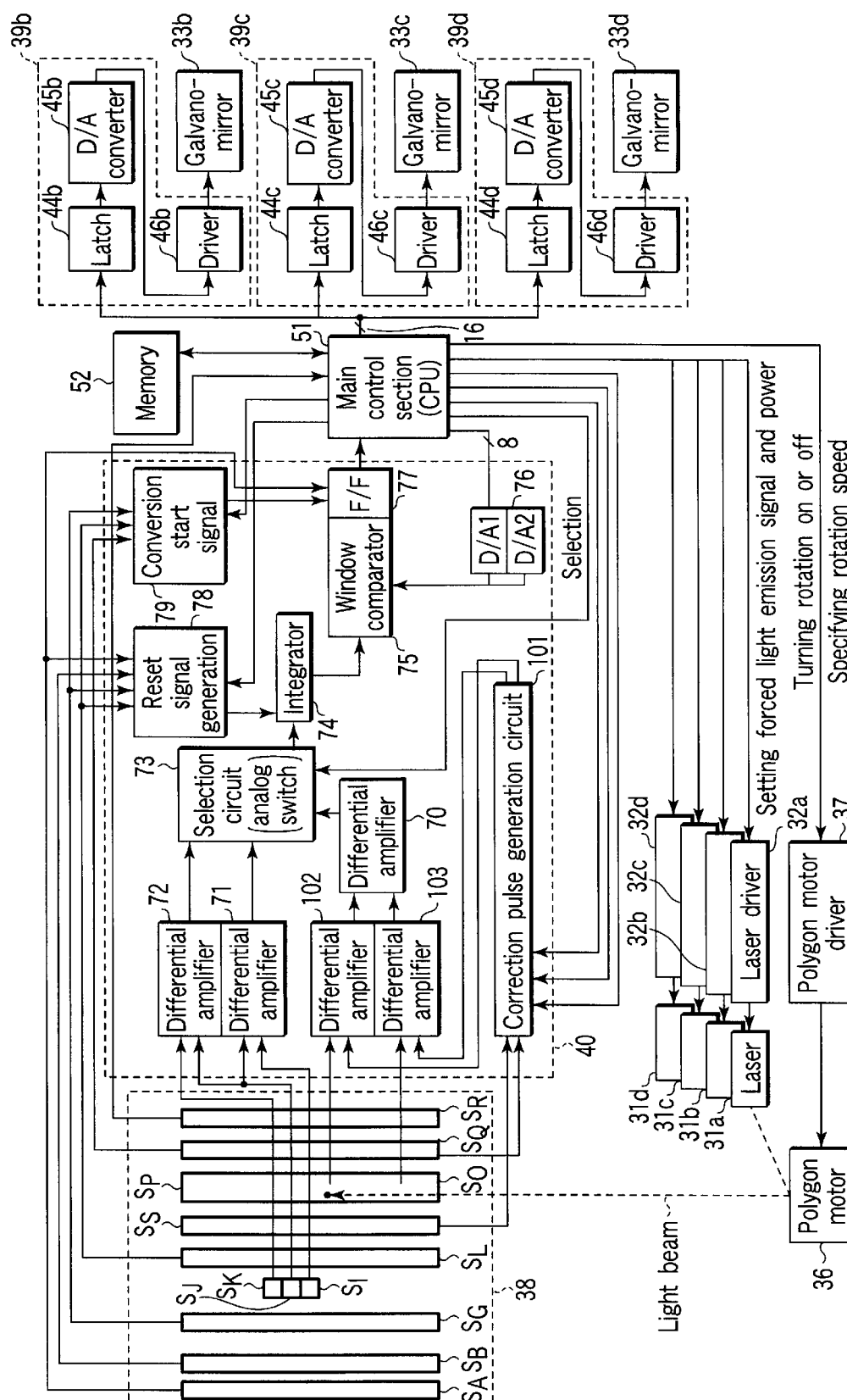
F I G. 24

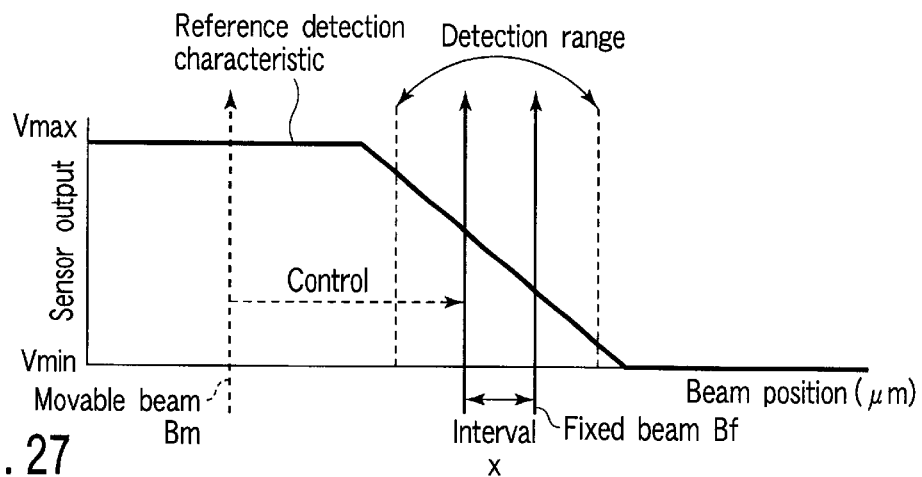
F I G. 27
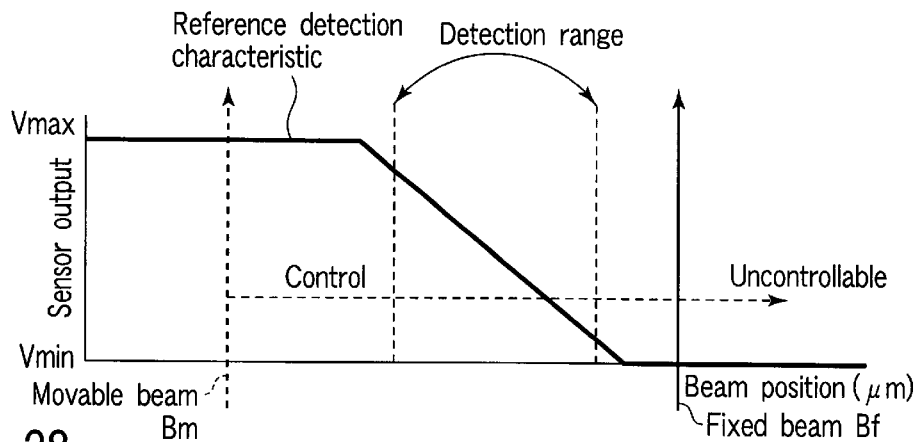
F I G. 28
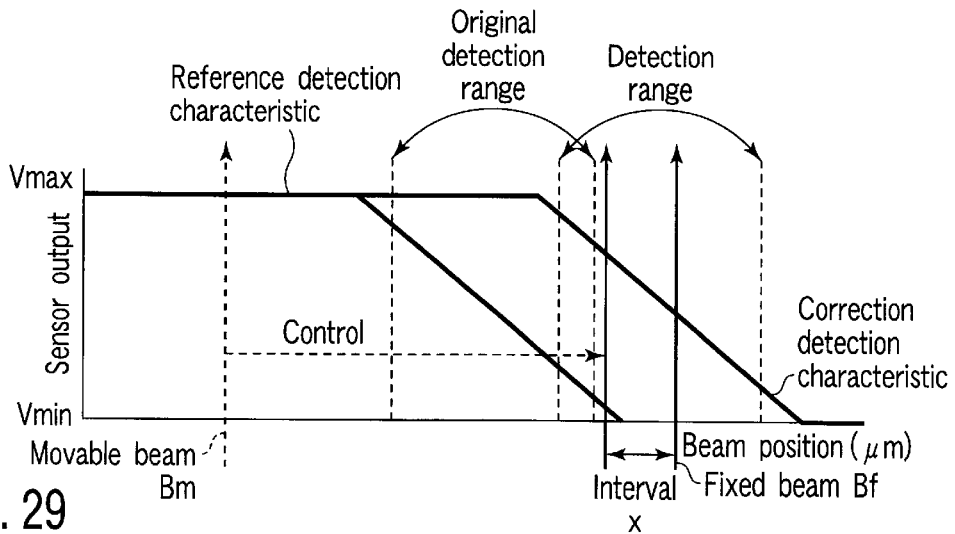
F I G. 29

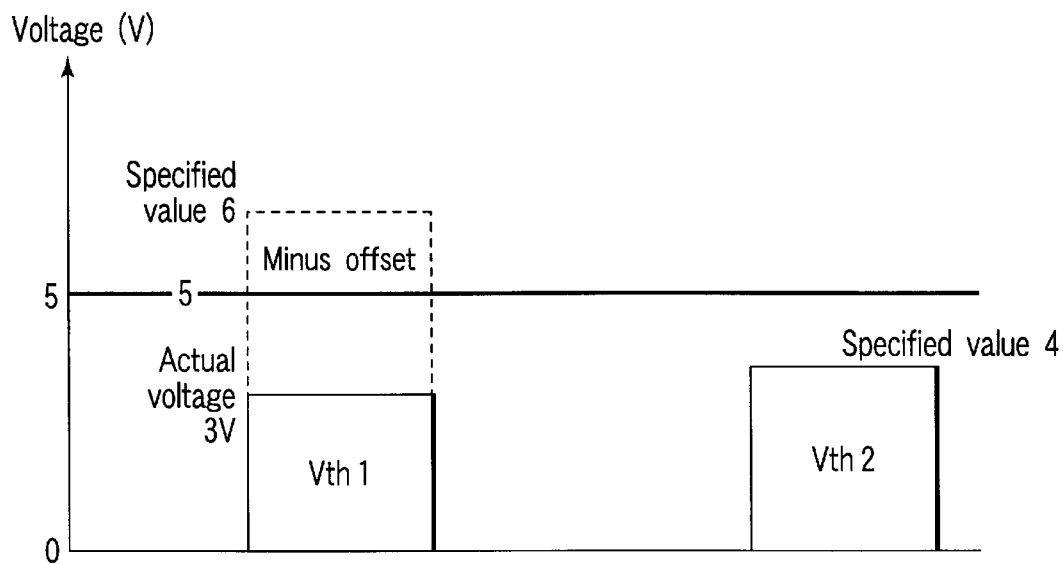
F I G. 53
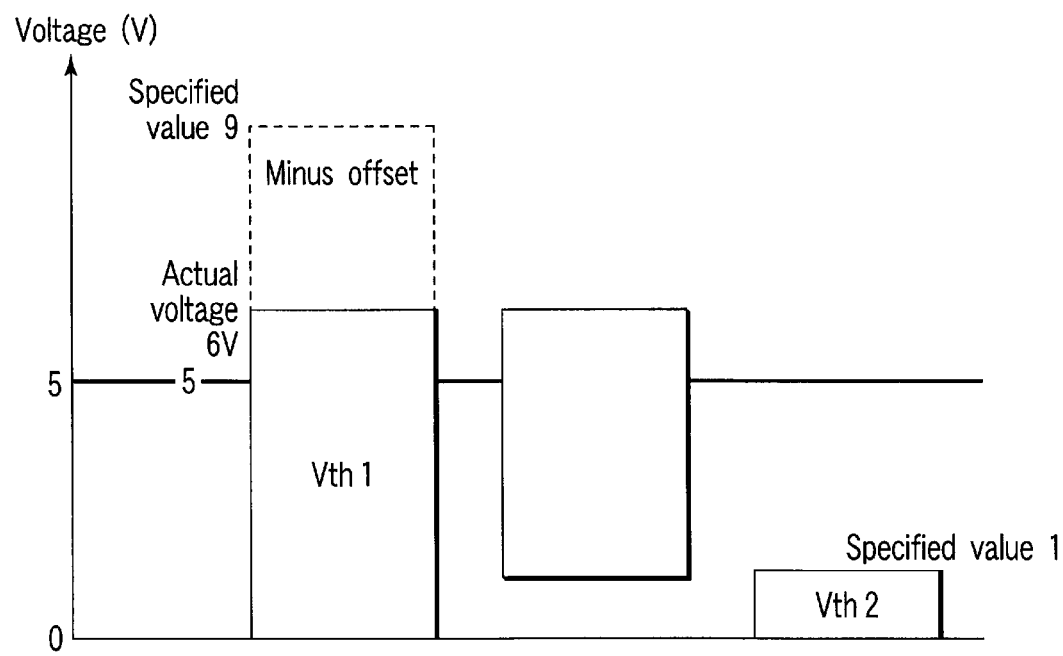
F I G. 54

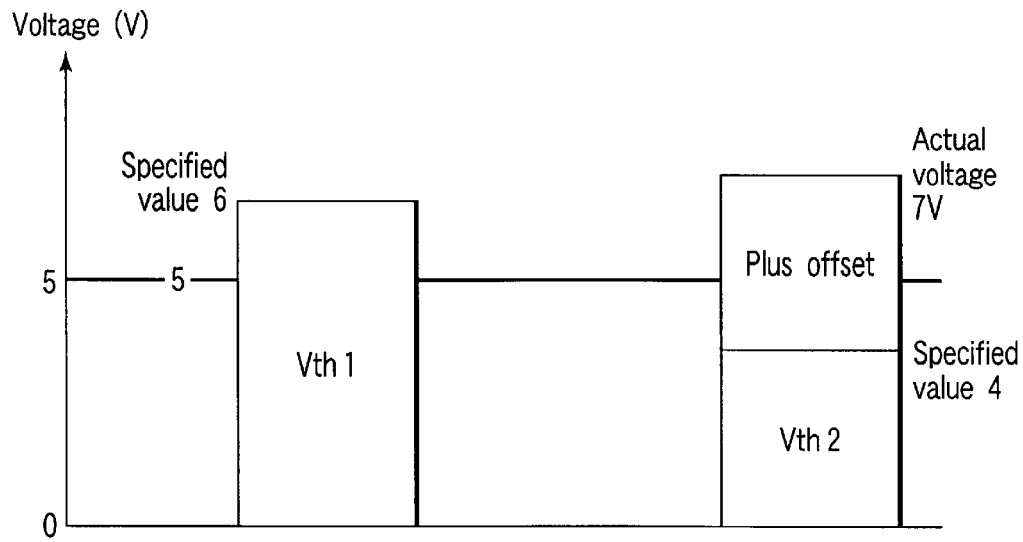
F I G. 55
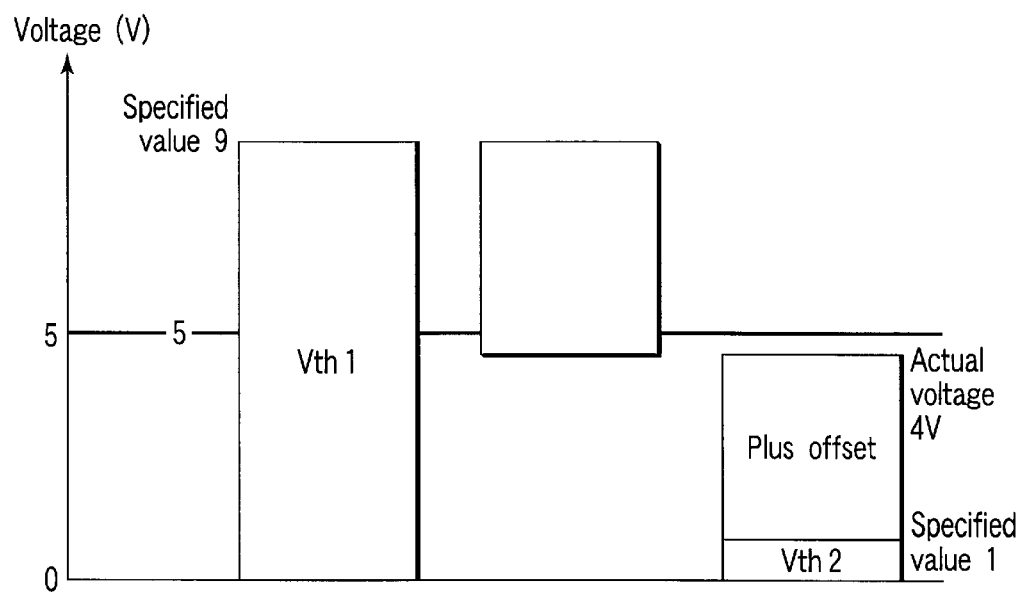
F I G. 56

| Vth 1 | Vth 2 | Prior art | Solution |
|---|---|---|---|
| 0 | 0 | Error | Within an actual threshold or determined center value |
| 0 | 1 | Above threshold | Above threshold |
| 1 | 0 | Below threshold | Below threshold |
| 1 | 1 | Within threshold | Within threshold |
FIG. 57
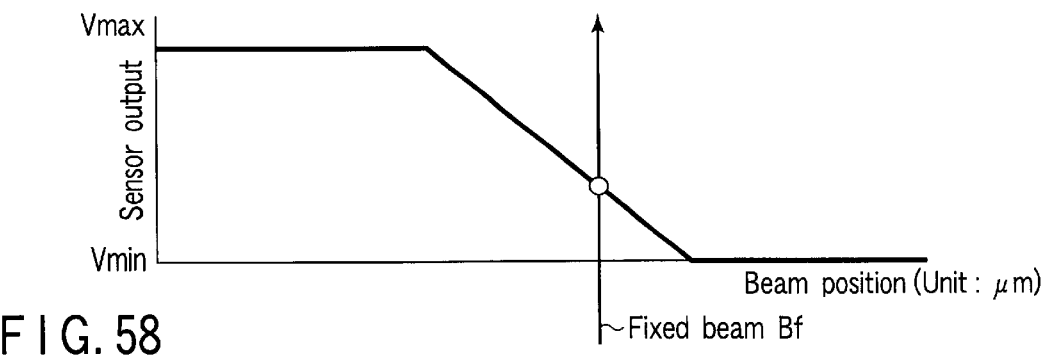
FIG. 58
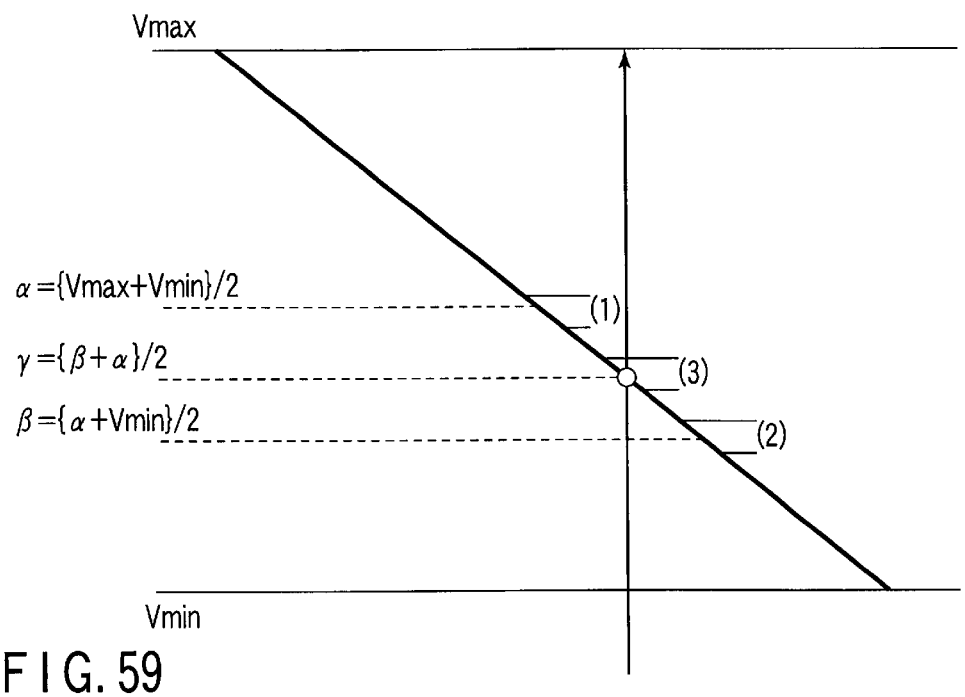
FIG. 59

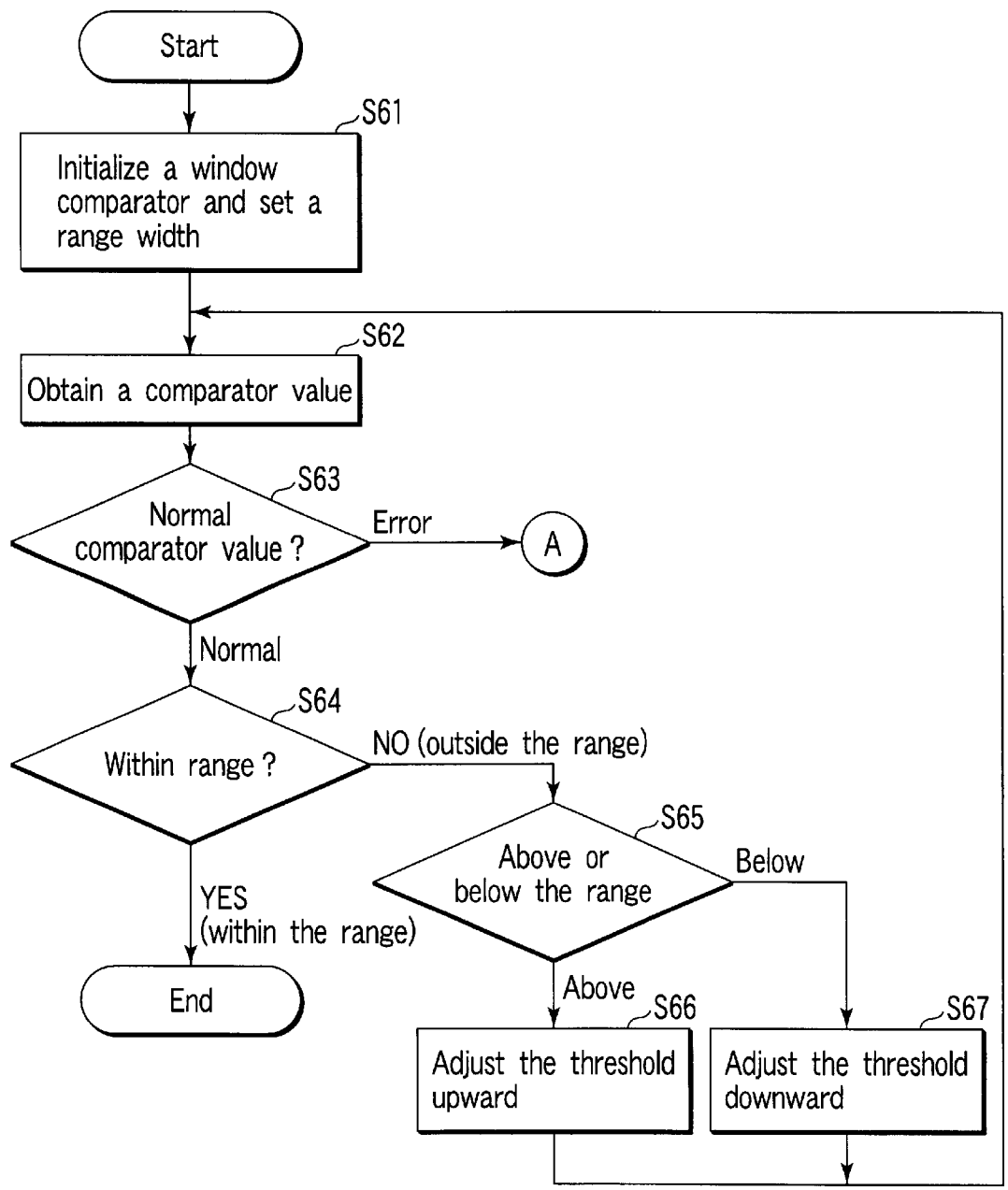
F I G. 60

LIGHT BEAM SCANNING APPARATUS

BACKGROUND OF THE INVENTION

The present invention relates to a light beam scanning apparatus for scanning a plurality of laser beams in an image formation apparatus such as a digital copier or a laser printer which forms a single electrostatic latent image on a single photoconductor drum by simultaneously performing scanning and exposure on the photoconductor drum by using the plurality of laser beams.

In recent years, there have been developed various digital copiers according to scanning and exposure using a laser light beam (hereafter referred to as the light beam) and an electrophotographic process.

Recently, a multi-beam digital copier is developed for increasing an image formation speed. The multi-beam system generates a plurality of light beams and simultaneously scans a plurality of lines using these light beams.

Such a multi-beam digital copier is equipped with a semiconductor laser oscillator for generating a plurality of light beams and an optical unit as a light beam scanning apparatus. The optical unit chiefly comprises a rotating polygon such as a polygon mirror, a collimator lens and an f-θ lens for reflecting each light beam from the plurality of laser oscillators toward a photoconductor drum and scanning on a photoconductor drum using each light beam.

Conventionally, the optical unit of the multi-beam digital copier controls scanning direction exposure positions and passage positions of light beams. The scanning direction exposure position control relates to controlling light beam positions in a main scanning direction. The passage position control relates to controlling light beam positions in a sub-scanning direction.

An exemplification of this technology is proposed in U.S. patent application Ser. No. 9/667,317. According to the exemplification, a pair of sensors detect passage points of light beams scanning a photoconductor drum surface in the sub-scanning direction in order to control light beam positions by detecting light beams with high precision in a wide range. The pair of sensors are arranged at a position equivalent to the surface to be scanned. Each of the pair of sensors is formed of a trapezoid pattern, for example. The pair of sensors are arranged symmetrically to each other with a specified interval.

A light beam scanning position is determined by a value obtained by integrating output differences from the pair of sensors. A processing circuit connected to the pair of sensors computes an integration value indicative of the light beam scanning position. The processing circuit comprises a plurality of operational amplifiers and uses an integrator to integrate an electric signal difference detected by each sensor.

U.S. patent application Ser. No. 9/816,773 proposes a pair of sensors comprising two sawtooth patterns for detecting a light beam. Like U.S. patent application Ser. No. 9/667,317, the proposal in Ser. No. 9/816,773 determines a light beam scanning position by using the processing circuit for integrating output differences from the pair of sensors.

In the case of a saturated output from the processing circuit for processing an output signal from the pair of sensors, U.S. patent application Ser. Nos. 9/667,317 or 9/816,773 proposes detection of a light beam scanning position by correcting an output signal from the pair of sensors.

However, there is not provided control to effectively determine a correction amount for correcting an output signal from the pair of sensors. If the light beam excessively deviates from the center position, for example, repeating the correction using a minimum correction amount makes the correction process time-consuming.

Further, an offset voltage exists in the processing circuit for processing an output signal from the pair of sensors. There is the problem that such an offset voltage in the processing circuit affects determination of a light beam passing position.

BRIEF SUMMARY OF THE INVENTION

It is therefore an object of the present invention to provide a light beam scanning apparatus which can effectively determine a light beam scanning position.

A light beam scanning apparatus according to the present invention comprises: a light emitting device which outputs a light beam; a light beam scanning member which allows a light beam output from this light emitting device to scan toward a scanned face so that the light beam scans the scanned face in a main scanning direction; a pair of sensors which are arranged on the scanned face or a position equivalent thereto, detect a light beam scanned by the light beam scanning member, and output an electric signal; a processing circuit which has a plurality of operational amplifiers, corrects an output from each of the pair of sensors, and integrates a difference between these corrected electric signals; a control section which determines the necessity of correction based on a value integrated by this processing circuit, determines a scanning position of the light beam according to a value integrated by the processing circuit when the necessity of correction is not determined, and sets a correction amount based on a value integrated by the processing circuit and an offset amount present in the processing circuit when the necessity of correction is determined; and a correction signal generation circuit which outputs a correction signal to the processing circuit so as to correct an electric signal output from each of the pair of sensors based on a correction amount set in this control section.

A light beam scanning apparatus according to the present invention comprises: a light emitting device which outputs a light beam; a light beam scanning member which allows a light beam output from this light emitting device to scan toward a scanned face so that the light beam scans the scanned face in a main scanning direction; a pair of sensors which are arranged on the scanned face or a position equivalent thereto, detect a light beam scanned by the light beam scanning member, and output an electric signal; an integrator circuit which integrates a difference between electric signals output from each of the pair of sensors; a first comparator circuit which compares a value integrated in this integrator circuit with a first threshold; a second comparator circuit which compares a value integrated in the integrator circuit with a second threshold smaller than the first threshold; and a control section which specifies first and second thresholds to the first and second comparator circuits, when the comparator circuits yield a normal comparison result, determines an output value of the integrator circuit according to magnitude relation between the first and second thresholds, and, when the comparator circuits yield an abnormal comparison result, determines whether the offset has an effect on the abnormal comparison result based on the predetermined maximum offset amount.

A light beam scanning apparatus according to the present invention comprises: a light emitting device which outputs a light beam; a light beam scanning member which allows a light beam output from this light emitting device to scan toward a scanned face so that the light beam scans the scanned face in a main scanning direction; a pair of sensors which are arranged on the scanned face or a position equivalent thereto, detect a light beam scanned by the light beam scanning member, and output an electric signal; an integrator circuit which integrates a difference between electric signals output from each of the pair of sensors; a first comparator circuit which compares a value integrated in this integrator circuit with a first threshold; a second comparator circuit which compares a value integrated in the integrator circuit with a second threshold smaller than the first threshold; and a decision section which specifies first and second thresholds to the first and second comparator circuits, uses the first and second comparator circuits to repeat comparison among the integrator circuit's output value and the first and second thresholds for a plurality of times, and determines magnitude relation among the integrator circuit's average output value and the first and second thresholds based on the number of times for determining the integrator circuit's output value to be greater than the first threshold, the number of times for determining the integrator circuit's output value to be between the first and second thresholds, and the number of times for determining the integrator circuit's output value to be smaller than the second threshold.

An image formation apparatus according to the present invention has an image support to form a latent image on a scanned face where a light beam is scanned based on image information and image formation means for forming an image formed on this image support onto an image formation medium. The image formation apparatus comprises: a light emitting device which outputs a light beam; a light beam scanning member which allows a light beam output from this light emitting device to scan the light beam toward a scanned face so that the light beam scans the scanned face on the image support in a main scanning direction; a pair of sensors which are arranged on the scanned face or a position equivalent thereto, detect a light beam scanned by the light beam scanning member, and output an electric signal; a processing circuit which has a plurality of operational amplifiers, corrects an output from each of the pair of sensors, and integrates a difference between these corrected electric signals; a control section which determines the necessity of correction based on a value integrated by this processing circuit, determines a scanning position of the light beam according to a value integrated by the processing circuit when the necessity of correction is not determined, and sets a correction amount based on a value integrated by the processing circuit and an offset amount present in the processing circuit when the necessity of correction is determined; and a correction signal generation circuit which outputs a correction signal to the processing circuit so as to correct an electric signal output from each of the pair of sensors based on a correction amount set in this control section.

An image formation apparatus according to the present invention has an image support to form a latent image on a scanned face where a light beam is scanned based on image information and image formation means for forming an image formed on this image support onto an image formation medium.

The image formation apparatus comprises: a light emitting device which outputs a light beam; a light beam scanning member which allows a light beam output from this light emitting device to scan toward a scanned face so that the light beam scans the scanned face in a main scanning direction; a pair of sensors which are arranged on the scanned face or a position equivalent thereto, detect a light beam scanned by the light beam scanning member, and output an electric signal; an integrator circuit which integrates a difference between electric signals output from each of the pair of sensors; a first comparator circuit which compares a value integrated in this integrator circuit with a first threshold; a second comparator circuit which compares a value integrated in the integrator circuit with a second threshold smaller than the first threshold; and a control section which specifies first and second thresholds to the first and second comparator circuits, when the comparator circuits yield a normal comparison result, determines an output value of the integrator circuit according to magnitude relation between the first and second thresholds, and, when the comparator circuits yield an abnormal comparison result, determines whether the offset has an effect on the abnormal comparison result based on the predetermined maximum offset amount.

An image formation apparatus according to the present invention has an image support to form a latent image on a scanned face where a light beam is scanned based on image information and image formation means for forming an image formed on this image support onto an image formation medium. The image formation apparatus comprises: a light emitting device which outputs a light beam; a light beam scanning member which allows a light beam output from this light emitting device to scan toward a scanned face so that the light beam scans the scanned face in a main scanning direction; a pair of sensors which are arranged on the scanned face or a position equivalent thereto, detect a light beam scanned by the light beam scanning member, and output an electric signal; an integrator circuit which integrates a difference between electric signals output from each of the pair of sensors; a first comparator circuit which compares a value integrated in this integrator circuit with a first threshold; a second comparator circuit which compares a value integrated in the integrator circuit with a second threshold smaller than the first threshold; and a decision section which specifies first and second thresholds to the first and second comparator circuits, uses the first and second comparator circuits to repeat comparison among the integrator circuit's output value and the first and second thresholds for a plurality of times, and determines magnitude relation among the integrator circuit's average output value and the first and second thresholds based on the number of times for determining the integrator circuit's output value to be greater than the first threshold, the number of times for determining the integrator circuit's output value to be between the first and second thresholds, and the number of times for determining the integrator circuit's output value to be smaller than the second threshold.

A light beam scanning apparatus according to the present invention comprises: light emitting means for outputting a light beam; light beam scanning means for allowing a light beam output from this light emitting means to scan toward a scanned face so that the light beam scans the scanned face in a main scanning direction; a pair of detection means, arranged on the scanned face or a position equivalent thereto, for detecting a light beam scanned by the light beam scanning member and outputting an electric signal; processing means having a plurality of operational amplifiers for correcting an output from each of the pair of detection means and integrating a difference between these corrected electric signals; control means for determining the necessity of correction based on a value integrated by this processing means, determining a scanning position of the light beam according to a value integrated by the processing means when the necessity of correction is not determined, and setting a correction amount based on a value integrated by the processing means and an offset amount present in each operational amplifier in the processing means when the necessity of correction is determined; and correction signal generation means for outputting a correction signal to the processing means so as to correct an electric signal output from each of the pair of detection means based on a correction amount set in this control means.

A light beam scanning apparatus according to the present invention comprises: light emitting means for outputting a light beam; light beam scanning means for allowing a light beam output from this light emitting means to scan toward a scanned face so that the light beam scans the scanned face in a main scanning direction; a pair of detection means, arranged on the scanned face or a position equivalent thereto, for detecting a light beam scanned by the light beam scanning means and outputting an electric signal; integration means for integrating a difference between electric signals output from each of the pair of detection means; first comparison means for comparing a value integrated in this integration means with a first threshold; second comparison means for comparing a value integrated in the integration means with a second threshold smaller than the first threshold; and control means for specifying first and second thresholds to the first and second comparison means, when the comparison means yield a normal comparison result, determining an output value of the integration means according to magnitude relation between the first and second thresholds, and, when the comparison means yield an abnormal comparison result, determining whether the offset has an effect on the abnormal comparison result based on the predetermined maximum offset amount.

A light beam scanning apparatus according to the present invention comprises: light emitting means for outputting a light beam; light beam scanning means for allowing a light beam output from this light emitting means to scan toward a scanned face so that the light beam scans the scanned face in a main scanning direction; a pair of detection means, arranged on the scanned face or a position equivalent thereto, for detecting a light beam scanned by the light beam scanning means and outputting an electric signal; integration means for integrating a difference between electric signals output from each of the pair of detection means; first comparison means for comparing a value integrated in this integration means with a first threshold; second comparison means for comparing a value integrated in the integration means with a second threshold smaller than the first threshold; and decision means for specifying first and second thresholds to the first and second comparator means, using the first and second comparison means to repeat comparison among the integration means' output value and the first and second thresholds for a plurality of times, and determining magnitude relation among the integration means' average output value and the first and second thresholds based on the number of times for determining the integration means' output value to be greater than the first threshold, the number of times for determining the integration means' output value to be between the first and second thresholds, and the number of times for determining the integration means' output value to be smaller than the second threshold.

A method of detecting a light beam passage position according to the present invention comprises: generating a light beam; allowing a generated light beam to scan toward a scanned face so that the light beam scans the scanned face in a main scanning direction; converting a light beam scanning the scanned face to an electric signal by using a pair of sensors arranged on the scanned face or a position equivalent thereto; correcting an electric signal converted from each of the plurality of sensors based on a correction signal and integrating a difference between these corrected electric signals by using a processing circuit having a plurality of operational amplifiers; determining the necessity of correction based on the integrated value, determining a scanning position of the light beam according to a value integrated by the processing circuit when the necessity of correction is not determined, and setting a correction amount based on a value integrated by the processing circuit and an offset amount present in the processing circuit when the necessity of correction is determined; and outputting a correction signal to the processing circuit so as to correct an electric signal output from each of the pair of sensors based on the set correction amount.

A method of detecting a light beam passage position according to the present invention comprises: generating a light beam; allowing a generated light beam to scan toward a scanned face so that the light beam scans the scanned face in a main scanning direction; converting a light beam scanning the scanned face to an electric signal by using a pair of sensors arranged on the scanned face or a position equivalent thereto; integrating a difference between electric signals converted by each of the pair of sensors; comparing the integrated value with a first threshold by using a first comparator circuit; comparing the integrated value with a second threshold smaller than the first threshold by using a second comparator circuit; and specifying first and second thresholds, when the comparator circuits yield a normal comparison result, determining magnitude relation between the first and second thresholds, and, when the comparator circuits yield an abnormal comparison result, determining whether the offset has an effect on the abnormal comparison result based on the predetermined maximum offset amount.

A method of detecting a light beam passage position according to the present invention comprises: generating a light beam; allowing a generated light beam to scan toward a scanned face so that the light beam scans the scanned face in a main scanning direction; converting a light beam scanning the scanned face to an electric signal by using a pair of sensors arranged on the scanned face or a position equivalent thereto; integrating a difference between electric signals converted by each of the pair of sensors by using an integrator circuit; comparing the integrated value with a first threshold by using a first comparator circuit; comparing the integrated value with a second threshold smaller than the first threshold by using a second comparator circuit; and specifying first and second thresholds, repeating comparison among the values integrated by the first and second comparator circuits and the first and second thresholds for a plurality of times, and determining magnitude relation among an average value of the integrated values and the first and second thresholds based on the number of times for determining the integrated value to be greater than the first threshold, the number of times for determining the integrated value to be between the first and second thresholds, and the number of times for determining the integrated value to be smaller than the second threshold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 shows relationship between a light beam passage position and an integration output;

FIG. 14 exemplifies a sensor pattern output, a differential amplifier output, and an integrator output according to a light beam passage position;

FIG. 16 exemplifies a sensor pattern output, a differential amplifier output, and an integrator output according to a light beam passage position;

FIG. 17 exemplifies a sensor pattern output, a differential amplifier output, and an integrator output according to a light beam passage position;

FIG. 18 is a block diagram showing a configuration example of a processing circuit for processing an output signal from the beam detection section;

FIG. 24 is a block diagram schematically showing a configuration example of the optical control system;

FIG. 27 illustrates a light beam detection range in basic detection characteristics;

FIG. 28 illustrates that a light beam cannot be controlled in basic detection characteristics without correction;

FIG. 29 illustrates a light beam detection range when a correction is applied;

FIG. 53 illustrates a case where an output value from the integrator cannot be determined due to an effect of an offset voltage from either comparator;

FIG. 54 illustrates a case where the output value from the integrator in FIG. 53 is determined in consideration of an effect of an offset voltage from either comparator;

FIG. 55 illustrates a case where an output value from the integrator cannot be determined due to an effect of an offset voltage from either comparator;

FIG. 56 illustrates a case where the output value from the integrator in FIG. 55 is determined in consideration of an effect of an offset voltage from either comparator;

FIG. 57 shows the relation between a comparison result and a determination result from each comparator;

FIG. 58 exemplifies a scanning position of a light beam;

FIG. 59 exemplifies a sequence of light beam detection;

FIG. 60 is a flowchart exemplifying an algorithm for detecting a light beam scanning position by using the comparator;

DETAILED DESCRIPTION OF THE INVENTION

Embodiments of the present invention will be described in further detail with reference to the accompanying drawings.

First, the following describes a light beam scanning apparatus and an image formation apparatus to which the embodiments of the present invention are applied.

Figure 1:
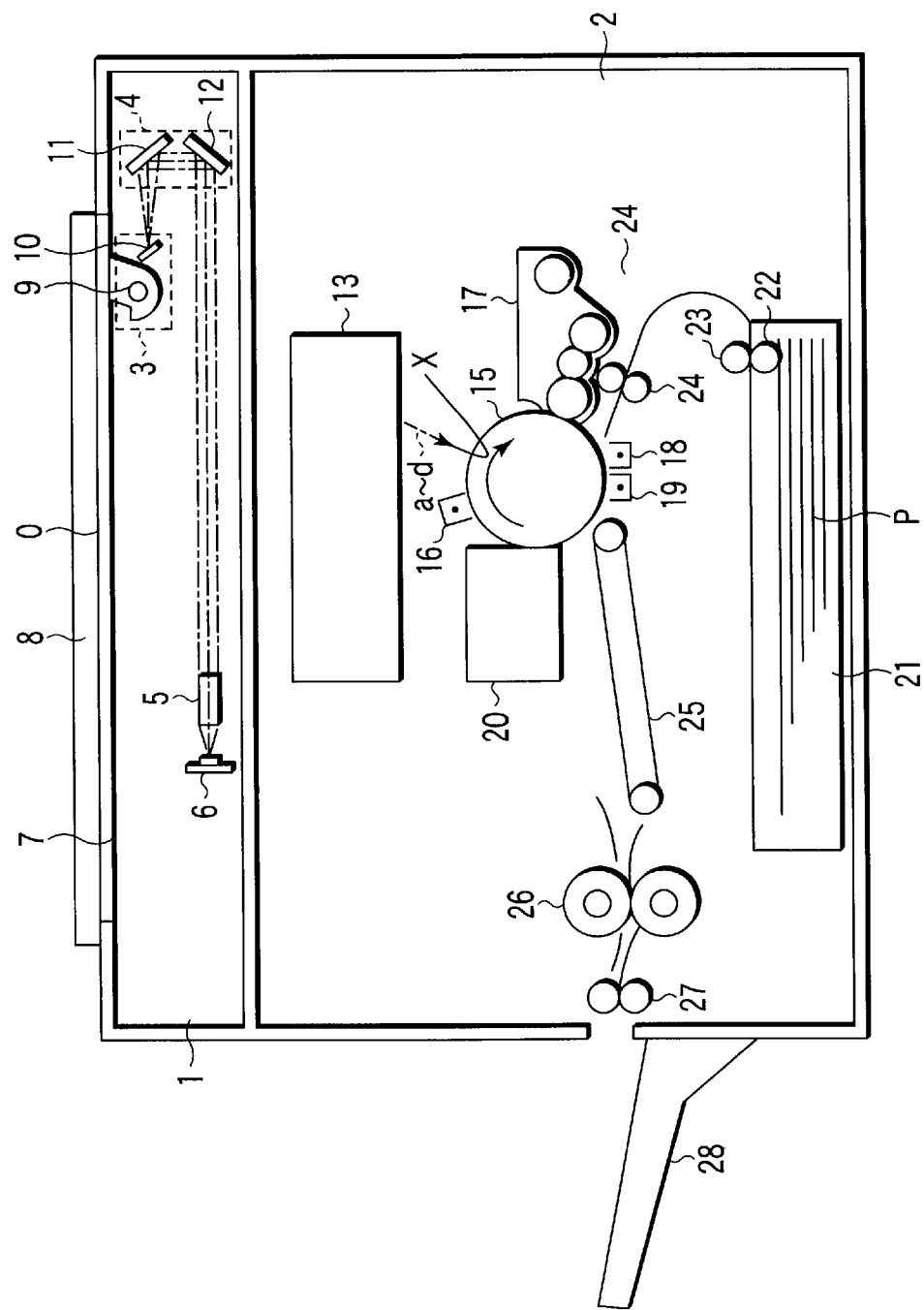
FIG. 1 shows a schematic configuration of a digital copier.

FIG. 1 schematically shows a configuration of a digital copier as an image formation apparatus to which a light beam scanning apparatus is applied. The digital copier comprises a scanner 1 and a printer 2. The scanner 1 reads images. The printer 2 functions forms an image on a medium on which images should be formed. The scanner 1 comprises a first carriage 3 and a second carriage 4 movable in a direction of an arrow, an image formation lens 5, a photo-electric conversion element 6, and the like.

In FIG. 1, a document O is placed with its face down on a transparent document glass plane 7 and is pressed against the document glass plane 7 with a document cover 8 which opens and closes freely.

The document O is illuminated by a light source 9. The reflected light is condensed on a light receiving face of the photoelectric conversion element 6 via mirrors 10, 11, and 12, and the image formation lens 5. The first carriage 3 is equipped with the light source 9 and the mirror 10. The second carriage 4 is equipped with the mirrors 11 and 12. The first carriage 3 and the second carriage 4 move at a relative speed of 2:1 to always keep an optical path length constant. Driven by a carriage drive motor (not shown), the first carriage 3 and the second carriage 4 move from right to left in synchronization with a read timing signal.

The scanner 1 sequentially reads an image of the document O placed on the document glass plane 7 line by line. An image processing section (not shown) converts a read output to an 8-bit digital image signal representing gradation of the image.

The printer 2 comprises a combination of an optical unit (light beam scanning apparatus) 13 and an image formation section 14 according to the electrophotography capable of image formation on paper P as an image formation medium. An image signal read by the scanner 1 from the document O is processed in an image processing section (not shown), and then is converted to a laser beam (hereafter referred to as the light beam) from the semiconductor laser oscillator.

The following describes the optical unit 13 according to a multi-beam optical system using a plurality of semiconductor laser oscillators (e.g. four oscillators). An optical unit according to a single-beam optical system comprises only one semiconductor laser oscillator. This optical unit operates similarly to the optical unit according to the multi-beam optical system except relative position control of a plurality of light beams.

A plurality of semiconductor laser oscillators in the optical unit 13 emits light to generate a plurality of light beams according to a laser modulation signal output from the image processing section (not shown). The plurality of light beams is reflected on a polygon mirror to become scanning light which is output outside the unit. The optical unit 13 will be detailed later.

A plurality of light beams output from the optical unit 13 is formed as spot light having necessary resolution at an exposure position X on a photo-conductor drum 15 as an image support. The light is scanned on the photoconductor drum 15 in the main scanning direction (along the photo-conductor drum's rotation axis). Further, rotating the photoconductor drum 15 forms an electrostatic latent image corresponding to the image signal on the photoconductor drum 15.

Near the photoconductor drum 15, there are provided an electrostatic charger 16, a developing machine 17, a transfer charger 18, and a release charger 19 for charging the surface thereof, a cleaner 20, and the like. The photoconductor drum 15 is rotatively driven by a drive motor (not shown) at a peripheral speed and is electrostatically charged by the electrostatic charger 16 facing the surface of the drum. A plurality of light beams is arranged in the sub-scanning direction (along movement of the photoconductor drum surface) and is imaged at the exposure position X on the charged photoconductor drum 15.

The electrostatic latent image formed on the photoconductor drum 15 is developed as a toner image by means of toner (developer) from the developing machine 17. The toner image formed on the photoconductor drum 15 is transferred by using a transfer charger 18 to paper P supplied from a paper feed system at a proper timing.

The paper feed system feeds paper P in a paper feed cassette 21 mounted at the bottom by selecting a sheet of paper using a paper feed roller 22 and a separation roller 23. The paper P is transported to a resist roller 24 and is fed to a transfer position at a specified timing. Downstream from the transfer charger 18, there are provided a paper transport mechanism 25, a fixer 26, and an eject roller 27 for ejecting the imaged paper P. The fixer 26 fixes the toner image transferred to the paper P which is then ejected to an external eject tray 28 via the eject roller 27.

After completion of transfer to the paper P, the cleaner 20 removes toner remaining on the surface of the photoconductor drum 15. The drum 15 then returns to an initial state and is ready for next image formation.

By repeating the above process, an image formation operation is performed successively.

As mentioned above, the document O placed on the document glass plane 7 is read by the scanner 1. The read information is subject to a series of processing in the printer 2 and is recorded on the paper P as a toner image.

The following describes the optical unit (light beam scanning apparatus) 13.

Figure 2:
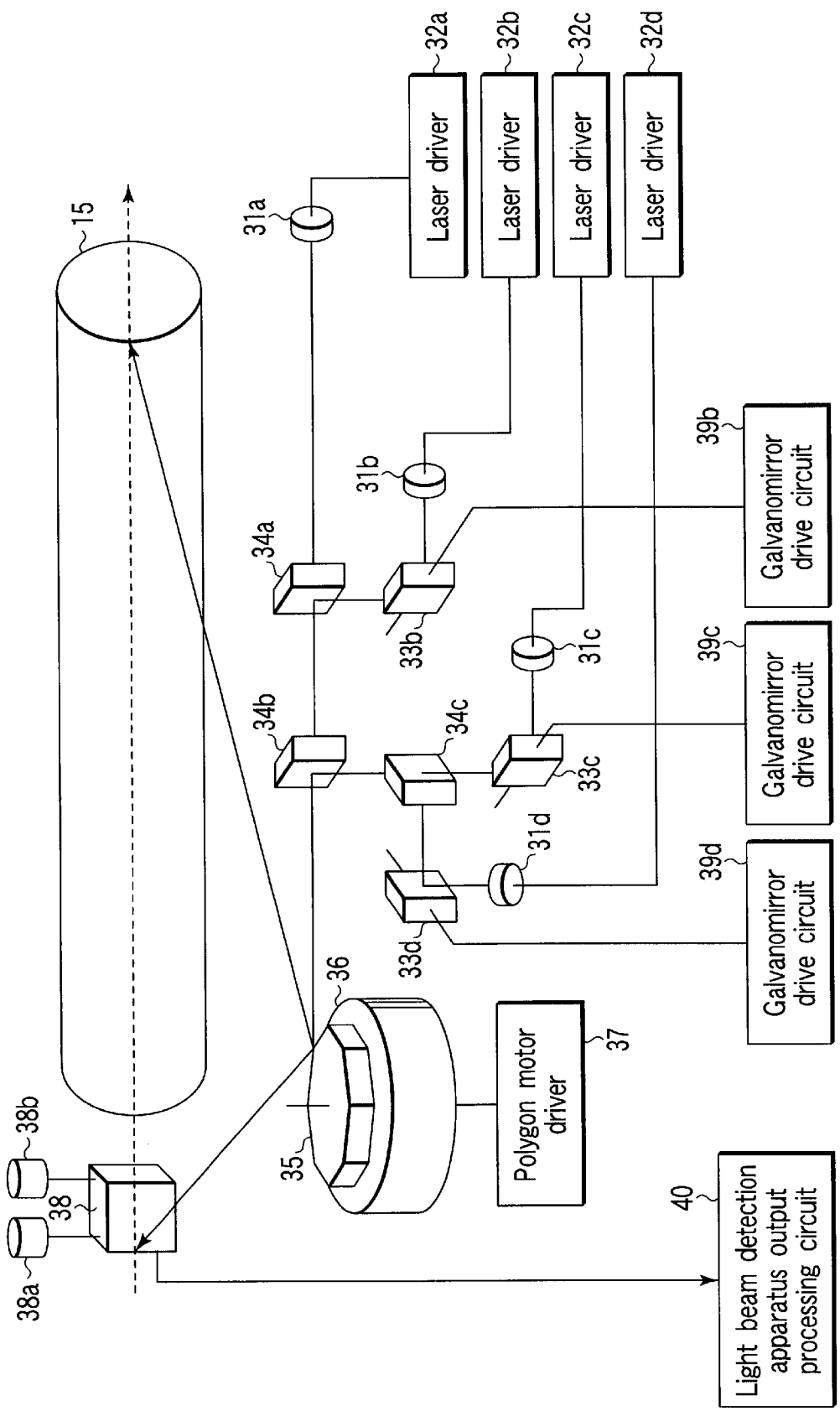
FIG. 2 shows a schematic configuration of an optical unit.

FIG. 2 shows a configuration of the optical unit 13 according to the multi-beam optical system and positioning of the photoconductor drum 15. The optical unit according to the single-beam optical system is configured similarly in FIG. 2 except only one light beam is controlled.

As shown in FIG. 2, the optical unit 13 according to the multi-beam optical system includes semiconductor laser oscillators 31a, 31b, 31c, and 31d for generating four light beams, for example. Each of the laser oscillators 31a to 31d can form an image one scanning line at a time, permitting fast image formation without significantly decreasing a polygon mirror rotation speed.

The laser oscillator 31a is driven by a laser driver 32a. An output light beam from the laser oscillator 31a passes a collimator lens (not shown), then half mirrors 34a and 34b, and finally enters a polygon mirror 35 as a rotating polygon mirror.

A polygon motor 36 is driven by a polygon motor driver 37 and rotates the polygon mirror 35 at a constant speed. Light reflected on the polygon mirror 35 scans the photoconductor drum in a given direction at an angular speed determined by a rotation speed of the polygon motor 36. A light beam scanned by the polygon mirror 35 passes an f-θ lens (not shown). According to the f-θ characteristic, the light beam scans on a light receiving face of a light beam detection section 38 and on the photoconductor drum 15 at a constant speed. The light beam detection section 38 detects a light beam position, light beam passage timing, light beam power, etc.

A laser oscillator 31b is driven by a laser driver 32b. A light beam output from the laser oscillator 31b passes the collimator lens (not shown) and is reflected on a galvanomirror 33b and then on the half mirror 34a. The reflected light from the half mirror 34a passes a half mirror 34b and enters the polygon mirror 35. A path following the polygon mirror 35 is same as that for the laser oscillator 31a. The light passes the f-θ lens (not shown) and scans the light beam detection section 38's light receiving face and the photoconductor drum 15 at a constant speed.

A laser oscillator 31c is driven by a laser driver 32c. A light beam output from the laser oscillator 31c passes the collimator lens (not shown) and is reflected on a galvanomirror 33c. The reflected light passes a half mirror 34c, is reflected on the half mirror 34b, and enters the polygon mirror 35. A path following the polygon mirror 35 is same as that for the laser oscillators 31a and 31b. The light passes the f-θ lens (not shown) and scans the light beam detection section 38's light receiving face and the photoconductor drum 15 at a constant speed.

A laser oscillator 31d is driven by a laser driver 32d. A light beam output from the laser oscillator 31d passes the collimator lens (not shown) and is reflected on a galvanomirror 33d. The reflected light is further reflected on the half mirrors 34c and 34b, and then enters the polygon mirror 35. A path following the polygon mirror 35 is same as that for the laser oscillators 31a, 31b, and 31c. The light passes the f-θ lens (not shown) and scans the light beam detection section 38's light receiving face and the photoconductor drum 15 at a constant speed.

Each of the laser drivers 32a to 32d contains an automatic power control (APC) circuit and always drives the laser oscillators 31a to 31d with an emission power level controlled by a main control section (CPU) 51.

Respective light beams output from the laser oscillator 31a, 31b, 31c, and 31d are synthesized through the half mirror 34a, 34b, and 34c. The four light beams advance toward the polygon mirror 35. Accordingly, the four light beams can simultaneously scan on the photoconductor drum 15.

The galvanomirrors 33b, 33c, and 33d are driven by galvanomirror 33b, 33c, and 33d drive circuit 39b, 39c, and 39d, respectively. The galvanomirrors adjust or control positions of light beams output from laser oscillators 31b, 31c, and 31d in the sub-scanning direction with reference to a light beam output from the laser oscillator 31a.

The light beam detection section 38 is equipped with light beam detection section adjustment motors 38a and 38b for adjusting an installation position of the apparatus and an inclination of a light beam against the scanning direction.

The light beam detection section 38 detects passage positions, passage timings, and powers (light volumes) of the four light beams. The light beam detection section 38 is provided near the photoconductor drum 15 and has the surface level with that of the photoconductor drum 15. A detection signal from the light beam detection section 38 is used for controlling the galvanomirrors 33b, 33c, and 33d corresponding to respective light beams (controlling an image formation position in the sub-scanning direction), emission powers of the laser oscillators 31a, 31b, 31c, and 31d, and emission timings (controlling an image formation position in the main scanning direction). Details are described later. To generate a signal for these control operations, the light beam detection section 38 connects with a light beam detection section output processing circuit (processing circuit) 40.

Described below is the digital copier's control system.

Figure 3:
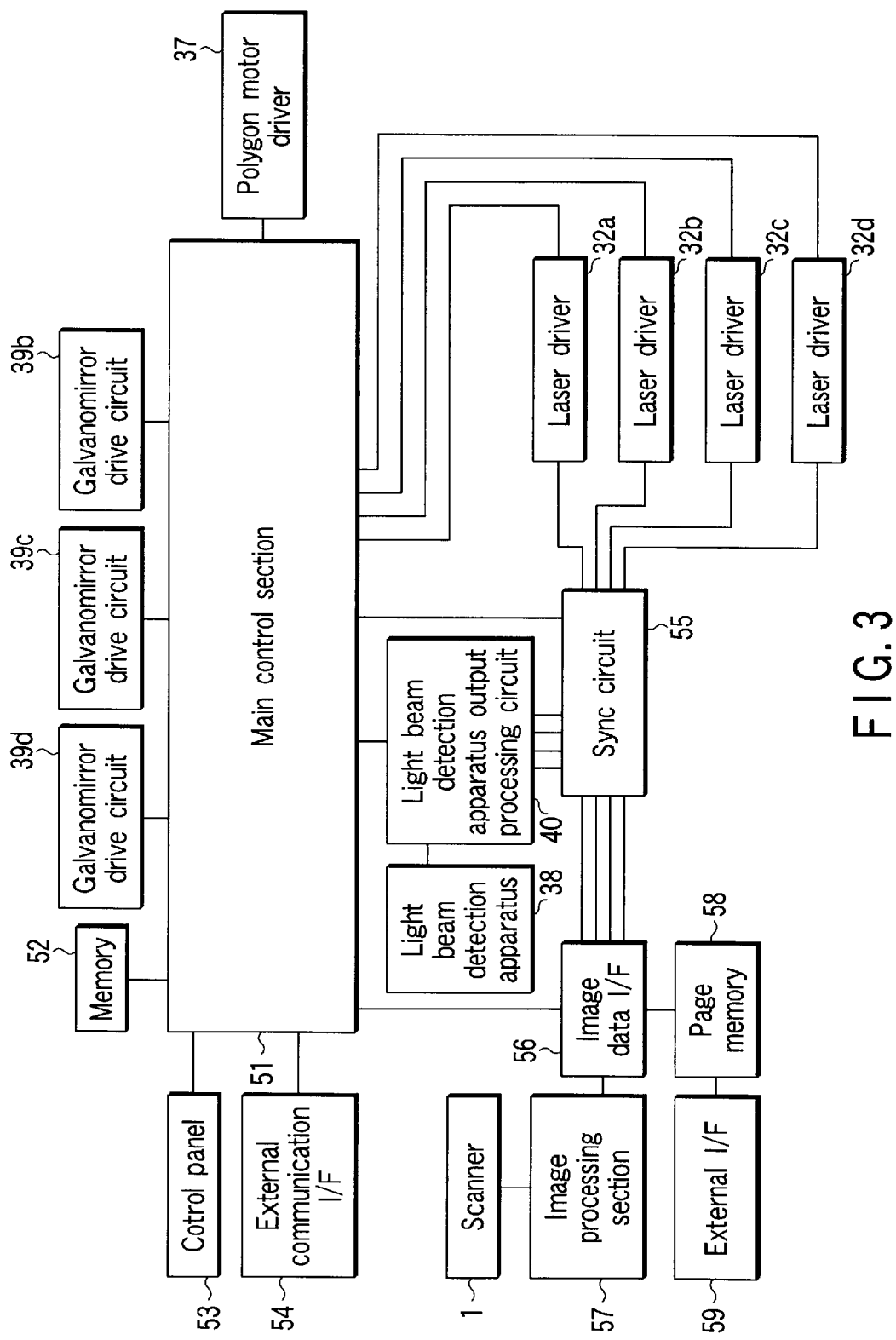
FIG. 3 is a block diagram showing a configuration example of an optical control system.

FIG. 3 shows a configuration of the digital copier provided with an optical unit according to the multi-beam optical system. A main control section 51 is responsible for overall control of the digital copier and comprises a CPU, for example. The control section 51 connects with memory 52, a control panel 53, an external communication interface (I/F) 54, laser drivers 32a, 32b, 32c, and 32d, a polygon mirror motor driver 37, galvanomirror drive circuits 39b, 39c, and 39d, a light beam detection section output processing circuit 40, a sync circuit 55, and an image data interface (I/F) 56, etc.

The sync circuit 55 connects with the image data I/F 56. The image data I/F 56 connects with an image processing section 57 and page memory 58. The image processing section 57 connects with the scanner 1. The page memory 58 connects with an external interface (I/F) 59.

The following describes a flow of image data forming an image.

During a copy operation, the scanner 1 reads an image from the document O placed on the document glass plane 7. The read image is sent to the image processing section 57. The image processing section 57 provides the image signal from the scanner 1 with a known shading correction, various filtering processes, gradation, gamma correction, and the like.

Image data from the image processing section 57 is sent to the image data I/F 56. The image data I/F 56 distributes image data to the four laser drivers 32a, 32b, 32c, and 32d.

The sync circuit 55 generates a clock synchronized with timing each light beam passing on the light beam detection section 38. Synchronously with this clock, the image data I/F 56 sends the image data as a laser modulation signal to the laser drivers 32a, 32b, 32c, and 32d.

The sync circuit 55 includes a sample timer, a logical circuit, and the like. The sample timer forcibly operates the laser oscillators 31a, 31b, 31c, and 31d in a non-image region and controls each light beam power. When each beam scans on the light beam detection section 38, the logical circuit operates the laser oscillators 31a, 31b, 31c, and 31d and detects a main scanning direction position of each light beam.

Transmitting image data synchronously with each light beam scanning provides image formation at a correct position in synchronization with the main scanning direction.

The control panel 53 is a man-machine interface for starting a copy operation or setting the number of sheets of paper.

This digital copier is capable of not only a copy operation, but also image formation of image data externally input via the external I/F 59 connected to the page memory 58. Image data externally input from the external I/F 59 is temporarily stored in the page memory 58, and then is sent to the sync circuit 55 via the image data I/F 56.

When the digital copier is externally controlled via a network, for example, the external communication I/F 54 works as the control panel 53.

The galvanomirror drive circuits 39b, 39c, and 39d drive the galvanomirrors 33b, 33c, and 33d according to a value supplied from the main control section 51. Accordingly, the main control section 51 can freely control angles of the galvanomirrors 33b, 33c, and 33d via the galvanomirror drive circuits 39b, 39c, and 39d.

The polygon motor driver 37 drives the polygon motor 36 for rotating the polygon mirror 35 which scans the four light beams. The main control section 51 instructs the polygon motor driver 37 to start or stop the rotation and change the rotation speed. When the light beam detection section 38 confirms the light beam's passage position, the polygon motor 36 rotates at a lower speed than for image formation.

The laser drivers 32a, 32b, 32c, and 32d not only generate a laser beam according to image data as mentioned above, but also forcibly operate the laser oscillators 31a, 31b, 31c, and 31d independently of image data according to a forced emission signal from the main control section 51.

The main control section 51 specifies power for beams emitted from the laser oscillators 31a, 31b, 31c, and 31d by using the laser drivers 32a, 32b, 32c, and 32d, respectively. The emission power setting is changed according to a change in the process condition or detection of a light beam passage position.

The memory 52 stores information needed for control. For example, the memory 52 stores control amounts for the galvanomirrors 33b, 33c, and 33d, various characteristics of the processing circuit for detecting light beam passage positions (e.g. amplifier offset values), an arrival order of light beams, etc. For example, values stored in the memory 52 are used for initiating a control operation as immediately as possible after power-on.

The following describes a first operation example of the light beam scanning apparatus.

The first operation example describes detection and control of light beam passage positions in a light beam scanning apparatus having the single-beam optical system which performs a scan using a single light beam.

Figure 4:
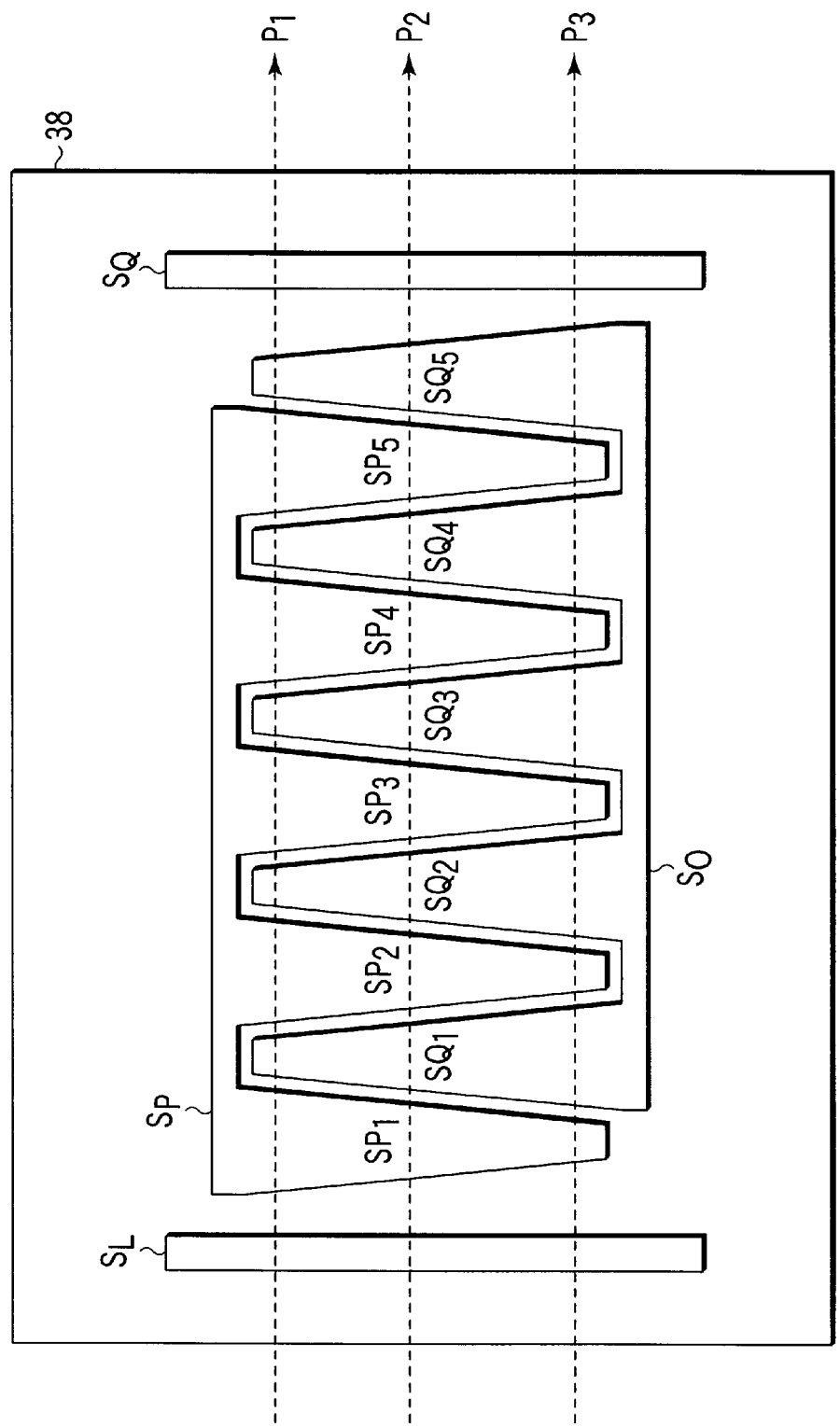
FIG. 4 shows a configuration of a beam detection section.

FIG. 4 shows relationship between the light beam detection section 38's configuration and a light beam's scanning direction. A light beam from one semi-conductor laser oscillator is scanned by a polygon mirror 35's rotation from left to right and passes over the light beam detection section 38.

The light beam detection section 38 comprises a pair of longitudinal sensors SL and SQ, a pair of sensors (sensor patterns) SP and SO provided between the sensors SL an SQ, and a support substrate for integrally supporting these sensors.

The sensor SL detects passage of the light beam and generates a reset signal (integration start signal) for an integrator to be described later. This reset signal is used for discharging an electrical charge from an integral capacitor up to the reference voltage. The integration starts upon completion of a reset operation.

Like the sensor SL, the sensor SQ detects passage of the light beam and generates a conversion start signal for a signal converter (A/D converter or window comparator) which converts an analog signal to a digital signal (to be described later). The signal is used as an A/D conversion start signal for the A/D converter or as a timing signal for the window comparator. The timing signal is used for triggering a comparator output.

A pair of sensors SP and SO are patterns used for detecting a light beam's passage position. The sensors SP and SO are formed as a plurality of triangular or trapezoid patterns. The sensors SP and SO comprising a plurality of triangles and trapezoids are arranged so that respective triangles or trapezoids form a plurality of pairs. For example, the sensors SP and SO each are formed to be sawtooth and are placed with a given gap so that these patterns engage with each other.

In the example of FIG. 4, sensor patterns SP1 to SP5 represent a plurality of triangular or trapezoid patterns constituting the above-mentioned sensor SP. Likewise, sensor patterns SO1 to SO5 represent a plurality of triangular or trapezoid patterns constituting the above-mentioned sensor SO. The sensors SP and SO are arranged so that the sensor patterns SP1 to SP5 engage with the sensor patterns SO1 to SO5, respectively.

As shown in FIG. 4, the sensor pattern SP1 is so formed as to increase a distance for the light beam crossing or passing sensor pattern SP1 as a light beam's passage position is settled upward in the figure. Likewise, the sensor pattern SO1 is so formed as to increase a distance for the light beam crossing or passing sensor pattern SO1 as a light beam's passage position is settled downward in the figure.

A passage position change is measured along the sub-scanning direction, namely a direction orthogonal to the light beam scan direction (main scanning direction). As the passage position changes, an output from one sensor pattern (SP1 or SO1) continuously increases and the an output from other sensor pattern (SO1 or SP1) continuously decreases.

The sensors SP and SO comprise light detection members such as photodiodes and are integrally configured on the support substrate. When the light beam passes, it moves from left to right in FIG. 4. The light is detected in the order of sensor patterns SP1, SO1, SP2, SO2, SP3, SO3, SP4, SO4, SP5, SO5. The sensors SP and SO generate detection outputs.

Figure 5:
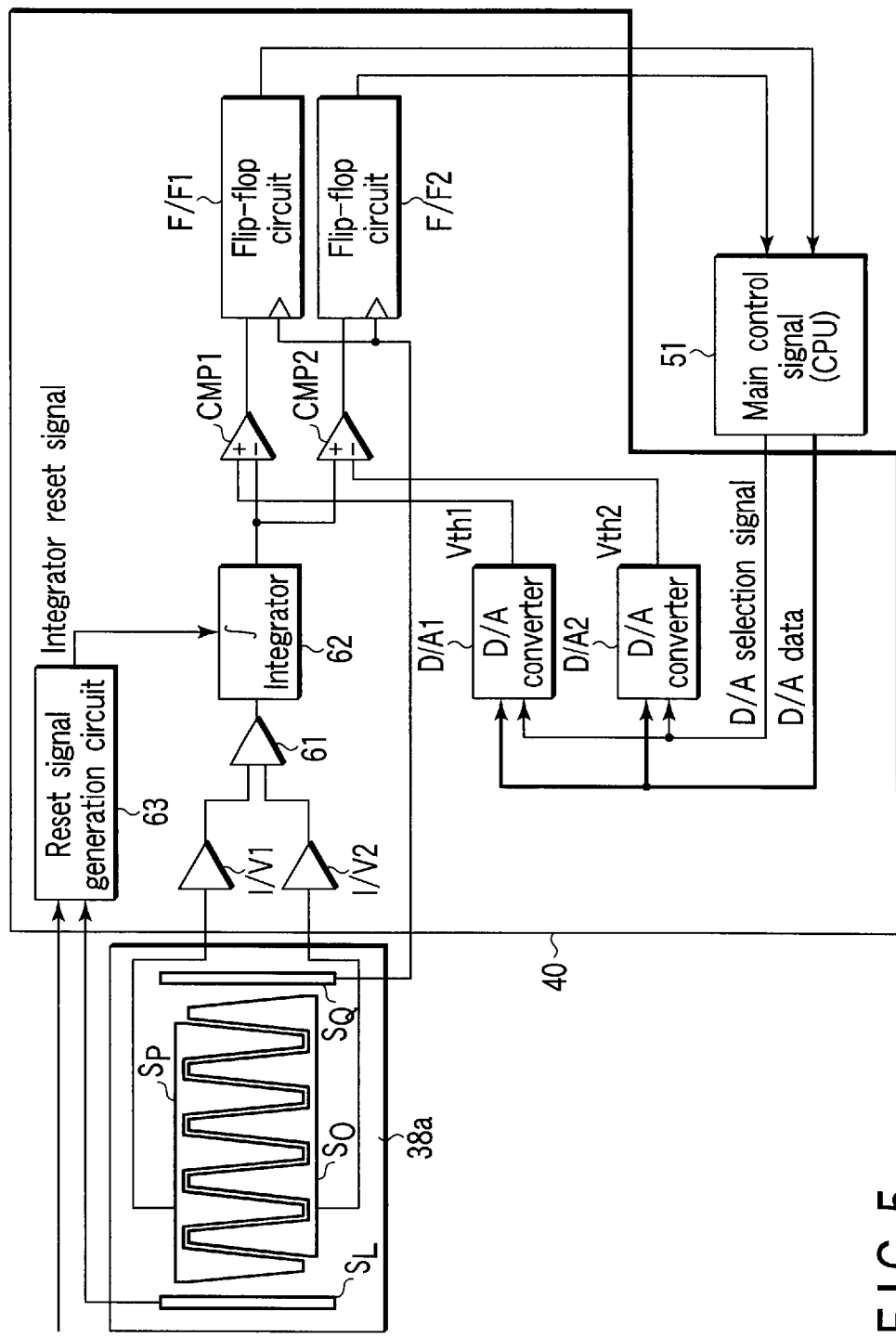
FIG. 5 is a block diagram showing a configuration example of a processing circuit to process an output signal from the beam detection section.

FIG. 5 is a block diagram showing a major part of the light beam detection section output processing circuit 40 using the light beam detection section 38 shown in FIG. 4. This major part should detect a beam position in the sub-scanning direction.

As shown in FIG. 5, the major part of the light beam detection section output processing circuit 40 computes a detected difference between the sensors SP and SO. Further, the light beam detection section output processing circuit 40 uses an integrator 62 to integrate a detected difference between the sensors SP and SO. The result (integration result) integrated by the integrator 62 is supplied to the main control section (CPU) 51 via window comparators CMP1 and CMP2, etc.

The following details the major part of the light beam detection section output processing circuit 40. Here, the description covers a detection operation for a single light beam.

The sensors SP and SO output a current when the light beam passes. The sensors SP and SO are connected to current/voltage conversion amplifiers IV1 and IV2, respectively. A current output from these sensors is converted to a voltage output.

An output from the current/voltage conversion amplifier (IV1, IV2) is connected to a differential amplifier 61 which computes a difference and amplifies the output with a proper gain. The amplified output is then integrated by the integrator 62.

The integrator 62 stores electrical charge in an integral capacitor and generates it as an integration output. Before use, the integral capacitor needs to be discharged. This operation is hereafter referred to as an integration reset.

The integration reset operation is performed by a reset signal which is generated by a combination of outputs from sensors on the light beam detection section. The reset signal is supplied from a sensor SA (not shown) and a sensor SL and is generated from a reset signal generation circuit 63.

When the light beam passes, a signal is output from the sensors SA and SL. The integrator 62 is reset between these sensors. Just after a reset, a signal is output from the sensors SP and SO and is integrated.

An output signal from the integrator 62 is input to window comparators CMP1 and CMP2. The window comparator (CMP1, CMP2) compares an output signal (analog voltage) from the integrator 62 with a voltage value as the threshold given from the main control section (CPU) 51.

A comparison result from the window comparator (CMP1, CMP2) is input to a flip-flop circuit (F/F1, F/F2) and is triggered here. A pulse signal is output from a sensor pattern SQ and is input to the flip-flop circuit (F/F1, F/F2). The SQ output timing (pulse signal rise) holds the output from the window comparator (CMP1, CMP2).

An output from the flip-flop circuit (F/F1, F/F2) is sent to the CPU 51. The CPU 51 connects with an output signal from a timing sensor SR (not shown) on the beam detection section 38. This signal functions as an interrupt signal. The CPU 51 reads data from the flip-flop circuit (F/F1, F/F2) each time the CPU receives an interrupt signal (output signal) from the timing sensor SR.

Detailed below is the window comparator (CMP1, CMP2).

As shown in FIG. 5, an output from the integrator 62 is supplied to an inverting input section of the comparator CMP1 and to a non-inverting input section of the comparator CMP2, for example. A non-inverting input section of the comparator CMP1 is connected to the main control section 51 via a D/A converter (D/A1).

An inverting input section of the comparator CMP2 is connected to the main control section 51 via a D/A converter (D/A2).

The CPU 51 supplies threshold Vth1 to the non-inverting input section of the window comparator CMP1 via the D/A converter (D/A1). In addition, the CPU 51 supplies threshold Vth2 to the inverting input section of the window comparator CMP2 via the D/A converter (D/A2). Here, the condition is threshold Vth1>threshold Vth2.

The CPU 51 supplies the window comparators CMP1 and CMP2 with thresholds Vth1 and Vth2 via the D/A converter (D/A2). When an output voltage from the integrator 62 is smaller than the threshold Vth1 and is larger than the Vth2, the comparators both CMP1 and CMP2 output "1s". When an output from the window comparators CMP1 and CMP2, namely flip-flop circuits F/F1 and F/F2, is "1, 1", the CPU 51 assumes that an output from the integrator 62 exists in a range (window) between the thresholds Vth1 and Vth2. The CPU 51 correctly determines an integrator 62's output voltage, namely the light beam passage position by gradually decreasing the window width. Based on the thus acquired light beam passage position, the main control section 51 controls the light beam's passage position.

Though not shown in the FIG. 5, there are actually provided a current/voltage conversion amplifier for converting output currents of the sensors SO and SP to voltage values and a signal processing circuit such as a binarization circuit for binarizing current/voltage conversion amplifier outputs.

Described below are operations when a light beam passes the light beam detection section 38 in FIG. 4 with reference to FIG. 5.

A light beam is scanned by the polygon mirror 35 in the direction of the arrow in the figure. The sensors SL, SP, SO, and SQ generate currents as the light beam passes. A current output from the sensor SL is converted to a voltage value by the current/voltage conversion amplifier (not shown) and is binarized by the binarization circuit (not shown). The binarized signal is input to the reset signal generation circuit 63. This circuit 63 synthesizes the binarized signal and an output signal from the SA sensor (not shown) to generate a reset signal. This reset signal is input to the integrator 62 to reset it. The reset signal also functions as a clear signal for the flip-flop circuits F/F1 and F/F2 to clear them.

When the light beam passes the sensors SP and SO, these sensors output pulse currents corresponding to positions scanned by the light beam. These output currents are converted to voltage values by the current/voltage conversion amplifiers IV1 and IV2. A difference between voltage-converted signals is amplified by the differential amplifier 61 and is integrated by the integrator 62. An output from the integrator 62 is input to the window comparators CMP1 and CMP2 functioning as analog/digital converters. The input is compared with the specified threshold via the D/A converters (D/A1 and D/A2) and is converted to a digital signal.

When the light beam passes the sensor SQ, an output current from the sensor SQ is converted to a voltage value by the current/voltage conversion amplifier (not shown) and then is binarized by the binarization circuit. The binarized signal is input to the flip-flop circuits F/F1 and F/F2. The leading edge rises of the binarized signal allows the flip-flop circuits F/F1 and F/F2 to trigger outputs from the window comparators CMP1 and CMP2.

A signal from the sensor pattern SR (not shown) is input to the main control section 51 as an interrupt signal. Using this signal, the main control section 51 reads outputs from the window comparators CMP1 and CMP2, namely the flip-flop circuits F/F1 and F/F2.

Described below is a case where the light beam's passage position is P2.

Figure 6:
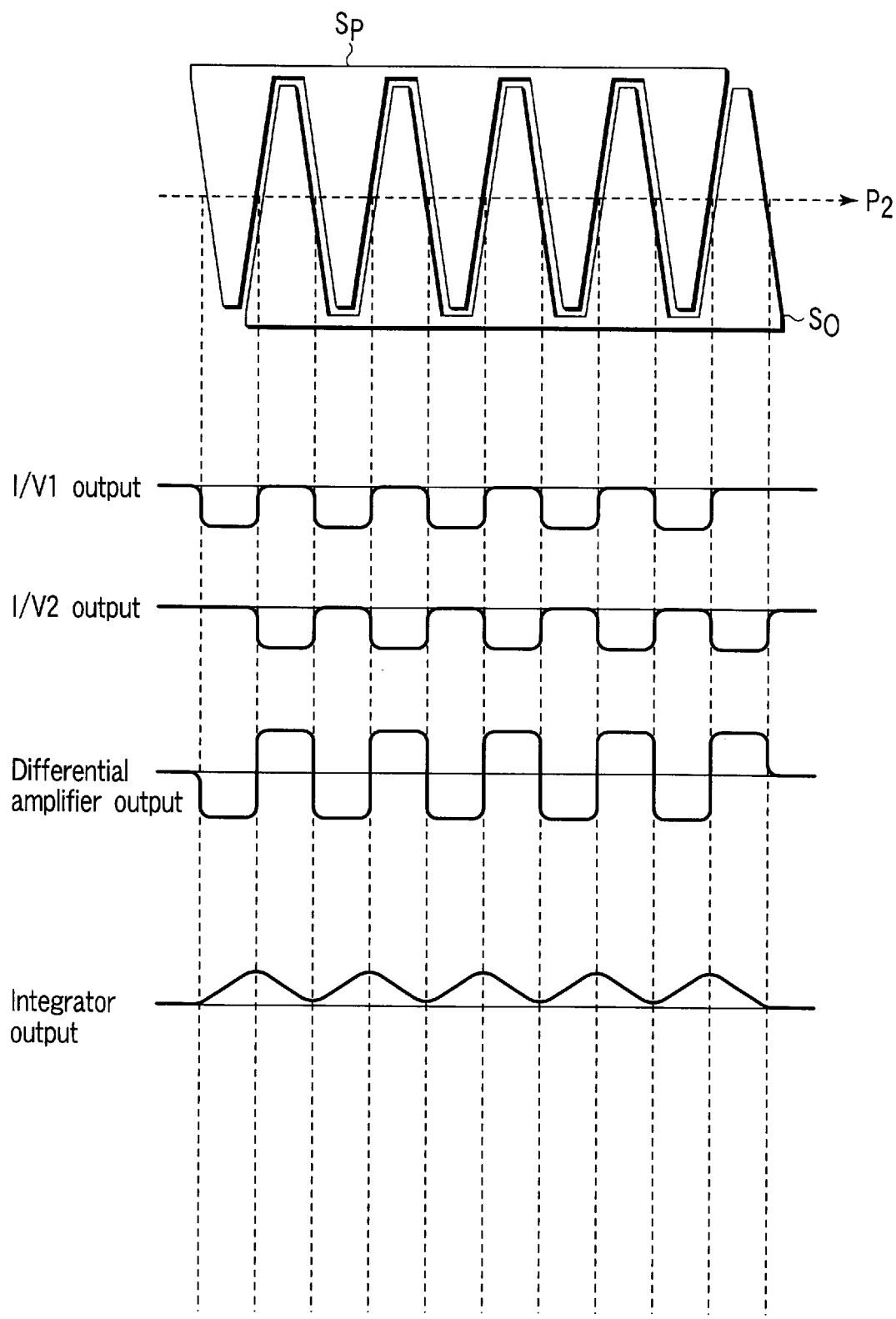
FIG. 6 exemplifies a sensor pattern output, a differential amplifier output, and an integrator output according to a light beam passage position.

FIG. 6 shows signals from processing circuit components when a light beam passes an approximate center (P2) of the sub-scanning direction for the SP and the SO.

As shown in FIG. 6, the light beam passage position is approximately centered at P2 on the sensors SP and SO.

Accordingly, the light beam travels the same distance on the sensor patterns SP1 to SP5 of the sensor pattern SP and on the sensor patterns SO1 to SO5 of the sensor pattern SO. Namely, the current/voltage conversion amplifiers I/V1 and I/V2 output phase-shifted signals with almost equal pulse widths.

The differential amplifier 61 computes a difference between outputs from the current/voltage conversion amplifiers I/V1 and I/V2 and generates an output amplified with a specified gain. The differential amplifier 61's output is integrated by the integrator 62 with combinations of (SP1 and SO1), (SP2 and SO2), (SP3 and SO3), (SP4 and SO4), and (SP5 and SO5). Consequently, the output signal from the integrator 62 finally becomes identical to the reference voltage (Vref) for the processing circuit.

When the light beam passage position is P2, the differential amplifier 61 outputs a signal with the equal amplitude and the reverse direction. An integration result becomes ±0 against the reference voltage.

Figure 7:
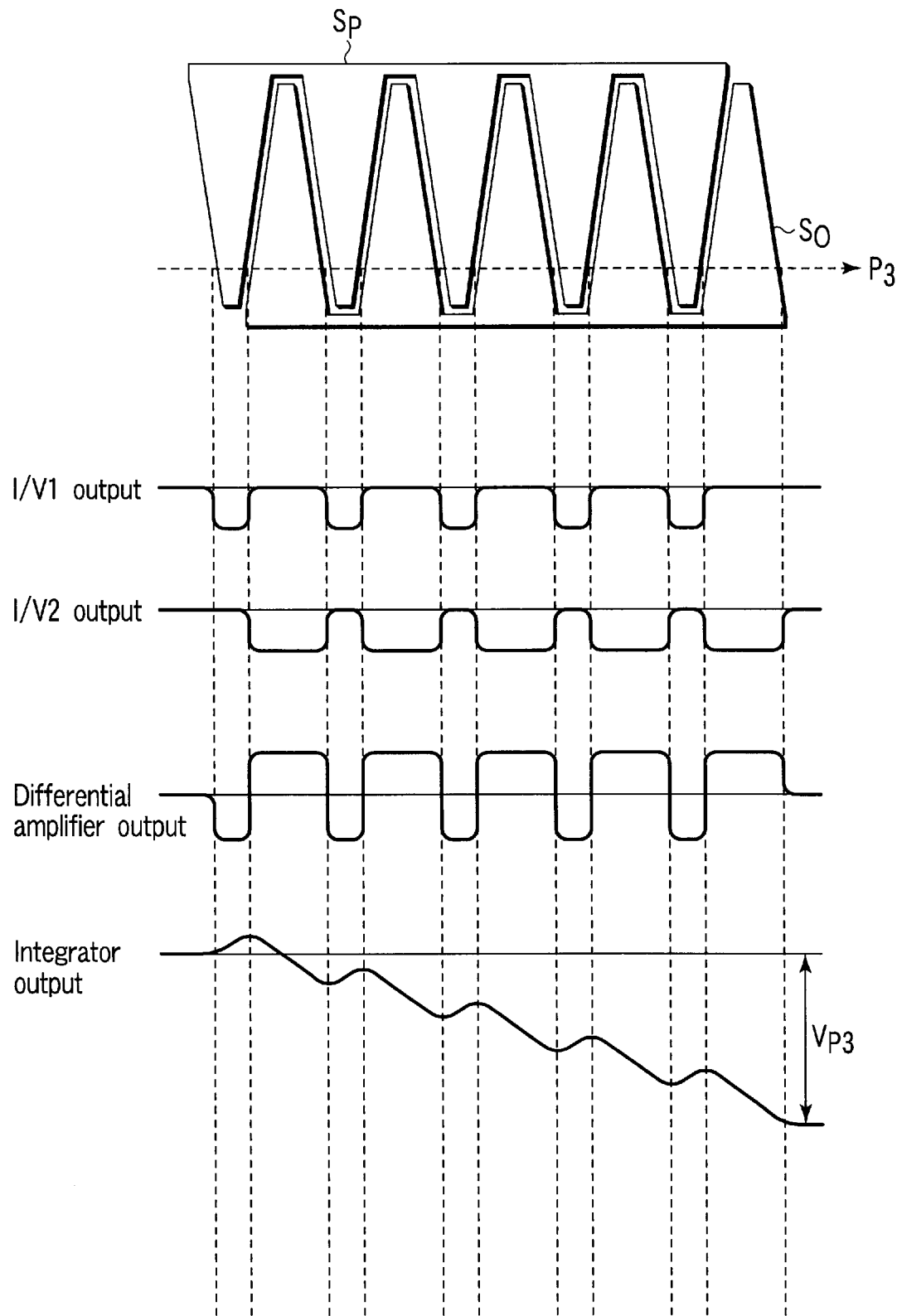
FIG. 7 exemplifies a sensor pattern output, a differential amplifier output, and an integrator output according to a light beam passage position.

FIG. 7 shows signals from processing circuit components when a light beam passes a position P3 below the center (P2) of the sub-scanning direction for the sensors SP and SO.

As shown in FIG. 7, the light beam passage position is set to the position P3 below the approximate center P2 of the sensors SP and SO. When the light beam passes these sensor patterns, the distance for the sensor patterns SO1 to SO5 of the sensor SO becomes longer than the distance for the sensor patterns SP1 to SP5 of the sensor SP.

As regards outputs from the current/voltage conversion amplifiers I/V1, the current/voltage conversion amplifier I/V2 generates a signal with a longer pulse width. Therefore, an output from the differential amplifier 61 looks like as shown in the figure. Like FIG. 6, the differential amplifier 61's output is integrated by the integrator 62 in pairs such as (SP1 and SO1), (SP2 and SO2), (SP3 and SO3), (SP4 and SO4), and (SP5 and SO5). An output signal from the integrator 62 is repeatedly increased and decreased according to an output from the differential amplifier 61. The output signal finally becomes −VP3 which is output below the reference voltage Vref.

When the light beam passage position is set to a position P1 above the center position P2, an integration result is the reverse of that for the position P3 in FIG. 7. In the case of the position P1, an output signal from the integrator 62 finally becomes +VP3 which is output above the reference voltage Vref.

Accordingly, this processing circuit 40 outputs the reference voltage Vref when a light beam passage position is set to the center position P2 for the sensors SP and SO. The processing circuit 40 outputs a value larger than the reference voltage Vref when a light beam passage position is set to the position P1 above the center position P2. The processing circuit 40 outputs a value smaller than the reference voltage Vref when a light beam passage position is set to the position P3 below the center position P2.

It is possible to detect a light beam passage position by integrating a differential signal between outputs from the sensors SP and SO.

Figure 8:
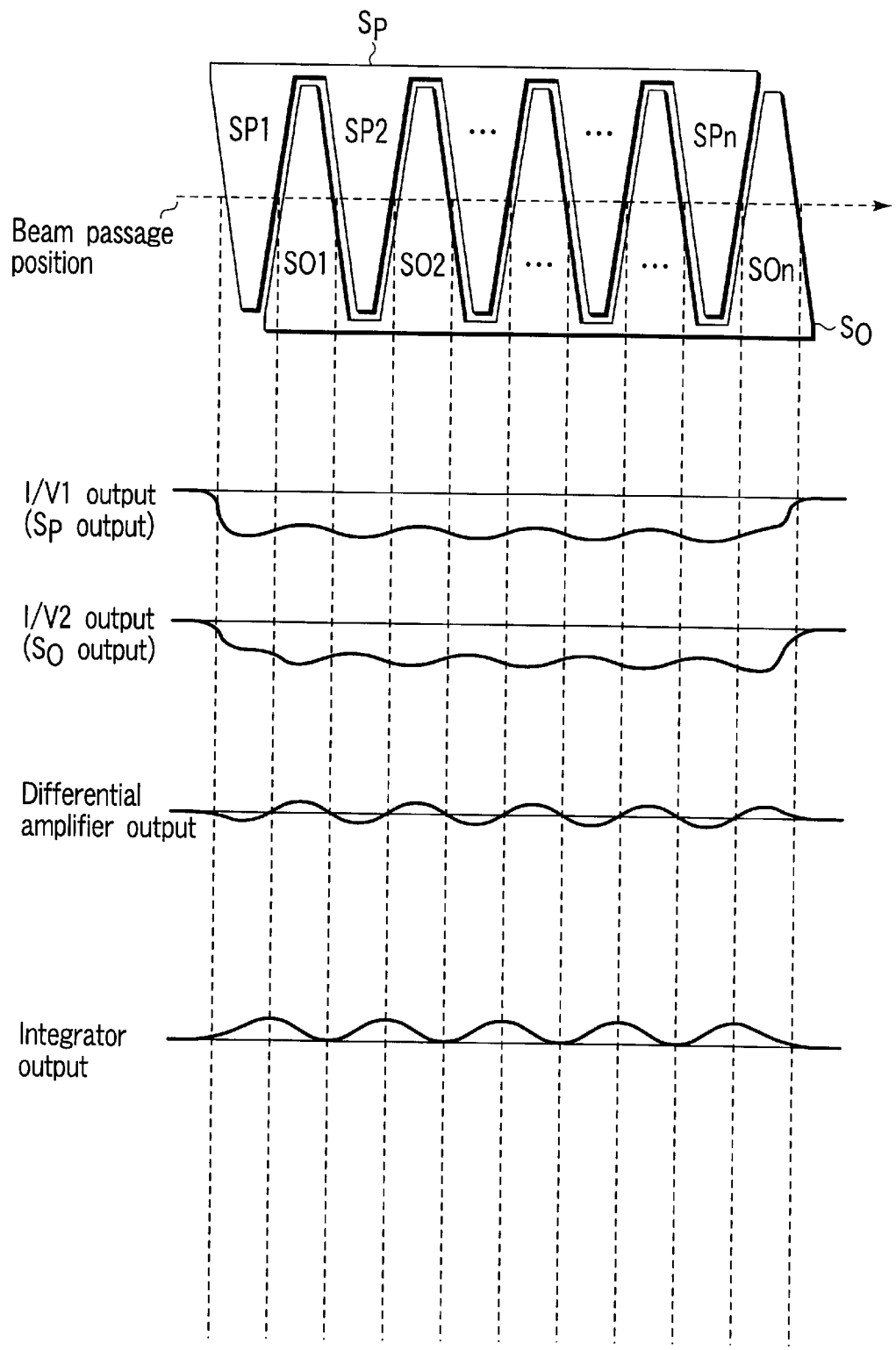
FIG. 8 exemplifies a sensor pattern output, a differential amplifier output, and an integrator output according to a light beam passage position.
Figure 9:
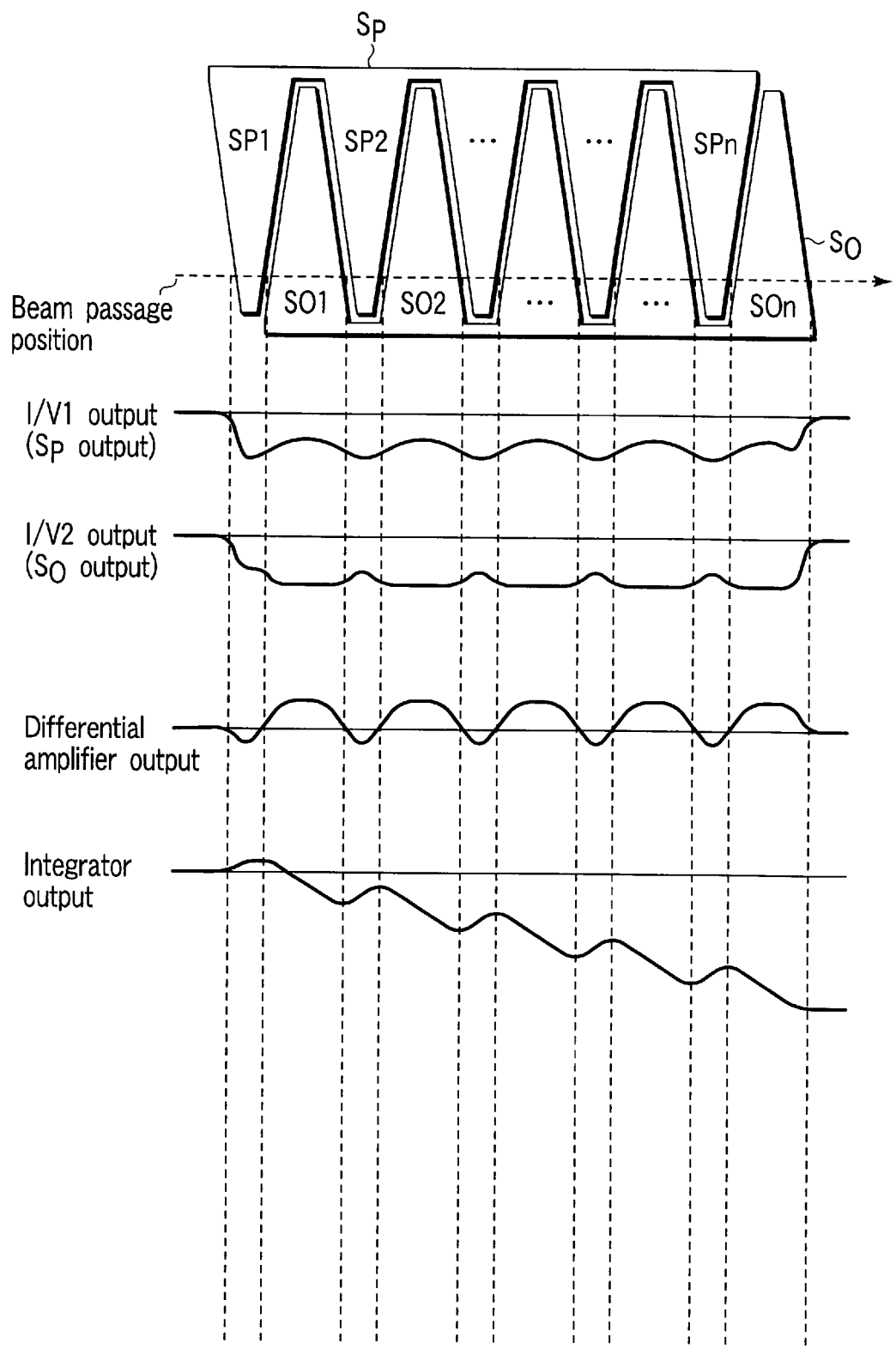
FIG. 9 exemplifies a sensor pattern output, a differential amplifier output, and an integrator output according to a light beam passage position.

FIGS. 8 and 9 show cases where the sensors SP and SO comprise a sawtooth sensor pattern which is sufficiently smaller than a beam diameter. When the light beam passage position is set to the center position P2 as shown in FIG. 8, the light beam detection section output processing circuit 40 outputs the reference voltage Vref like in FIG. 6. When the light beam passage position is set to the position P3 below the center position P2 as shown in FIG. 9, the light beam detection section output processing circuit 40 outputs a value smaller than the reference voltage Vref like in FIG. 7.

Operations of the light beam detection section output processing circuit 40 in FIGS. 8 and 9 are same as those in FIGS. 6 and 7. Detailed description of operations is omitted.

FIG. 10 shows relationship between a light beam position scanned on the sensors SP and SO and an output value from the integrator 62. It is seen from FIG. 10 that the integrator 62's output deviates from the reference voltage Vref as a light beam scan position on the sensors SP and SO deviates from the center. It is possible to determine how a light beam scan position deviates from the center by comparing an output from the integrator 62 with the reference voltage Vref.

The following describes a second operation example of the light beam scanning apparatus.

The second operation example applies to a light beam scanning apparatus having the multi-beam optical system which performs a scan using a plurality of light beams, e.g., four light beams. The principle of detecting and controlling a light beam passage position is the same as the above-mentioned first operation example. The description thereof is omitted here.

Described below is multi-beam passage position control using the light beam detection section 38 in FIG. 4. The multi-beam optical system uses four laser oscillators. This embodiment assumes a 4-beam multi-beam optical system having four actuators (galvanomirrors in this example) for moving light beams in the sub-scanning direction. It is assumed that the multi-beam optical system has 600 dpi resolution.

As explained in the first operation example, the light beam detection section 38 has the detection characteristic as shown in FIG. 7. The integration output is approximately |VU−VL|/H=Vunit [V/μm]. For providing a 4-beam pitch with the 600 dpi resolution, galvanomirrors just need to be adjusted so that integration outputs for adjacent light beams produce a difference of approximately Vunit×42.3[V].

When a first light beam is targeted to pass the position P2, for example, a first laser oscillator is activated and a polygon mirror is rotated. A galvanomirror for the first light beam is operated so that the light beam passes within the sensor pattern. When the light beam is adjusted to pass within the sensor pattern, the galvanomirror is used to adjust a first light beam passage position so that an integration output becomes Vref.

Then, a second light beam passage position is adjusted. A second laser oscillator is activated and the polygon mirror is rotated. Like the first light beam, a galvanomirror for the second light beam is operated so that the light beam passes within the sensor pattern. Thereafter, the galvanomirror for the second light beam is used to adjust the second light beam passage position so that an integration output becomes Vref−Vunit×42.3[V].

These operations control a pitch of 42.3[μm] between passage positions for the first and second light beams. Likewise, galvanomirrors for the third and fourth light beams are adjusted so that integration outputs for the adjacent light beams produce a difference of approximately Vunit×42.3[V] equivalent to 42.3[μm].

The above-mentioned operations control a specified interval such as a 42.3[μm] pitch between the four light beam passage positions.

The following describes a third operation example of the light beam scanning apparatus.

Like the second operation example, the third operation example applies to a light beam scanning apparatus having the multi-beam optical system. In the third operation example, at least one of a plurality of light beams is fixed. Based on this fixed light beam passage position, the third operation example controls the remaining light beam passage positions to a specified pitch (relative position control).

Figure 11:
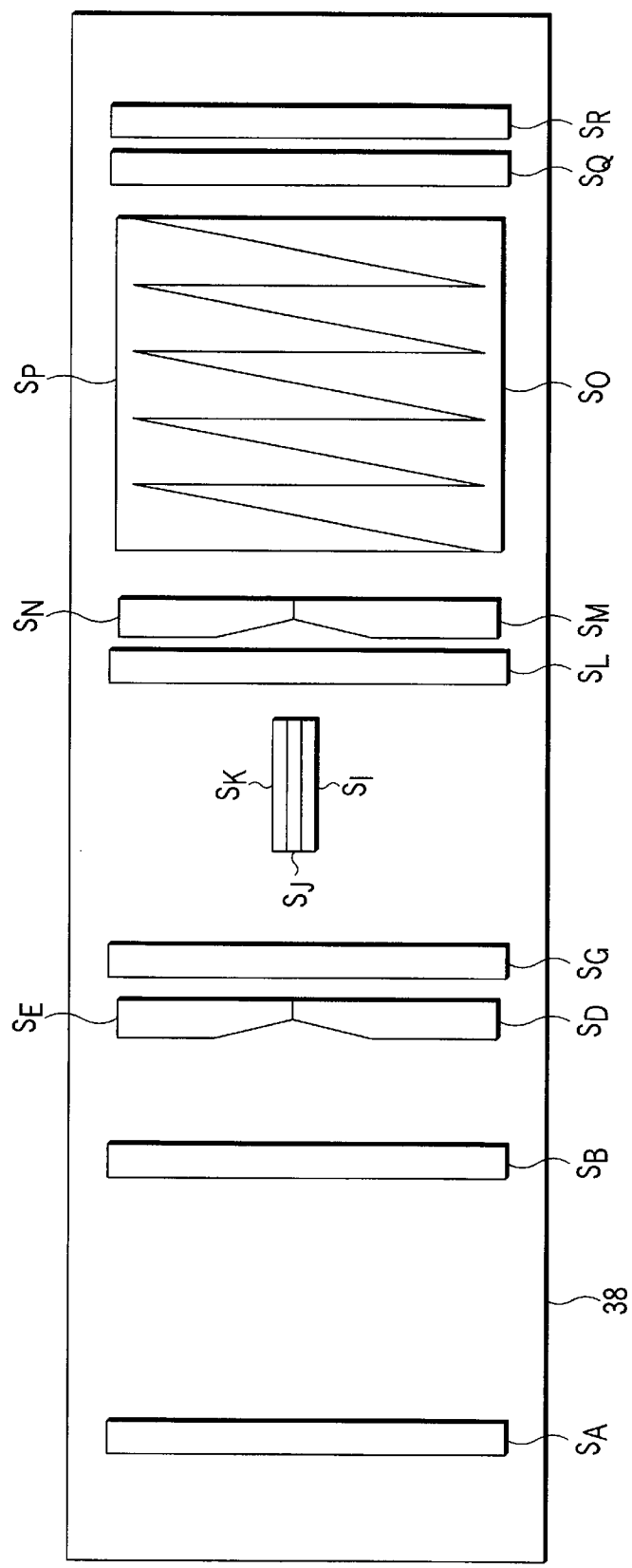
FIG. 11 shows a schematic configuration example of the beam detection section.

FIG. 11 shows a configuration of the light beam detection section 38. The light beam detection section 38 comprises sensors and sensor patterns configured on the support substrate 38a. Long sensors SA, SB, SG, SL, SQ, and SR are arranged in a direction orthogonal to the light beam scan direction. Long sensors SI, SJ, and SK are arranged in the light beam scan direction.

The sensors SP and SO are configured on a support substrate in the same manner as described for the first and second operation examples.

In FIG. 11, outputs from the two sensors SA and SL generate a reset signal for the integrator 62. Further, an output signal from the sensor SQ determines timing for converting an integration output (analog signal) to a digital signal. An output signal from the sensor SR determines timing for reading into the main control section 51.

The sensors SI, SJ, and SK adjust intervals between light beams in the sub-scanning direction. The sensors SI, SJ, and SK are approximately centered on the support substrate 38a in the sub-scanning direction and are placed parallel at a 42.3[$\mu$m] pitch (600 dpi resolution). A first passage target is a gap G1 between the sensors SJ and SK in the sub-scanning direction. The sensors SJ and SK are used for confirming that a light beam passes the first passage target. A second passage target is a gap G2 between the sensors SI and SJ in the sub-scanning direction. The sensors SI and SJ are used for confirming that a light beam passes the second passage target.

Sensors SD, SE, SM, and SN are patterns for detecting a relative inclination of the light beam to be scanned against the light beam detection section 38. The sensors SD and SE are placed vertically and are paired. Likewise, the sensors SM and SN are placed vertically and are paired. Centers of these pairs are positioned on the same line.

Figure 12:
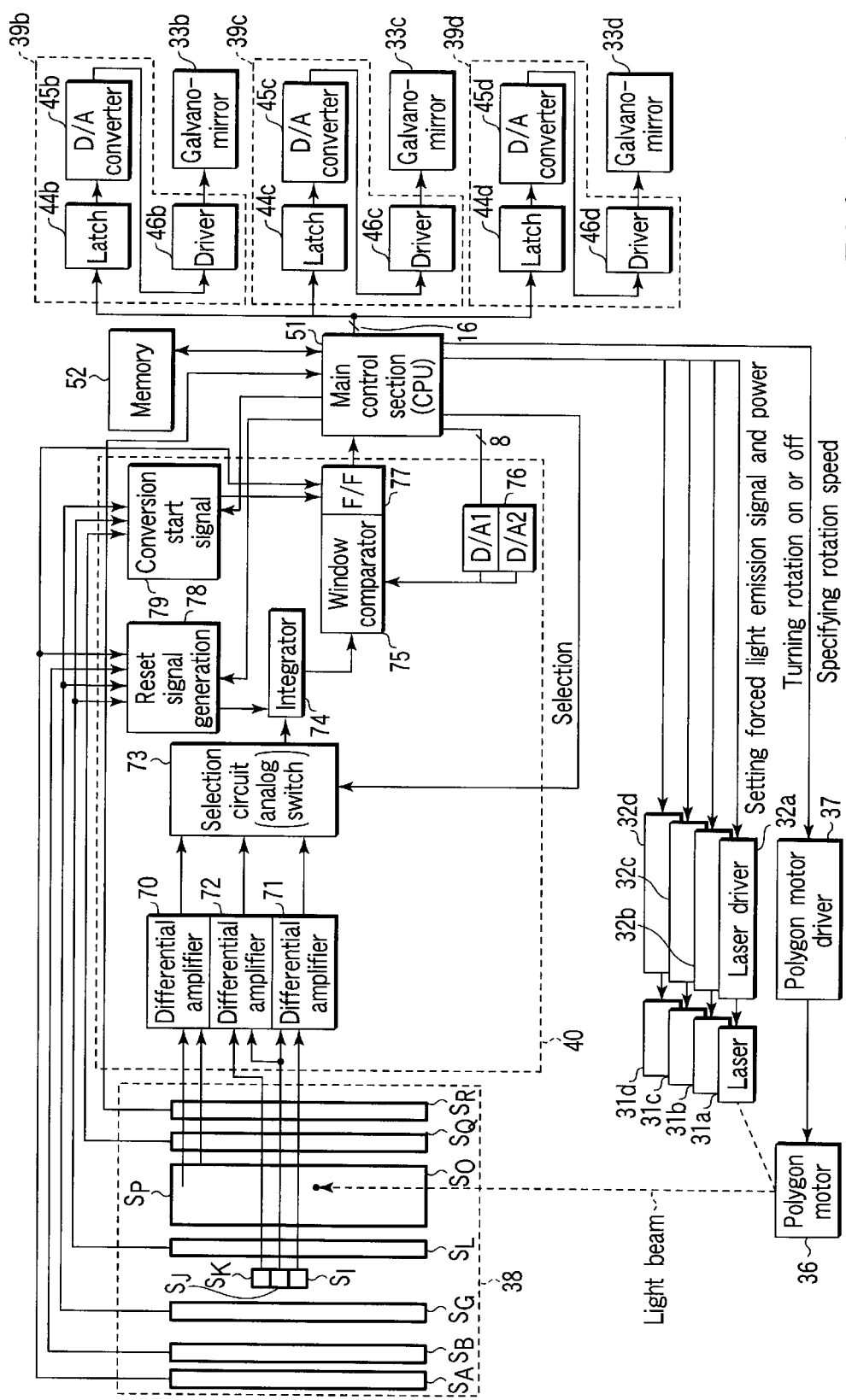
FIG. 12 is a block diagram schematically showing a configuration example of the optical control system.

FIG. 12 diagrams a configuration of the light beam detection section output processing circuit 40 using the light beam detection section 38 in FIG. 11 and peripheral sections for the light beam detection section output processing circuit 40 shown in FIGS. 2 and 3.

Output signals from the sensors SO and SP are input to corresponding input terminals of the differential amplifier 70. Output signals from the sensors SI and SJ are input to corresponding input terminals of the differential amplifier 71. Output signals from the sensors SJ and SK are input to corresponding input terminals of the differential amplifier 72. The main control section (CPU) 51 can set amplification factors for the differential amplifiers 70, 71, and 72.

Output signals from the differential amplifiers 70, 71, and 72 are sent to a selection circuit (analog switch) 73. Using a sensor selection signal from the main control section 51, the selection circuit (analog switch) 73 selects one of these output signals to be input to the integrator 74. The signal selected by the selection circuit 73 is input to the integrator 74 and is integrated here.

An output signal from the integrator 74 is input to a window comparator 75. The window comparator 75 converts an integration output (analog signal) from the integrator 74 to a digital signal. The window comparator 75 is provided with a threshold by the main control section 51 via a D/A converter 76. The D/A converter 76 comprises two D/A converter (D/A1 and D/A2).

An output from the window comparator 75 is sent to a flip-flop circuit (F/F) 77. The flip-flop circuit (F/F) 77 triggers an output from the window comparator 75. An output from the flip-flop circuit (F/F) 77 is sent to the main control section 51.

An output signal from the sensor SA is sent to a flip-flop circuit 77 as a clear signal. Output signals from the sensors SA, SH, and SL are sent to a reset signal generation circuit 78. In response to a selection signal from the main control section 51, the reset signal generation circuit 78 generates a reset signal from output signals of the sensors SA, SH, and SL. The integrator 74 is reset by the reset signal and starts integration.

Output signals of the sensors SL and SQ are sent to the conversion start signal circuit 79. In response to a selection signal from the main control section 51, the conversion start signal circuit 79 selects one of the output signals of the sensors SL and SQ. The selected signal is sent to the flip-flop circuit 77 as a conversion start signal. A sensor SR's output signal is sent to the main control section 51 as an interrupt signal.

After receiving the interrupt signal from the sensor SR, the main control section 51 reads an output from the flip-flop circuit 77 to obtain the latest light beam passage position information. Based on the thus obtained light beam passage position information, the main control section 51 operates control amounts for the galvanomirrors 33b, 33c, and 33d. The operation results are stored in memory 52 as needed and are sent to the galvanomirror drive circuits 39b, 39c, and 39d.

The galvanomirror drive circuits 39b, 39c, and 39d are provided with latches 44b, 44c, and 44d for maintaining the operation results. Once the main control section 51 writes data, these latches trigger the data until the data is updated next.

The data triggered by the latches 44b, 44c, and 44d is converted to an analog signal (voltage) by D/A converters 45b, 45c, and 45d and is input to drivers 46b, 46c, and 46d for driving galvanomirrors 33b, 33c, and 33d. The drivers 46b, 46c, and 46d drive the galvanomirrors 33b, 33c, and 33d according to the analog signals (voltages) input from the D/A converters 45b, 45c, and 45d.

Accordingly, this third operation example can control a light beam passage position by operating the semiconductor laser oscillator which generates a light beam to be controller, reading an output from the window comparator 75, and controlling the galvanomirrors 33b, 33c, and 33d based on the read information.

Though not shown in FIG. 12, there are provided a current/voltage conversion amplifier for converting an output current of each sensor to a voltage value and a signal processing circuit such as a binarization circuit for binarizing an output from the current/voltage conversion amplifier.

In the configuration of FIG. 12, when the sensors SP and SO are used for detecting and controlling a light beam passage position, the main control section 51 issues a selection signal to the selection circuit 73 for selecting the differential amplifier 70. By doing so, the main control section 51 selects the sensors SP and SO.

Likewise, the main control section 51 sends a sensor selection signal to the reset signal generation circuit 78 and the conversion start signal circuit 79. By doing so, the main control section 51 generates a reset signal for the integrator 74 and a digital/analog conversion start signal. The integrator 74's reset signal rises at the leading edge of a sensor SA output and falls at the trailing edge of a sensor SH output. The conversion start signal is generated from an output signal of the sensor SL.

When a light beam passage position is detected and controlled by using sensors SI and SJ or sensors SJ and SK, the main control section 51 sends a selection signal for selecting the differential amplifier 70 or 71 to the selection circuit 73. By doing so, the main control section 51 selects either a pair of sensors SI and SJ or a pair of sensors SJ and SK.

Likewise, the main control section 51 sends a sensor selection signal to the reset signal generation circuit 78 and the conversion start signal circuit 79. By doing so, the main control section 51 generates a reset signal for the integrator 74 and a digital/analog conversion start signal. In this case, the integrator 74's reset signal rises at the leading edge of a sensor SA output and falls at the trailing edge of a sensor SL output. The conversion start signal is generated from an output signal of the sensor SQ.

Whichever sensor is selected, the sensor SR's signal output timing is used for the main control section 51 to read an integration output of the integrator 74 triggered by the flip-flop circuit 77.

Figure 13:
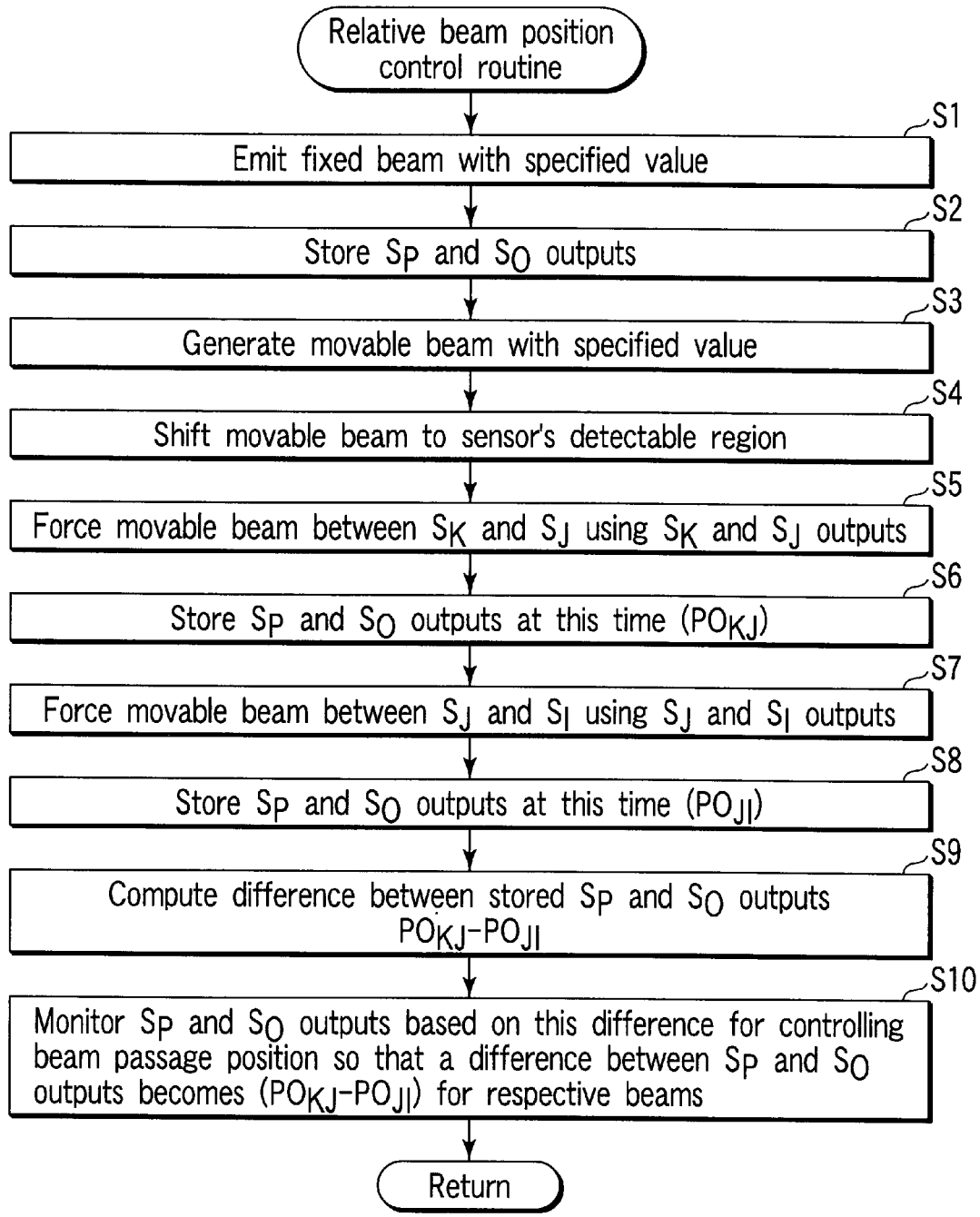
FIG. 13 is a flowchart showing an operation of relative beam position control.

As mentioned above, one of four light beams is fixed. Accordingly, three galvanomirrors move the remaining three light beams in the sub-scanning direction. Namely, the second, third, and fourth light beams correspond to the galvanomirrors 33b, 33c, and 33d, respectively Described below is relative position control of a light beam in the multi-beam optical system according to the third operation example with reference to the flowchart in FIG. 13. This flowchart explains operations of the circuits configured as shown in FIG. 12.

The main control section 51 generates a fixed light beam with a specified power (step S1). Namely, the main control section 51 sends a specified value to the first laser driver 32a to activate the first laser oscillator 31a with a specified power. By doing so, the main control section 51 outputs a first light beam. In addition, the main control section 51 rotates the polygon mirror 35.

The main control section 51 then issues a selection signal to the selection circuit 73 for selecting the differential amplifier 70. The main control section 51 thus sends a differential output between the sensors SP and SO to the integrator 74. Likewise, the main control section 51 sends a sensor selection signal to the reset signal generation circuit 78 and the conversion start signal circuit 79. By doing so, the main control section 51 generates a reset signal for integrating a differential signal between the sensors SP and SO and an analog/digital conversion start signal. This step allows the main control section 51 to incorporate a differential output between the sensors SP and SO.

After completion of the above setting, the main control section 51 reads a differential output between the sensors SP and SO (step S2). Namely, the main control section 51 detects a passage position of the first light beam (fixed light beam) as the reference using the differential output between the sensors SP and SO. Based on the first light beam's passage position detected at this step the following steps proceed so that the remaining three light beam passage positions provide a specified pitch, e.g., 42.3 µm.

The main control section 51 then generates the movable second light beam with a specified power (step S3). For example, the main control section 51 sends a specified value to the second laser driver 32b to activate the second laser oscillator 31b with a specified power.

The main control section 51 monitors a differential output between the sensors SP and SO. Therefore, the main control section 51 can keep track of the second light beam's passage position. The main control section 51 operates the galvanomirror 33b so that the second light beam passes within a detection region for the sensors SP and SO (step S4). Thereafter, the main control section 51 operates the galvanomirror 33b so that the second light beam passes near the center of the sensors SP and SO. It should be noted that high precision is not required for the light beam passage position adjustment at this step.

The main control section 51 controls. the second light beam coarse adjusted at step S4 so that its passage position is centered on a gap between the sensors SK and SJ (step S5). The sensors SI, SJ, and SK are arranged approximately centered between the sensors SP and SO.

Accordingly, the main control section 51 can center the light beam passage position on the gap between the sensors SK and SJ without excessively varying that position and consuming time. Detailed below is processing at step S5.

The main control section 51 sends a selection signal to the selection circuit 73 for selecting the differential amplifier 71. Doing so supplies the integrator 74 with a differential output between the sensors SK and SJ. Likewise, the main control section 51 sends a sensor selection signal to the reset signal generation circuit 78 and the conversion start signal circuit 79. By doing so, the main control section 51 generates a reset signal for integrating a differential signal between the sensors SK and SJ and an analog/digital conversion start signal. This setting enables the main control section 51 to incorporate the differential output between the sensors SK and SJ.

The main control section 51 then operates the galvanomirror 33b for the second light beam and provides control to center the second light beam passage position on the gap between the sensors SK and SJ. For operating the galvanomirror 33b, the main control section 51 first places a specified value in the D/A converter 45b.

A signal analog-converted by the D/A converter 45b is input to the driver 46b which outputs a current corresponding to the D/A converted value to the galvanomirror 33b. The galvanomirror 33b operates according to an output current value of the driver 46b. Accordingly, the main control section 51 can change the second light beam passage position by modifying the specified value for the D/A converter 45b.

The main control section 51 re-reads a differential output between the sensors SP and SO (step S6) without changing the setting for the galvanomirror 33b at step S5. The main control section 51 stores the value (POKJ) in the memory 52.

After the second light beam is centered on the gap between the sensors SK and SJ at step S6, the main control section 51 then centers this light beam on the gap between the sensors SJ and SI (step S7).

The main control section 51 sends a selection signal to the selection circuit 73 for selecting the differential amplifier 72. Doing so supplies the integrator 74 with a differential output between the sensors SJ and SI. Likewise, the main control section 51 sends a sensor selection signal to the reset signal generation circuit 78 and the conversion start signal circuit 79. By doing so, the main control section 51 generates a reset signal for integrating a differential signal between the sensors SJ and SI and an analog/digital conversion start signal. This setting enables the main control section 51 to incorporate the differential output between the sensors SJ and SI.

The main control section 51 operates the galvanomirror 33b for the second light beam to center the second light beam passage position on the gap between the sensors SJ and SP like step S5.

When the second light beam passes the center of the gap between the sensors SJ and SI, the main control section 51 re-reads a differential output between the sensors SP and SO and stores its value (POJI) in the memory 52 (step S8).

Then, the main control section 51 operates a difference between the value POKJ in the memory 52 stored at step S6 and the value POJI in the memory 52 stored at step S8 (step S9). A pitch of 42.3 μm is provided between the center of sensors SK and SJ and the center of sensors SJ and SI. When the light beam is moved from step S5 (step S6) to step S7 (step S8), the moving distance is equivalent to 42.3 μm. The difference between POKJ and POJI operated at this step equals the difference between differential outputs from the sensors SP and SO and is equivalent to the moving distance (42.3 μm) for the second light beam.

The main control section 51 then controls a pitch of 42.3 μm between the passage position of the fixed light beam (first light beam) and that of the moveable second light beam (step S10). This step uses a differential output between the sensors SP and SO.

The process at step S2 has already detected the passage position of the first light beam (fixed light beam). The main control section 51 operates the galvanomirror 33b to control the second light beam passage position so that the moveable second light beam passage position provides a pitch of 42.3 μm with reference to the first light beam.

The main control section 51 changes the second light beam passage position so that the value found at step S9 (POKJ–POJI) matches a difference between the differential value stored at step S2 and the differential value between the sensors SP and SO indicating the second light beam passage position.

The above-mentioned operation maintains a pitch of 42.3 μm between the first and second light beam passage positions. A similar operation provides a pitch of 42.3 μm between the third and fourth light beam passage positions.

Described below are fourth, fifth, and sixth operation examples.

When the first, second, and third operation examples are used to improve the detection accuracy maximumly, however, an integration output may become incorrect due to characteristics of an operational amplifier constituting the integrator.

Figure 15:
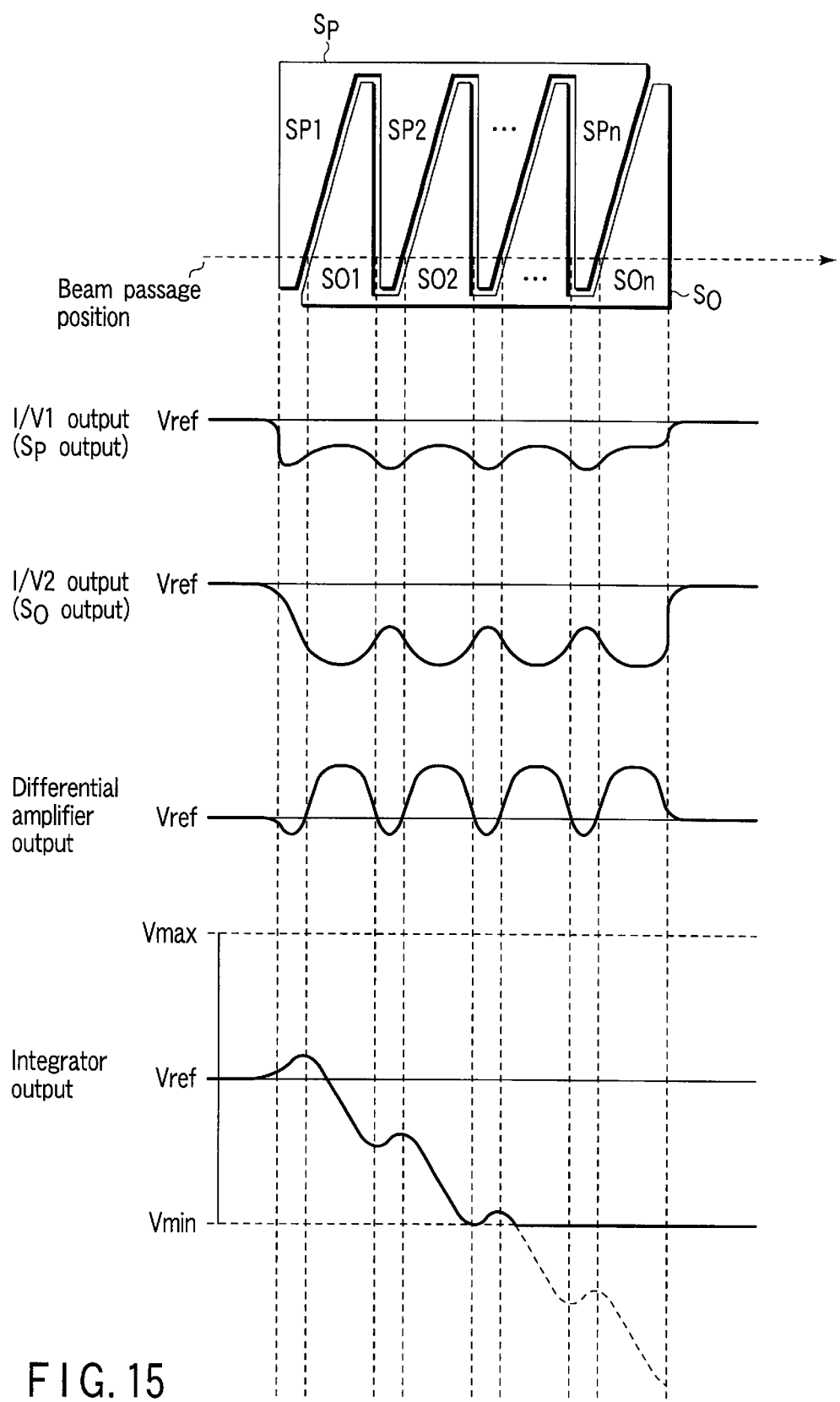
FIG. 15 exemplifies a sensor pattern output, a differential amplifier output, and an integrator output according to a light beam passage position.

For further improving the detection accuracy in FIG. 8, FIGS. 14 and 15 provide examples of increasing gains of the current/voltage conversion amplifiers (I/V1 and I/V2) and moreover sensitizing the integration constant RC. FIG. 14 shows that a light beam passes almost the center of the sensors SP and SO.

The example in FIG. 14 increases gains of the current/voltage conversion amplifiers (I/V1 and I/V2), also increasing amplitudes of outputs from the current/voltage conversion amplifiers I/V1 and I/V2 compared to those in FIG. 8. These outputs are current-voltage converted outputs from the sensors SP and SO. In addition, the differential amplifier 61 produces an increased output amplitude. Since the integration constant RC is set to a small value for more sensitivity, the integrator 62 produces an output several times larger than that in FIG. 8. Since the beam passage position approximately corresponds to the center position of the sensors SP and SO, an integration output finally becomes the reference voltage Vref.

FIG. 15 shows outputs from respective circuit components when the light beam passage position is shifted downward from the center. Since the light beam passage position is lowered, the sensor pattern SP outputs a decreased amplitude in the current/voltage conversion amplifier I/V1. By contrast, the sensor pattern SO outputs an increased output in the current/voltage conversion amplifier I/V2. Accordingly, an output of the differential amplifier 61 is largely measured above the Vref. When the integrator 62 integrates the differential amplifier 61's output, this means alternate integration of outputs from the sensors SP and SO. Since the sensor pattern SO produces a large output, the integration output is measured below the Vref.

When the power supply voltage is configured with a single power supply, an integration output becomes saturated and fixed near Vmin (ground), preventing further integration below Vmin. If there is no restrictions on a power supply voltage, for example, an integration operation should continue as indicated with a broken line in the figure. Actually, however, the integration stops at Vmin. This prevents a normal integration operation and accurate detection of a light beam passage position. It takes some time to restore a normal operation from this state. In the worst case, the power supply voltage needs to be removed temporarily. The same may occur when the light beam passes above the center in the figure. In this case, an integration output remains at Vmax, disabling a normal integration operation.

The fourth to sixth operation examples described below can solve this problem.

The fourth operation example of the light beam scanning apparatus is explained hereinafter.

The fourth operation example concerns an amplitude of an input signal to the integrator 62 for controlling an input signal amplitude. By doing this, the fourth operation example can prevent saturation of an output signal from the integrator 62 and provide a wide-range, high-precision light beam detection and control system.

FIG. 16 shows an example of controlling an amplitude of an input signal to the integrator 62 under the same conditions as in FIG. 14. In FIG. 16, a broken line indicates that no amplitude is controlled in an input signal to the integrator 62. A solid line indicates that an amplitude is controlled in that signal.

When the light beam scan position crosses below the center of a pair of sensors SO and SP, the lower sensor SO provides a greater output. As shown with a broken-line wave in FIG. 16, the integrator 62's output is fixed to Vmin when the lower sensor SO's output exceeds a specified value. This is because the sensor SO's output increases according to the amplitude and the time. Saturation of an integrator 62's output can be prevented by decreasing the output signal amplitude for the sensor SO to the extent that the integrator 62's output is not saturated.

In FIG. 16, the sensor SO's output is decreased to a signal level for VD3. As shown in FIG. 16, the differential amplifier 61's output level decreases from the state before correction (broken line) to the state after correction (solid line). Accordingly, the integrator 62's output is not saturated.

When the light beam passage position goes below the center of a pair of sensors SO and SP, saturation of an integrator 62's output, if any, is corrected so that the lower sensor SO decreases an output signal amplitude. When the light beam passage position goes above the center of a pair of sensors SO and SP, saturation of an integrator 62's output, if any, is corrected so that the upper sensor SP decreases an output signal amplitude. Thus, it is possible to provide control to produce a normal integrator output without saturating the integrator 62's output.

FIG. 17 shows how to correct an input signal to the integrator 62. In FIG. 17, a correction pulse is used for decreasing an output signal amplitude from the sensor SO. The correction pulse is removed from the sensor SO's output signal. This decreases an output signal amplitude from the sensor SO. At this time, the CPU 51 controls a correction pulse amplitude.

FIG. 18 is a block diagram showing a configuration example of the light beam scanning apparatus capable of providing control indicated with the solid lines in FIG. 16 or control in FIG. 17.

A difference between the circuit configurations in FIGS. 18 and 5 is that a correction pulse generation circuit 81, differential amplifiers 82 and 83, and a timing sensor SS are added in FIG. 18. The correction pulse generation circuit 81 generates a correction pulse.

The differential amplifier 82 or 83 is provided between the current/voltage conversion amplifier (I/V1 or IV2) and the differential amplifier 61. The timing sensor SS takes timing for generating a correction pulse. The mutually corresponding parts in FIGS. 5 and 18 are designated by the same reference numerals and a detailed description is omitted for simplicity.

Here, as shown in FIGS. 16 and 17, operations of the circuits in FIG. 18 are explained assuming that a light beam passes below the center of a pair of sensors SP and SO.

When the correction pulse generation circuit 81 sets the correction pulse to the reference (no correction), a normal beam detection is performed like the circuit in FIG. 5. According to this beam detection, the main control section (CPU) 51 is supplied with an output signal from the integrator 62 via the comparators (CMP1 and CMP2) and the flip-flop circuits (F/F1 and F/F2). The CPU 51 determines necessity of the correction depending on whether an integrator 62's output signal approaches the power supply voltage (Vmax) or the ground level (Vmin).

When the correction is determined to be needed, the CPU 51 determines which of a pair of sensors SP and SO requires an output correction. When an output signal from the integrator 62 approaches the power supply voltage (Vmax), the CPU 51 determines correction for the sensor SP's output. When an output signal from the integrator 62 approaches the ground level (Vmin), the CPU 51 determines correction for the sensor SO's output.

Namely, in the circuit of FIG. 18, the sensor SP's output is corrected when the output signal from the integrator 62 approaches the power supply voltage (Vmax). The sensor SO's output is corrected when the output signal from the integrator 62 approaches the ground level (Vmin).

In the cases of FIGS. 16 and 17, for example, the sensor SO's output is corrected in the circuit of FIG. 18. At this time, the CPU 51 reads output signals of the flip-flop circuits (F/F1 and F/F2) and determines that the output signal approaches Vmin and that the sensor SO's output needs to be corrected.

When determining correction of the sensor SO's output, the CPU 51 issues a control execution signal and a sensor selection signal. The control execution signal indicates that the correction control is applied to the correction pulse generation circuit 81. The sensor selection signal indicates an object to be corrected, namely the sensor SO's output to be corrected.

The CPU 15 sends D/A data indicating a correction pulse amplitude to the correction pulse generation circuit 81. A predefined data value is used for a value (D/A value) indicated by this D/A data. It may be preferable to settle the value indicated by the D/A data by gradually adjusting a given initial value.

The correction pulse generation circuit 81 is designed to supply a correction pulse to only outputs from the sensor SO based on an instruction from the CPU 51. A correction pulse signal for sensor SP outputs is set to the reference voltage. Accordingly, no correction is performed for outputs from the sensor SP.

After the above setup, the circuit in FIG. 18 performs correction when a light beam passes the sensor. When the light beam passes the sensor SS, the correction pulse generation circuit 81 generates the correction pulse (OPULS) as shown in FIG. 17. The generated correction pulse (OPULS) is input to the differential amplifier 83. The sensors SP and SO generate current outputs when the light beam passes. These current outputs from the sensors SP and SO are converted to voltage signals by the current/voltage conversion amplifiers (I/V1 and I/V2), and then are input to the differential amplifiers 82 and 83.

The differential amplifier 83 computes a difference between an output voltage from the current/voltage conversion amplifier (I/V2) for the sensor SO and a correction voltage as the correction pulse (OPULS) transmitted from the correction pulse generation circuit 81. The obtained difference becomes a voltage output VD3.

The differential amplifier 82 computes a difference between an output voltage from the current/voltage conversion amplifier (I/V1) for the sensor SP and the reference voltage (PPULS) transmitted from the correction pulse generation circuit 81. The obtained difference becomes a voltage output VD2. When a gain of the differential amplifier 82 is set once (x1), the VD2 equals an output voltage of the current/voltage converter (I/V1).

The differential amplifier 81 then computes a difference between the VD2 and the VD3. The computation result is input to the integrator 62 as an output voltage. The integrator 62 integrates the output voltage from the differential amplifier 81. The window comparator, the A/D converter, the flip-flop circuit, and the like operate the same as described in FIG. 5 and a detailed description is omitted here for simplicity.

Similarly, when the light beam passage position is above the sensor's center position, the CPU 51 allows the correction pulse generation circuit 81 to correct only outputs from the sensor SP. The correction pulse (PPULS) becomes a correction voltage as a correction value. The correction pulse (OPULS) functions as a reference voltage without correction. Consequently, only an output signal from the sensor SP is corrected.

As mentioned above, a correction pulse is used for control based on a correction value determined by the CPU so that an integrator output is not saturated. This makes it possible to normally generate an output signal indicating the light beam detection position without saturating an integrator output even if the current/voltage conversion amplifier's amplification factor is increased or the integrator's integration constant is sensitized.

The correction pulse generation circuit 81 is detailed below.

Figure 19:
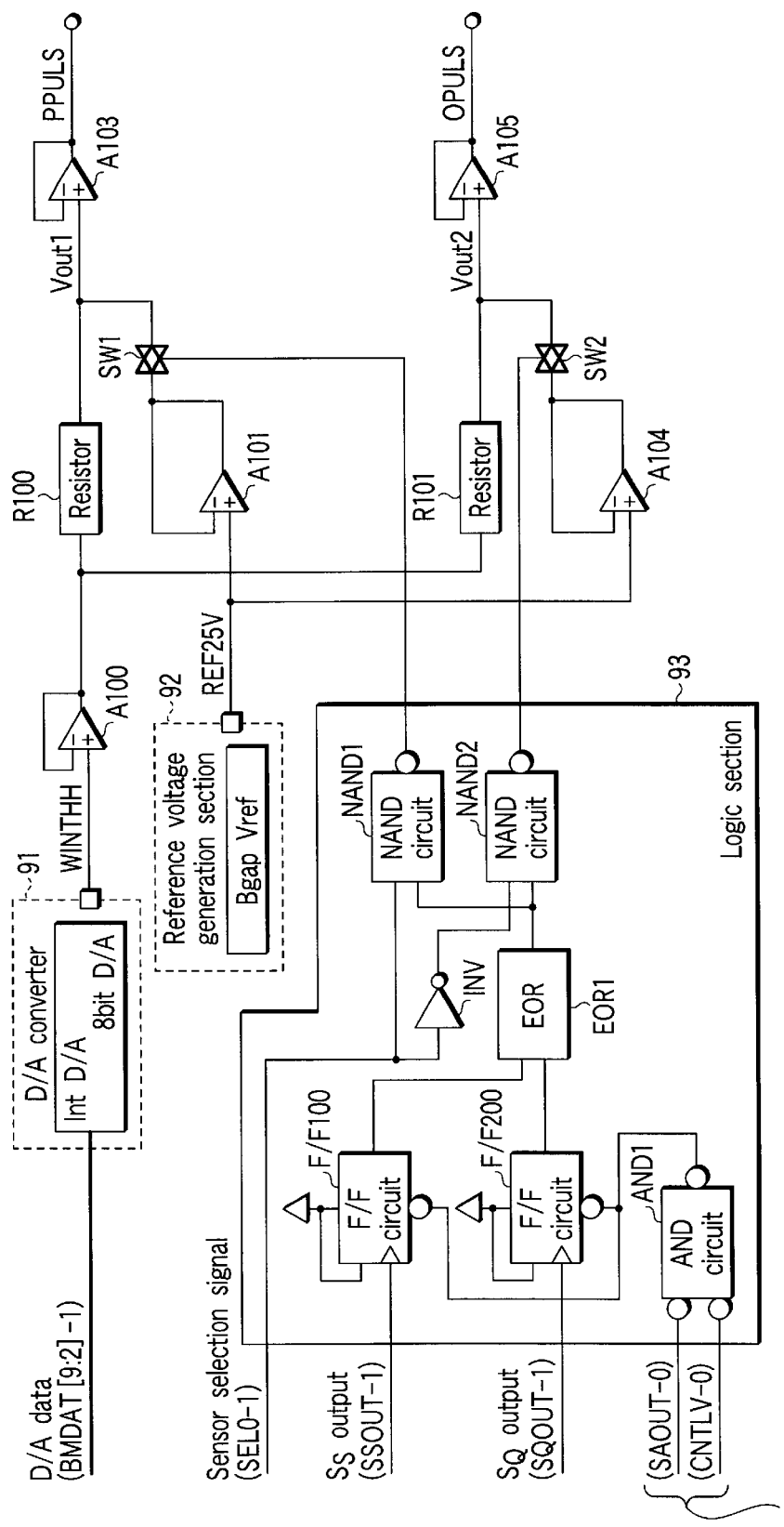
FIG. 19 shows a schematic configuration example of a correction pulse generation circuit.

FIG. 19 shows a configuration example of the correction pulse generation circuit 81. The correction pulse generation circuit 81 in FIG. 19 comprises a D/A converter 91, a reference voltage generation section 92, a logic section 93, resistors (R100, R101), operational amplifiers (A100, A101, A103, A104), analog switches (SW1, SW2), and the like.

The D/A converter 91 adjusts a correction pulse amplitude. Based on a digital signal supplied from the CPU 51, the D/A converter 91 generates an analog voltage and supplies it to the operational amplifier A100. The digital signal is digital data indicating an analog voltage to be generated.

The reference voltage generation section 92 generates and outputs a reference voltage in the correction pulse generation circuit 81. Since the example in FIG. 19 is a single power supply system of 0 to 5 V, the reference voltage generation section generates the 2.5 V reference voltage and supplies it to the succeeding stages.

The operational amplifiers (A100, A101, A103, A104) and the analog switches (SW1, SW2) generate correction pulses based on signals from the respective sections.

The logic circuit 93 comprises an AND circuit (AND1), flip-flop circuits (F/F100, F/F200), an exclusive OR circuit (EOR1), NAND circuits (NAND1, NAND2), and the like.

Based on a sensor selection signal (SEL0-1) from the CPU 51, the logic section 93 selects a sensor to be corrected. Based on execution signals (SAOUT-0, CNTLV-1) from the CPU 51, the logic section 93 determines whether to perform correction. Further, the logic section 93 toggles between analog switches SW1 and SW2 according to timings of a sensor SS output (SSOUT-1) and a sensor SQ output (SQOUT-1).

Described below are operations of the correction pulse generation circuit 81.

First described is a portion comprising the D/A converter 91, the operational amplifiers A100, A101, A103, the analog switch (SW1), the resistor (R100), and the reference voltage generation section 92. The circuit comprising these parts is a sensor SO's correction pulse generation section which generates the correction pulse (PPULS) for correcting sensor SP outputs.

The D/A converter 91 generates an analog voltage (WINTHH) based on the digital signal supplied from the CPU 51. The analog voltage generated from the D/A converter 91 is input to a noninverting terminal of the operational amplifier A100. The analog voltage generated from the D/A converter 91 adjusts a correction pulse amplitude.

The operational amplifier A100 is a voltage follower. Accordingly, an output of the D/A converter 91 is output from the operational amplifier A100 as is. The reference voltage generation section 92 supplies 2.5 V which is the reference voltage for the correction pulse generation circuit 81. This output (reference voltage) is supplied to a noninverting input terminal of the operational amplifier A101.

When the analog switch SW1 goes OPEN, an output of the operational amplifier A100 is output as the correction pulse (PPULS) for correcting sensor SP outputs via a voltage follower of the operational amplifier A103. Accordingly, when the analog switch SW1 goes OPEN, an analog voltage is output as the correction pulse (PPULS) from the D/A converter 91 based on D/A data supplied from the CPU 51.

When the analog switch SW1 goes CLOSE, the operational amplifier A101 functions so that the operational amplifier A101's inverting input terminal generates an electric potential of 2.5 V. Accordingly, the A103's noninverting input terminal also becomes 2.5 V. The operational amplifier A103's voltage follower outputs 2.5 V as PPULS. When the analog switch SW1 goes CLOSE, an output of the reference voltage generation section 92 is generated as PPULS from the A103.

By turning on or off the analog switch SW1 at a given timing, the PPULS can be selected as a reference voltage generation section 92's output (reference voltage) or a D/A converter 91's output (analog voltage specified by the CPU 51).

The portion comprising the D/A converter 91, the operational amplifier A100, A101, A103, the analog switch (SW1), the resistor (R100), and the reference voltage generation section 92 functions as a sensor SO's correction pulse generation section. This is a circuit which generates a correction pulse (OPULS) for correcting sensor SO outputs.

Like the sensor SP's correction pulse generation section, this sensor SO's correction pulse generation section also uses the operational amplifier A104 and the operational amplifier A105 to generate the correction pulse (OPULS). Namely, the operational amplifier A104 and the operational amplifier A105 operate like the operational amplifier A101 and the operational amplifier A103. Accordingly, by turning on or off the analog switch SW2 at a given timing, the OPULS can be selected as a reference voltage generation section 92's output (reference voltage) or a D/A converter 91's output (analog voltage specified by the CPU 51).

The analog switch turns on or off depending on timings at which the sensor selection signal, the sensor SS, and the sensor SQ occur.

When a sensor SO's output is corrected, the sensor selection signal (SELO-1) goes "1". This sets one input of the NAND circuit (NAND1) to "1" and one input of the NAND circuit (NAND2) to "0". Accordingly, an output of the NAND circuit (NAND1) depends on an EOR1 output. An output of the NAND circuit (NAND1) always goes 1 independently of the EOR1 output.

An output of the NAND circuit (NAND1) turns on or off the analog switch SW1 at output timings of the sensors SS and SQ. The analog switch SW2 always maintains the ON (CLOSE) state according to an output of the NAND circuit (NAND2). The PPUL, as an output signal of the operational amplifier A103, becomes a pulse signal at the timing output from the sensors SS and SQ. The OPULS, as an output signal of the operational amplifier A105, becomes an output voltage of the reference voltage generation section 92, namely 2.5 V.

The above-mentioned configuration makes it possible to generate any pulse signal during a period between the sensor SS's output timing and the sensor SQ's output timing.

Figure 20:
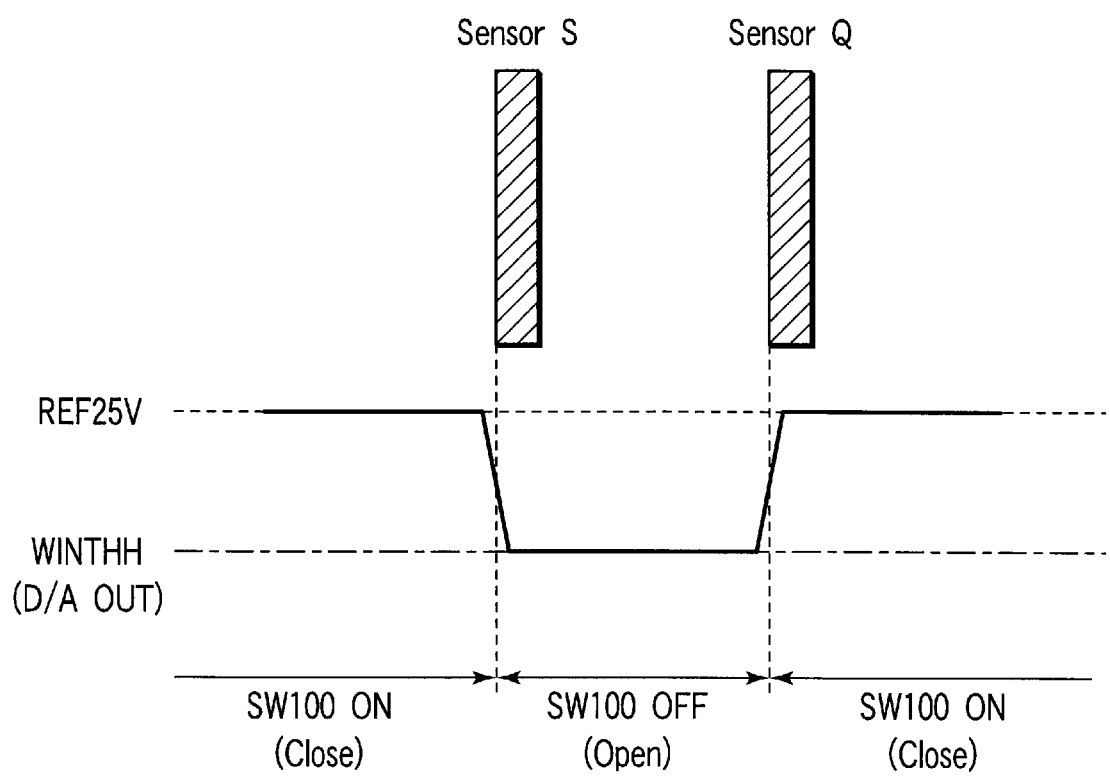
FIG. 20 shows relationship between a timing sensor and a correction pulse.

FIG. 20 shows the PPULS as an output signal of the operational amplifier A103. In this figure, the sensor SS output timing turns off the analog switch SW1. The PPULS changes from the reference voltage to the WINTHH. The sensor SQ output timing turns on the analog switch SW1. The PPULS changes from the WINTHH to the reference voltage.

Figure 21:
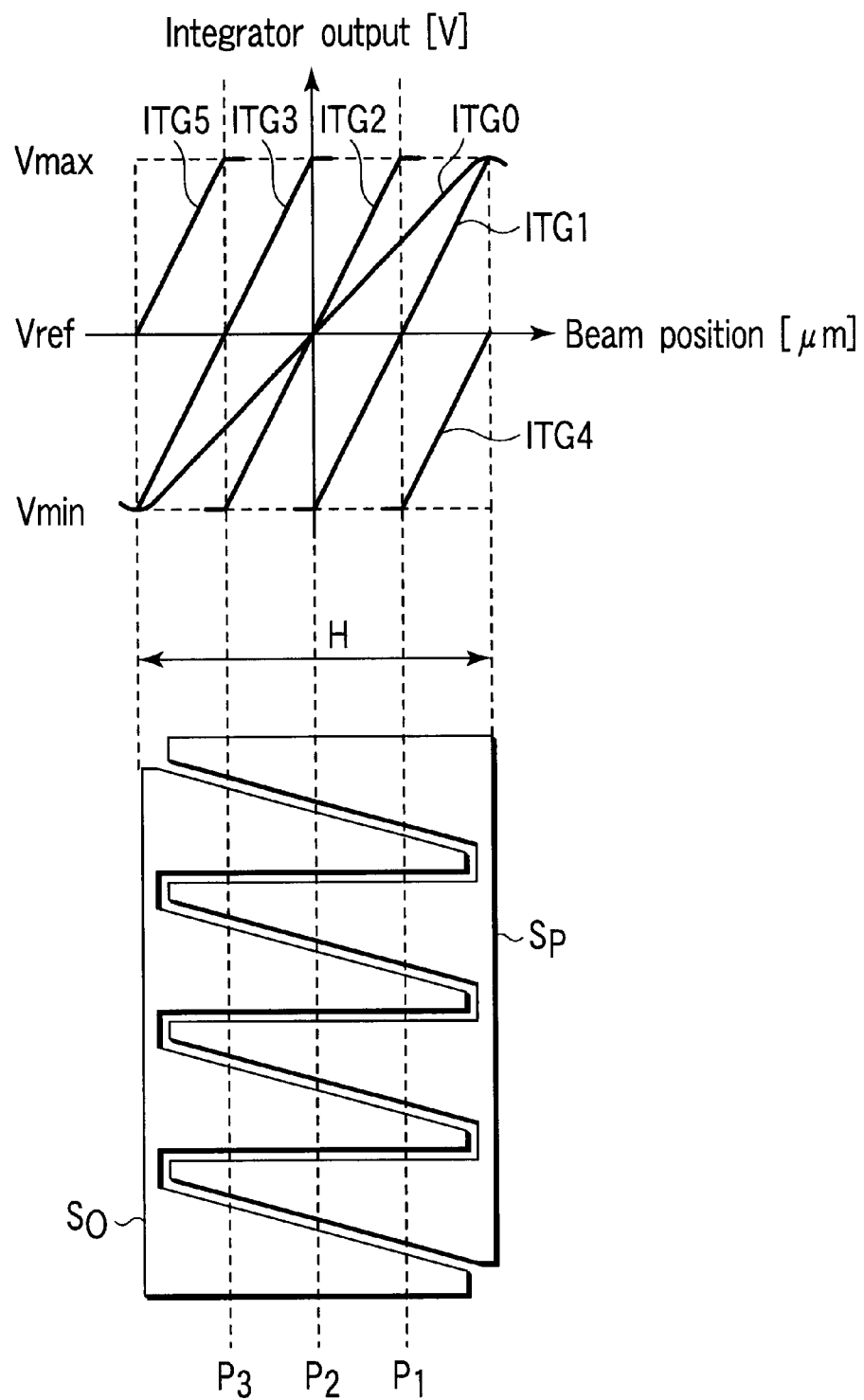
FIG. 21 shows relationship between a light beam passage position and an integration output.

FIG. 21 shows relationship between an integrator 62's output and the light beam passage position when the correction as described in the fourth embodiment is performed. As seen from this figure, an integrator 62's output is almost saturated at the light beam passage positions P1 and P3. When the light beam passes above (outside) the passage position P1 or below (outside) the passage position P3, the light beam passage position cannot be detected.

When a light beam passes the passage position P3, the integrator 62's output becomes ITG2 without correction.

The integrator 62's output becomes Vmin and approaches the saturation region. In this case, an ITG3's output can be obtained when an output from the sensor SO is corrected and the CPU 51 adjusts a specified value so as to approximate the integrator 62's output to be Vref. The ITG3 can detect a range of ±H/4 from the passage position P3 used as the center.

Similarly, when a light beam passes the passage position P1, correction is applied toward the sensor SP side. Also in this case, an ITG1 output can be obtained when the CPU 51 adjusts a specified value so as to approximate the integrator 62's output to be Vref. The ITG1 can detect a range of ±H/4 from the passage position P1 used as the center.

It may be preferable to predetermine the relationship between a value specified by the CPU 51 and the beam detection characteristic. According to the beam detection characteristic (integrator's output graph) as shown in FIG. 21, specified values are predetermined for providing detection characteristics of ITG1, ITG2, ITG3, ITG4, and ITG5. It is possible to detect light beam passage positions all over the sensor regions by using these five specified values and corresponding beam detection characteristics (integration characteristics). Predetermining specified values simplifies adjustment of these values and makes the management easy.

Described below are control operations of the main control section (CPU) 51 in the thus configured circuit.

Figure 22:
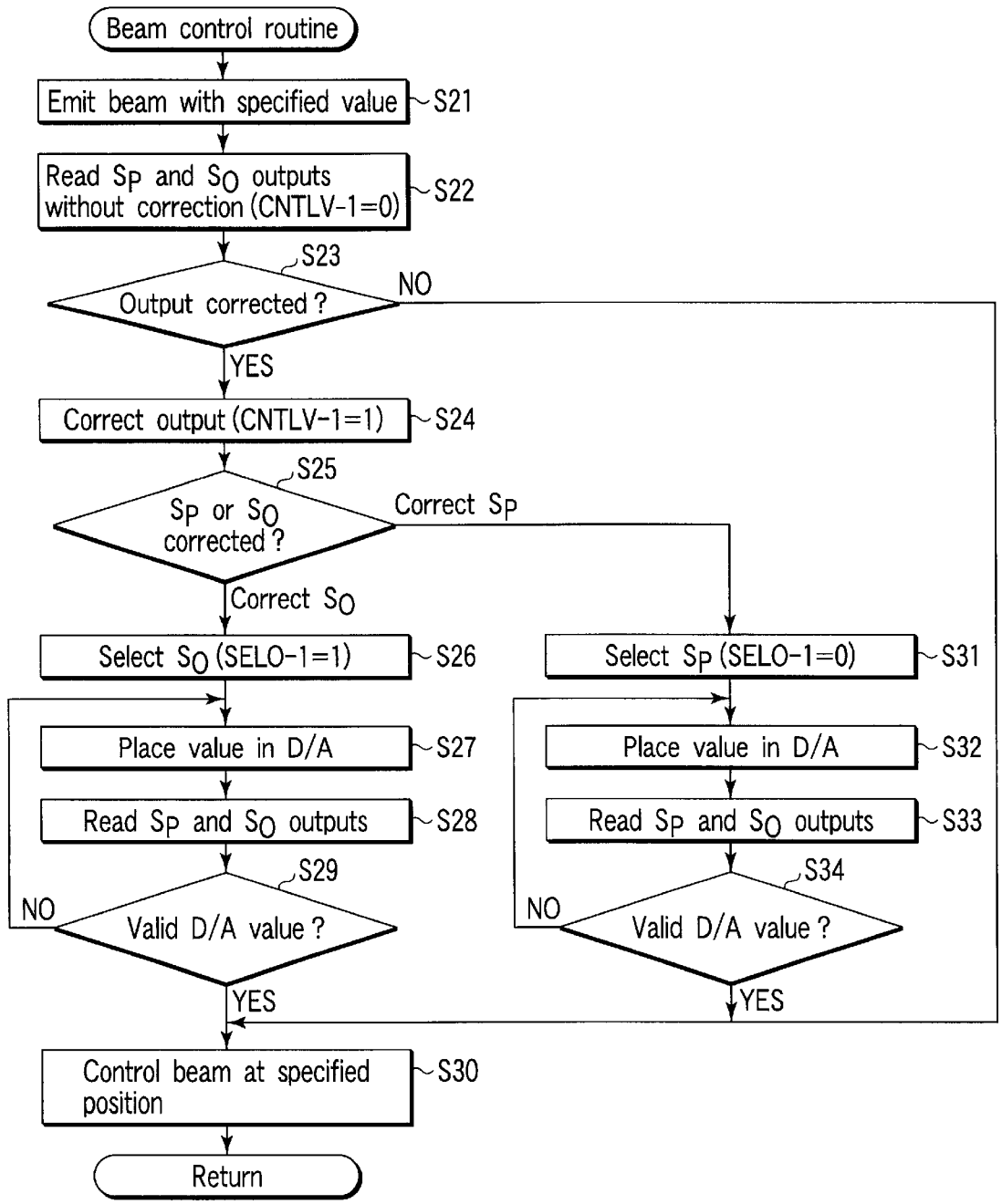
FIG. 22 is a flowchart showing an operation of light beam control.

FIG. 22 is a flowchart for explaining CPU 51's control operations.

The CPU 51 first generates a light beam with a specified value (step S21). When the light beam is generated, the CPU 51 reads an output signal from the sensors SP and SO without correction (step S22). At this time, the CPU 51 sets the control execution signal (CNTLV-1) to "0" for operating the circuit without correction.

When reading output signals from sensors SP and SO, the CPU 51 determines the necessity of correction based on output signal values (step S23). When it is determined that the correction is needed (YES at step S23), the CPU 51 sets the control execution signal (CNTLV-1) to "1" (step S24). Based on the read data, the CPU 51 determines whether to correct the sensor SP's output or the sensor SO's output (step S25).

When the sensor SO's output is determined to be corrected, the CPU 51 sets SEL0-1 to "1" which is a sensor selection signal to be corrected (step S26). The CPU 51 sets a specified value supplied to the D/A converter 91 according to an output signal value of the sensor SO (step S27). At this time, the CPU 51 sets predefined specified values for ITG1 to ITG5 as shown in FIG. 21, for example.

After supplying these signals to the correction pulse generation circuit 81, the CPU 51 rereads output signals from the sensors SP and SO (step S28). According to the read values for the sensors SO and SP, the CPU 51 checks if the specified values are set correctly (step S29). When it is determined that the specified values are incorrect, the CPU 51 returns to step S27 to reset the specified values. When it is determined that the specified values are proper (YES at step S29) or that no correction is performed (NO at step 23), the CPU 51 determines the detection result about the light beam position. Based on this determination, the CPU 51 controls the light beam to a specified position (step S30).

When it is determined that the sensor SP's output is corrected at step S23, the CPU 51 sets SEL0-1 to "0" which is a sensor selection signal indicating an object to be corrected (step S31). According to the sensor SP's output signal value, the CPU 51 sets a specified value supplied to the D/A converter 91 (step S32). At this time, the CPU 51 sets predefined specified values for ITG1 to ITG5 as shown in FIG. 21, for example.

After supplying these signals to the correction pulse generation circuit 81, the CPU 51 rereads output signals from the sensors SP and SO (step S33). According to the read values for the sensors SO and SP, the CPU 51 checks if the specified values are set correctly (step S34). When it is determined that the specified values are incorrect, the CPU 51 returns to step S32 to reset the specified values. When it is determined that the specified values are proper (YES at step S34), the CPU 51 determines the detection result about the light beam position. Based on this determination, the CPU 51 controls the light beam to a specified position (step S30).

The fifth operation example of the light beam scanning apparatus is explained hereinafter.

The fifth operation example-applies the correction function in the fourth operation example to a light beam scanning apparatus according to the multi-beam optical system.

Figure 23:
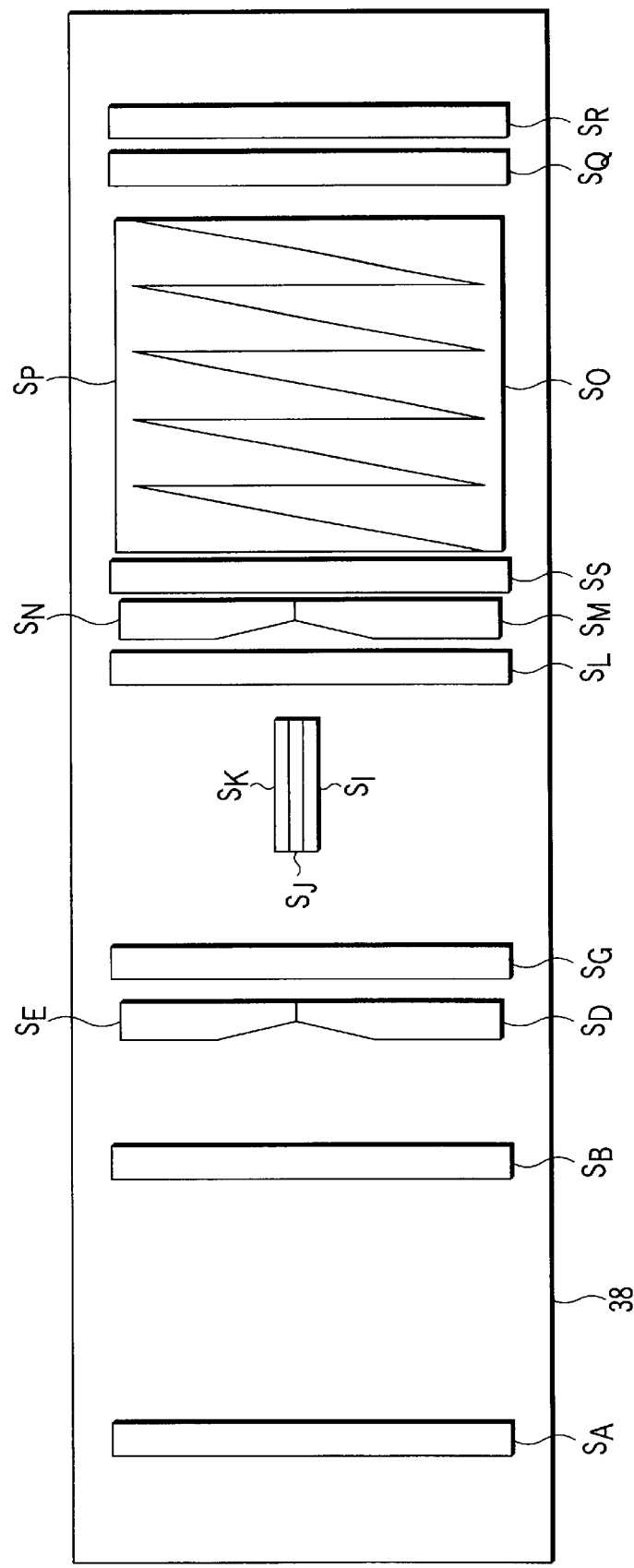
FIG. 23 shows a schematic configuration example of the beam detection section.

FIG. 23 shows a configuration example for providing the fifth operation example. A difference between FIGS. 23 and 8 is that a timing sensor SS is added in FIG. 23 for generating a correction pulse. Except the timing sensor SS, the mutually corresponding parts in FIGS. 8 and 23 are designated by the same reference numerals and a description is omitted for simplicity.

Described below is the multi-beam passage position control using the light beam detection section 38 in FIG. 23. The following description assumes a 4-beam multi-beam optical system having four laser oscillators and four actuators (galvanomirrors in this example) for moving respective light beams in the sub-scanning direction. This multi-beam optical system is assumed to provide the 600 dpi resolution.

As mentioned in the fourth operation example, the light beam detection section 38 has the detection characteristic as shown in FIG. 21. When the sensor's effective detection region is assumed to be H[$\mu$m] in FIG. 21, a voltage value equivalent to 1[$\mu$m] is (|Vmax−Vmin|)/(H/2)=Vunit[V/$\mu$m]. In FIG. 21, ITG1 to ITG5 as output integrator's output characteristics should have voltage values equivalent to (|Vmax−Vmin|)/(H/2)=V unit[V/$\mu$m] per 1[$\mu$m]. In order to provide a pitch of 600 dpi=42.3 $\mu$m for a plurality of beams, galvanomirrors should be adjusted so that an integration output difference between beams becomes Vinit×42.3[V]. This means controlling a beam actuator.

To set a passage target position of the first light beam to P2, for example, the main control section 51 activates the first laser oscillator to rotate a polygon mirror. Then, the main control section 51 operates the galvanomirror for the first light beam so that the light beam can pass within the sensor. After the light beam successfully passes within the sensor, the main control section 51 uses the galvanomirror to adjust the first light beam passage position so that the integration output becomes Vref.

Then, the main control section 51 adjusts the second light beam passage position. The main control section 51 activates the second laser oscillator to rotate a polygon mirror. Like the first light beam, the main control section 51 operates the galvanomirror for the second light beam so that the light beam can pass within the sensor. Thereafter, the main control section 51 uses the galvanomirror for the second light beam to adjust the second light beam passage position so that the integrator output becomes Vref−Vunit×42.3[V].

These operations control and provide a pitch of 42.3[$\mu$m] between the first and second light beam passage positions. A similar operation is used for the third and fourth light beams. Namely, the galvanomirror for the third or fourth light beam is adjusted so that a difference between integration outputs of adjacent light beams becomes Vunit×42.3[V] equivalent to 42.3[μm].

The above operations provide control to maintain a pitch of 42.3[μm] between four light beam passage positions. Thus, it is possible to control four light beam passage positions to a specified pitch.

The sixth operation example of the light beam scanning apparatus is explained hereinafter.

The sixth operation example uses a fixed light beam passage position as a reference in a light beam scanning apparatus having the multi-beam optical system. Based on this, the operation example controls the remaining light beam passage positions to a specified pitch (relative position control).

FIG. 24 is a block diagram showing a configuration example for implementing the sixth operation example.

A difference between the circuits in FIGS. 24 and 12 is that the circuit in FIG. 24 differs from that in FIG. 12 in that differential amplifiers 102 and 103 are added before the differential amplifier 61. Further, there are added a timing sensor SS and a correction pulse generation circuit 101 for generating a correction pulse. Except these differences, the configuration is same as that in FIG. 12. Therefore, the same parts or components are depicted by the same reference numerals and a detailed description is omitted for simplicity. The correction pulse generation circuit 101 and the differential amplifiers 102 and 103 operate the same as the correction pulse generation circuit 81 and the differential amplifiers 82 and 83 described in the fifth operation example.

In the circuit of FIG. 24, the correction pulse generation circuit 101 connects with the main control section 51 and the timing sensors SS and SQ. The differential amplifiers 102 and 103 connect with the sensors SO and SP, respectively.

In the circuit of FIG. 24, an output of the integrator 74 is input to the main control section 51 based on the light beam position according to the same operation as in FIG. 12. Based on the integrator 74's output, the main control section 51 determines the necessity of correction. When determining the necessity of correction, the main control section 51 selects a sensor to be corrected and sets a specified value for indicating the correction pulse value as a correction amount. At this time, the main control section 51 outputs a control execution signal indicating that the correction control is performed, a sensor selection signal indicating the sensor to be corrected, and the specified value indicating the correction pulse value to the correction pulse generation circuit 101. The main control section 51 sends a control signal to the selection circuit 73 for selecting the differential amplifier 70.

The correction pulse generation circuit 101 sets a correction pulse with a voltage value specified by the CPU 51. This data is contained in the differential amplifier 102 (or 103) connected to the sensor SO (or SP) selected by the sensor selection signal from the main control section 51. A correction pulse is set to the reference voltage for the differential amplifier 103 (or 102) connected to sensor Sp (or So) not selected by the sensor selection signal. The correction pulse is supplied to the differential amplifiers 102 and 103 at the timing when the timing sensor SS detects a light beam.

When supplied with the correction pulses, the differential amplifiers 102 and 103 provide the differential amplifier 70 with a difference between the correction pulse and the sensor SO or SP whose output signal is input to either of the differential amplifiers. According to this operation, the differential amplifier 70 is supplied with output signals from the sensors SO and SP. At this time, these output signals are corrected with the value set by the main control section 51.

Detailed operations of the sixth operation example are described with reference to FIGS. 25 and 26.

Figure 25:
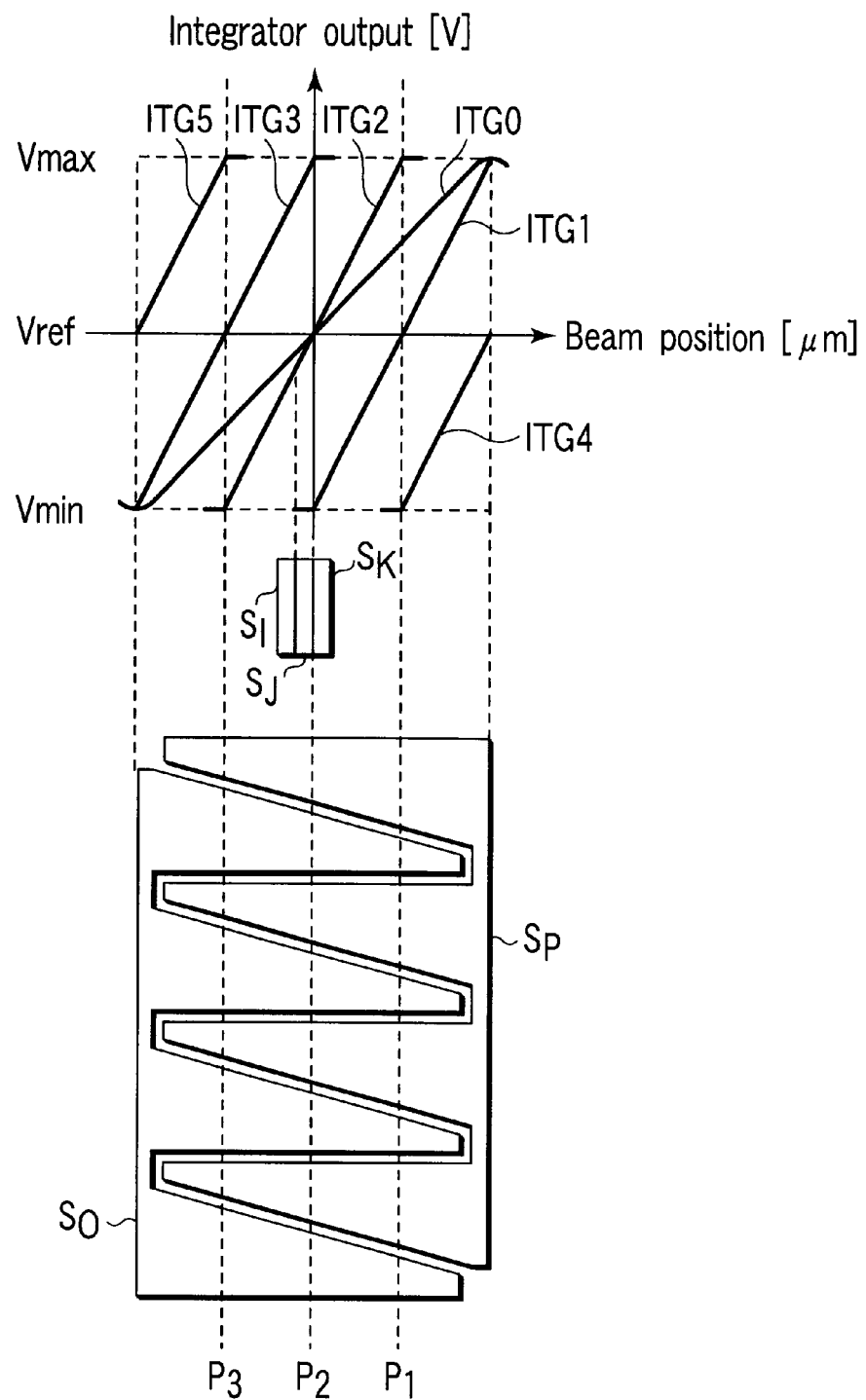
FIG. 25 shows relationship between a light beam passage position and an integration output.

FIG. 25 shows relationship between a light beam passage position and an integration output on the sensors SP and SO. Integrator outputs based on outputs from the sensors SP and SO have characteristics ITG1 to ITG5 according to correction pulses from the correction pulse generation circuit 81. It should be noted that the ITG2 is an integration output (beam detection characteristic) when no correction is performed.

Figure 26:
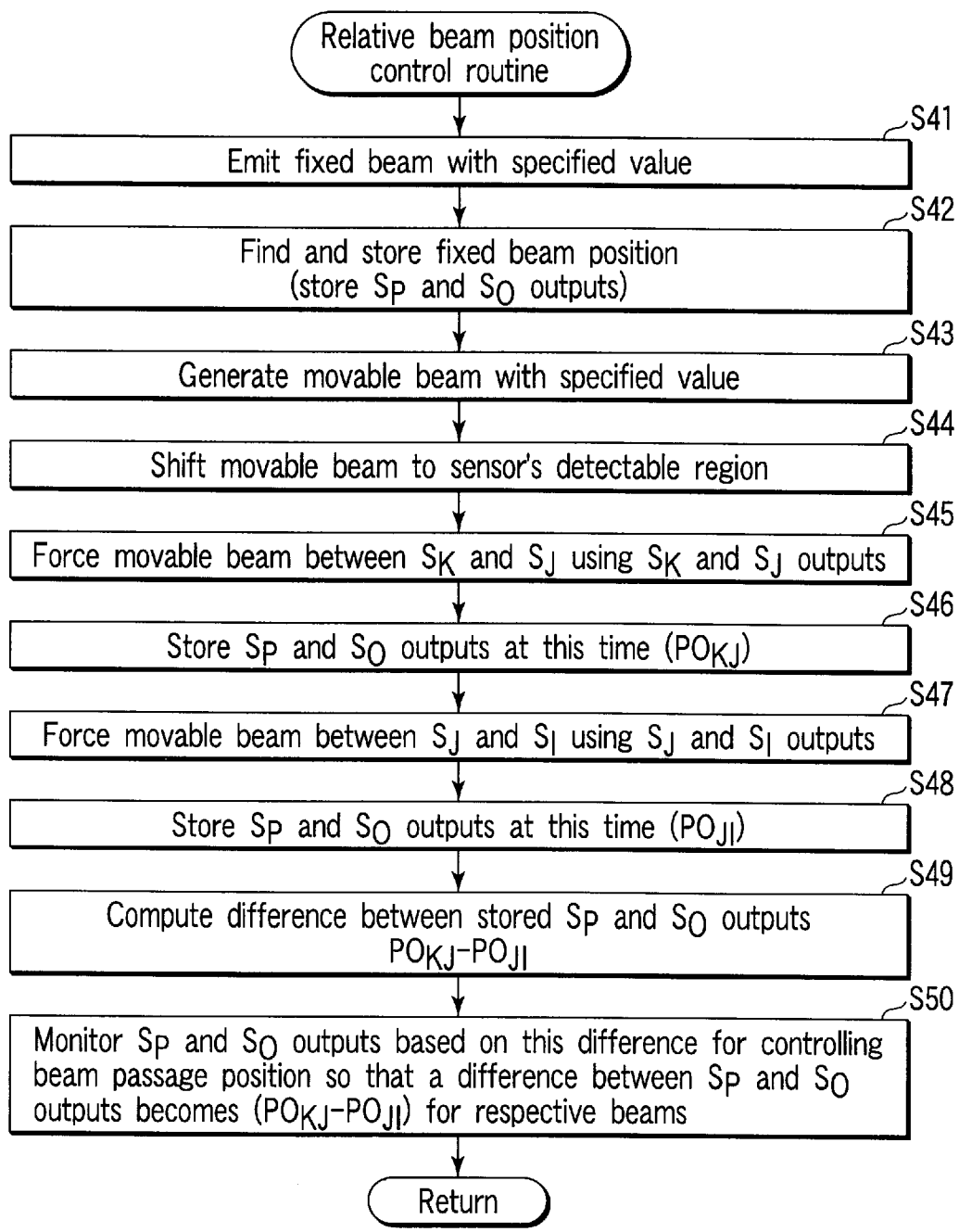
FIG. 26 is a flowchart showing an operation of relative beam position control.

FIG. 26 is a flowchart showing the relative position control of light beams in the multi-beam optical system according to the sixth operation example. The flowchart in FIG. 26 shows operations of the circuit as configured in FIG. 24.

First, the CPU 51 generates a fixed laser beam with a specified value (step S41). For example, the main control section 51 sends a specified value to the first laser driver 32a to generate the first laser oscillator 31a with a specified power. By doing so, the main control section 51 outputs the first light beam. It is assumed that the polygon mirror already rotates.

The main control section 51 then selects a specified value as the correction value and sends this value to the correction pulse generation circuit 101. When P1 is assumed to be a position where a fixed beam passes in FIG. 25, for example, the CPU 51 sets the specified value so that the ITG1 characteristic is selected.

Concurrently, the main control section 51 sends a selection signal to the selection circuit 73 for selecting the differential amplifier 70. By doing so, the main control section 51 sends a differential output between the sensor patterns SP and SO to the integrator 74.

Likewise, the main control section 51 sends a sensor selection signal to the reset signal generation circuit 78 and conversion start signal circuit 79. By doing so, the main control section 51 generates a reset signal and an analog/digital conversion start signal for integrating a differential signal between the sensors SP and SO. This step enables the main control section 51 to incorporate a differential output between the sensors SP and SO.

The light beam detection section output processing circuit 40 outputs an output signal to the CPU 51 corresponding to the passage position of the fixed beam detected by the light beam detection section 38 having the sensors SO and SP. The CPU 51 determines a detection characteristic based on the correction value determined by the specified value supplied to the light beam detection section output processing circuit 40. The CPU 51 detects the fixed beam's passage position based on the detection characteristic for the thus determined specified value and the output signal from the light beam detection section output processing circuit 40. The CPU 51 records the passage position of the detected fixed beam in the memory 52 (step S42).

When the specified value to be the ITG1 characteristic is selected in FIG. 25, for example, the CPU 51 determines ITG1 to be the detection characteristic. The CPU 51 detects the fixed beam's passage position based on the thus determined ITG1 characteristic and the output signal from the light beam detection section output processing circuit 40.

The following steps provide control so that the other three light beam passage positions maintain a specified pitch, e.g., a 42.3 μm pitch with reference to the first light beam passage position detected at this step S42.

The main control section 51 then generates a movable second light beam with a specified power (step S43). For example, the main control section 51 sends a specified value to the second laser driver 32*b* to generate the second laser oscillator 31*b* with a specified power.

Likewise, the main control section 51 selects appropriate specified data and monitors a differential output between the sensor SP and SO according to the detection characteristic based on that specified value. Accordingly, the main control section 51 can identify the second light beam passage position. The main control section 51 operates the galvanomirror 33*b* so that the second light beam can pass within a detection region of the sensors SP and SO (step S44). Thereafter, the main control section 51 operates the galvanomirror 33*b* so that the second light beam passes near the center of the sensors SP and SO. It should be noted that high precision is not required for the light beam passage position adjustment at this step.

The main control section 51 controls the second light beam coarse adjusted at step S4 so that its passage position is centered on a gap between the sensors SK and SJ. The sensors SI, SJ, and SK are approximately centered between the sensors SP and SO. Accordingly, the main control section 51 can center the light beam passage position on the gap between the sensors SK and SJ without excessively varying that position and consuming time. Detailed below is processing at step S45.

The main control section 51 sends a selection signal to the selection circuit 73 for selecting the differential amplifier 71. Doing so supplies the integrator 74 with a differential output between the sensors SK and SJ. Likewise, the main control section 51 sends a sensor selection signal to the reset signal generation circuit 78 and the conversion start signal circuit 79. By doing so, the main control section 51 generates a reset signal for integrating a differential signal between the sensors SK and SJ and an analog/digital conversion start signal. This setting enables the main control section 51 to incorporate the differential output between the sensors SK and SJ.

The main control section 51 then operates the galvanomirror 33*b* for the second light beam and provides control to center the second light beam passage position on the gap between the sensors SK and SJ. For operating the galvanomirror 33*b*, the main control section 51 first places a specified value in the D/A converter 45*b*. A signal analog-converted by the D/A converter 45*b* is input to the driver 46*b* which outputs a current corresponding to the D/A converted value to the galvanomirror 33*b*. The galvanomirror 33*b* operates according to an output current value of the driver 46*b*. Accordingly, the main control section 51 can change the second light beam passage position by modifying the specified value to the D/A converter 45*b*.

The main control section 51 re-reads a differential output between the sensors SP and SO without changing the setting for the galvanomirror 33*b* at step S45. At this time, the main control section 51 selects no correction and detects a light beam position according to the ITG2 characteristic shown in FIG. 25. This is because the sensors SI, SK, and SJ are approximately arranged at the center of the sensors SP and SO, eliminating the need for correction. When the light beam is centered on the gap between sensors SK and SJ according to this position detection, the main control section 51 stores the output value (POKJ) of the processing circuit 40 in the memory 52 (step S46). The POKJ value becomes the processing circuit 40's output value indicating that the light beam passage position is centered on the gap between sensors SK and SJ.

After the second light beam is centered on the gap between the sensors SK and SJ at step S46, the main control section 51 then centers this light beam on the gap between the sensors SJ and SI at step S47.

The main control section 51 sends a selection signal to the selection circuit 73 for selecting the differential amplifier 72. Doing so supplies the integrator 74 with a differential output between the sensors SJ and SI. Likewise, the main control section 51 sends a sensor selection signal to the reset signal generation circuit 78 and the conversion start signal circuit 79. By doing so, the main control section 51 generates a reset signal for integrating a differential signal between the sensors SJ and SI and an analog/digital conversion start signal. This setting enables the main control section 51 to incorporate the differential output between the sensors SJ and SI.

The main control section 51 operates the galvanomirror 33*b* for the second light beam to center the second light beam passage position on the gap between the sensors SJ and SP like step S45.

When the second light beam passes the center of the gap between the sensors SJ and SI, the main control section 51 re-reads a differential output between the sensors SP and SO. At this time, the main control section 51 selects no correction as a D/A value and detects a light beam position according to the ITG2 characteristic shown in FIG. 25. This is because the sensors SI, SK, and SJ are approximately arranged at the center of the sensors SP and SO, eliminating the need for correction. When the light beam is centered on the gap between sensors SJ and SI according to this position detection, the main control section 51 stores the output value (POJI) of the processing circuit 40 in the memory 52 (step S48). The POJI value becomes the processing circuit 40's output value indicating that the light beam passage position is centered on the gap between sensors SJ and SI.

Then, the main control section 51 operates a difference between the value POKJ in the memory 52 stored at step S46 and the value POJI in the memory 52 stored at step S48 (step S49). A pitch of 42.3 μm is provided between the center of sensors SK and SJ and the center of sensors SJ and SI. When the light beam is moved from step S45 (step S46) to step S47 (step S48), the moving distance is equivalent to 42.3 μm. The difference between POKJ and POJI operated at this step S49 equals the difference between differential outputs from the sensors SP and SO and is equivalent to the moving distance (42.3 μm) for the second light beam.

The sixth operation example detects a light beam position by using a detection characteristic corresponding to the specified value defined by the CPU 51. In order to implement a specified pitch (42.3 μm) as a relative distance between the first and second light beams, the position of the second light beam must be controlled based on the detection characteristic (ITG1) selected at step S42.

Namely, by setting the specified value selected at step S42, the second light beam is controlled so that its output becomes (the value stored in the memory 52 at step S42)–(POKJ–POJI). This provides the specified pitch (42.3 μm) between the passage position of the fixed light beam (first light beam) and the passage position of the moveable light beam (second light beam). The processing at this step uses a differential output between the sensors SP and SO.

The passage position of the fixed light beam (first light beam) is detected at step S42 and is stored in the memory 52.

The main control section 51 operates the galvanomirror 33b to control the second light beam's passage position so that the passage position of the moveable second light beam provides the 42.3 µm pitch with reference to the first light beam.

Namely, the main control section first provides the processing circuit 40 with the D/A value similar to step S42 for generating the second light beam. The main control section 51 then changes the second light beam passage position so that the processing circuit 40's output value indicating the second light beam passage position matches a value obtained by subtracting the value (POKJ-POJI) found at step S49 from the value in the memory 52 stored at step S42.

The above-mentioned operation maintains a pitch of 42.3 µm between the first and second light beam passage positions. A similar operation provides a pitch of 42.3 µm between the third and fourth light beam passage positions.

There has been described the mechanism of detecting relative positions of light beams in the light beam scanning apparatus having the multi-beam optical system.

The following describes in detail first to sixth embodiments according to the present invention applied to the above-mentioned light beam scanning apparatus.

Described below is the first embodiment.

FIG. 27 shows a reference detection characteristic without correction (reference voltage) described in FIGS. 21 and 22. In the description to follow, the reference detection characteristic signifies a relative position detection characteristic without correction. In FIG. 27, a shaded portion indicates a range capable of detecting a light beam. Here, the range from Vmin to Vmax is described as a detection range though this is not an actual range. An actual detection range will be described later with reference to FIG. 31.

When a fixed beam Bf scans within the detection range according to the reference detection characteristic, the main control section 51 controls so that a movable beam Bm and the fixed beam Bf provides a specified interval X (e.g., X=42.3 µm). When the fixed beam Bf does not scan within the detection range as shown in FIG. 28, however, the main control section 51 cannot control the movable beam Bm because a position of the fixed beam Bf is unidentifiable.

As shown in FIG. 29, the position of the fixed beam Bf is detected by correcting an output from the sensor SO or SP which detects a relative position. When the position of the fixed beam Bf is detected, the main control section 51 can control so that the movable beam Bm maintains the specified interval X with reference to the fixed beam Bf.

Figure 30:
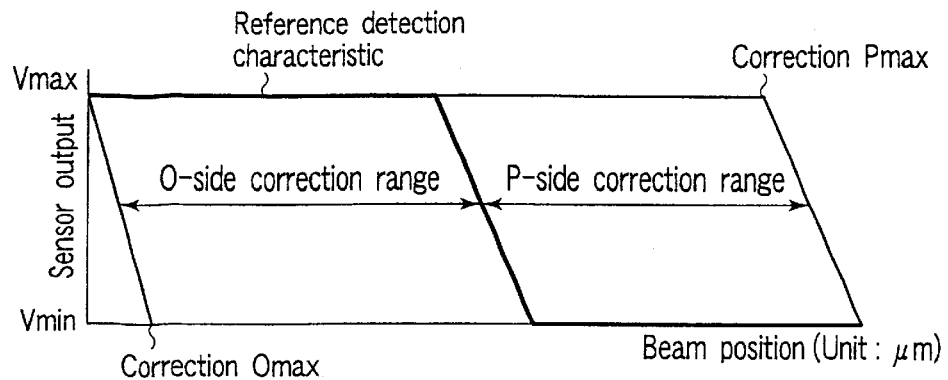
FIG. 30 exemplifies a correctable range.

FIG. 30 shows a range capable of correcting outputs from the sensors SO and SP. As shown in FIG. 30, a range from a correction level Omax to the basic characteristic is capable of light beam detection by correcting an output from the sensor SO. A range from the basic characteristic to a correction level Pmax is capable of light beam detection by correcting an output from the sensor SP. Accordingly, a range capable of light beam detection corresponds to the range from the correction levels Omax to Pmax with reference to the basic characteristic by correcting outputs from the sensors SO and SP.

The range capable of light beam detection due to this correction relates to a width of the sawtooth sensors SO and SP. When the sensors SO and SP become wider, the correction and the detection can be applied in a wider range.

The following describes a voltage range as the detection range.

Figure 31:
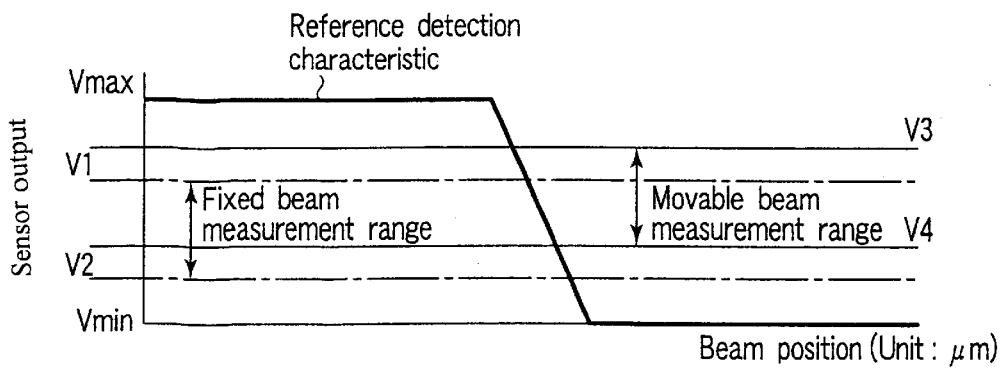
FIG. 31 shows detectable (measurable) ranges for a fixed beam and a movable beam.

FIG. 31 illustrates a voltage range as the detection range. FIG. 31 shows that the voltage range as the detection range does not range from Vmin to Vmax. An output value in FIG. 31 is an output integrated by using an operational amplifier.

Normally, the operational amplifier cannot output values corresponding to the voltage range from the minimum value (Vmin) to the maximum value (Vmax) by maintaining linearity. The operational amplifier cannot output a correct value especially near Vmin and Vmax. Namely, a correct value is not necessarily output near the power voltage. Accordingly, the main control section 51 does not perform measurement or control near the power voltage, e.g., from 0 V to V2 and from Vmax to V3.

When the movable beam Bm is controlled to be set above the fixed beam Bf with the specified interval X, measurement of the fixed beam Bf ranges from V1 to V2 by subtracting from V3 a voltage value equivalent to the specified interval X. Detection of the movable beam Bm ranges from V4 to V3 by adding to V2 a voltage value equivalent to the specified interval X.

When the fixed beam Bf is detected to be higher than V1, the main control section 51 cannot measure the movable beam Bm correctly. Namely, the main control section 51 cannot accurately control the specified distance X between the movable beam Bm and the fixed beam Bf.

When a light beam scans the sensor SP side, the main control section 51 corrects an output from the sensor SP. When a light beam scans the sensor SO side, the main control section 51 corrects an output from the sensor SO. By doing this, the main control section 51 can correctly measure the fixed beam Bf and control a position of the movable beam Bm.

When detecting the fixed beam Bf to be lower than V2, the main control section 51 cannot correctly control the movable beam Bm. Because of this, the main control section 51 corrects an output from the sensor SO or SP, and then measures the fixed beam Bf and controls a position of the movable beam Bm.

Described below is an interval to be corrected, namely a correction pulse amount.

When the fixed beam Bf is not detected according to the reference detection characteristic, the main control section 51 must detect the position of the fixed beam Bf by performing the above-mentioned correction. There may be the case where the fixed beam largely deviates from the detection range according to the reference detection characteristic. In this case, if the position is to be detected by gradually increasing the minimum correction amount, the optimal correction will be time-consuming and inefficient.

To solve this, the reference detection characteristic is fist used to define an amount of correction needed. The above-mentioned reference detection characteristic is an integration output using the operational amplifier in the processing circuit as shown in FIG. 18. The configuration from the sensors SO and SP to the integration output in FIG. 18 includes a plurality of operational amplifiers. Each operational amplifier has an offset voltage. A difference between the total offset amount for these operational amplifiers and the reference voltage causes a deviation in an actual reference detection characteristic from the ideal reference detection characteristic. Consequently, repeating correction using the minimum correction amount requires a long time for determining an optimal correction amount.

Figure 32:
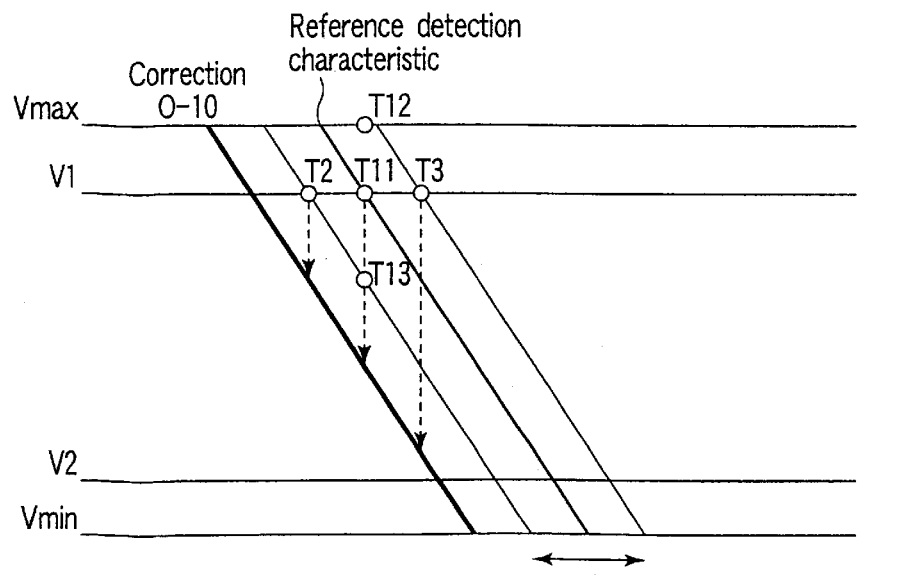
FIG. 32 shows an exemplification of correction considering detection characteristic deviation due to an offset voltage.

FIG. 32 diagrams integration output deviation due to an effect of the offset voltage of each operational amplifier included in the processing circuit 40. As shown in FIG. 32, the reference detection characteristic passing T11 may vary between the characteristic passing T12 and that passing T13 due to the offset voltage of each operational amplifier. Even if the operational amplifiers in the processing circuit 40 are of the same type, amounts of offset voltages for these operational amplifiers differ from each other. However, it is possible to compute a maximum offset amount. Consideration should be given to offset voltages for a plurality of operational amplifiers in the processing circuit 40. In the case of the maximum offset, it is efficient to reliably link the detection range before correction with that after correction and to perform correction using the maximum correction amount. This correction can prevent a light beam from being detected unsuccessfully during correction and perform correction according to an efficient correction amount.

FIG. 32 exemplifies correction of the sensor SO side against the basic detection characteristic. In FIG. 32, a minimum unit is assumed to be 1 (correction level O-1) in correction amounts for sensor SO output. The figure shows a characteristic with correction amount 10 (correction level O-10) against the basic detection characteristic.

As mentioned above, a small correction amount requires a long time until an optimal correction amount is reached. On the contrary, if a correction amount is too large, the characteristic after correction disallows detection of a light beam scanning the position of T3 which is detectable based on the characteristic with the maximum offset. Accordingly, the most efficient correction should use the maximum correction amount which allows detection of a light beam scanning the positions between T2 and T3 in FIG. 32.

Considering the correction for the sensor SO side, an efficient correction amount should allow the largest correction toward the sensor SO side within a range capable of detecting a light beam scanning the position T3. This correction reliably ensures the light beam detection using the maximum correction amount even if a deviation occurs in the reference detection characteristic due to an effect of the offset in the processing circuit 40 during correction.

Figure 33:
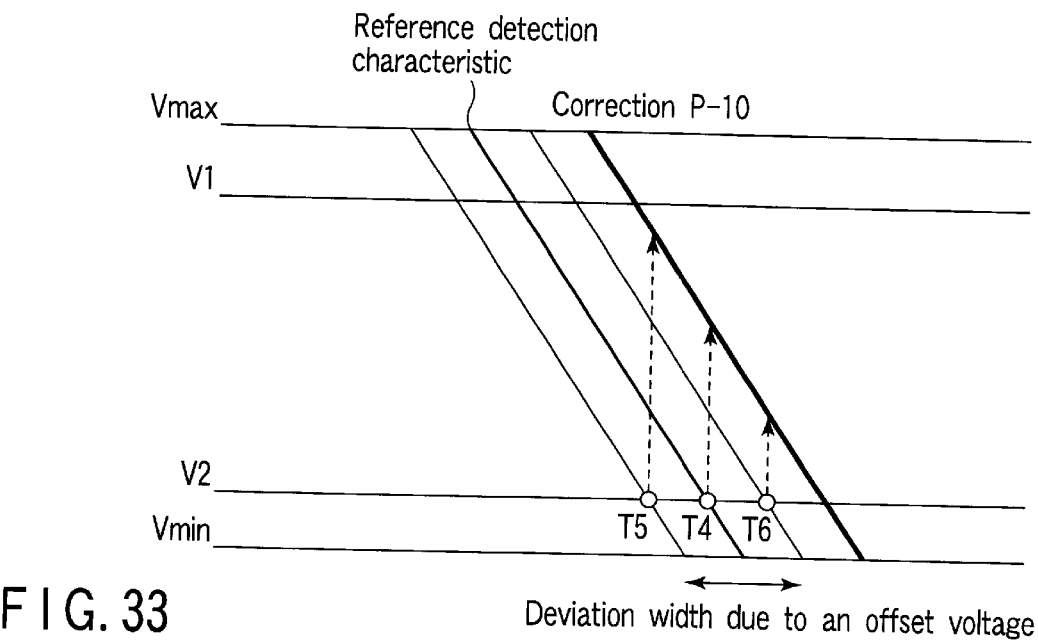
FIG. 33 shows an exemplification of correction considering detection characteristic deviation due to an offset voltage.

FIG. 33 diagrams correction toward the sensor SP side.

FIG. 33 exemplifies correction in increments of correction amount 10 (correction level P-10) when a minimum unit is assumed to be 1 (correction level P-1) in correction amounts for sensor SP output.

Like the case in FIG. 32, this correction amount allows the characteristic capable of detecting a light beam after correction even if the light beam scans the position T6 detectable when the sensor SP side provides the maximum offset amount. Namely, if the sensor SO side also needs too large a correction amount, it may be impossible to detect a light beam scanning the position T5, T4, or T6. For this reason, the correction should be performed by increasing the correction amount as much as possible within the range capable of detecting a light beam scanning the position T5, T4, or T6.

Considering the correction for the sensor SP side, an efficient correction amount should allow the largest correction toward the sensor SO side within a range capable of detecting a light beam scanning the position T6. This correction reliably ensures the light beam detection using the maximum correction amount even if a deviation occurs in the reference detection characteristic due to an effect of the offset in the processing circuit 40 during correction.

Figure 34:
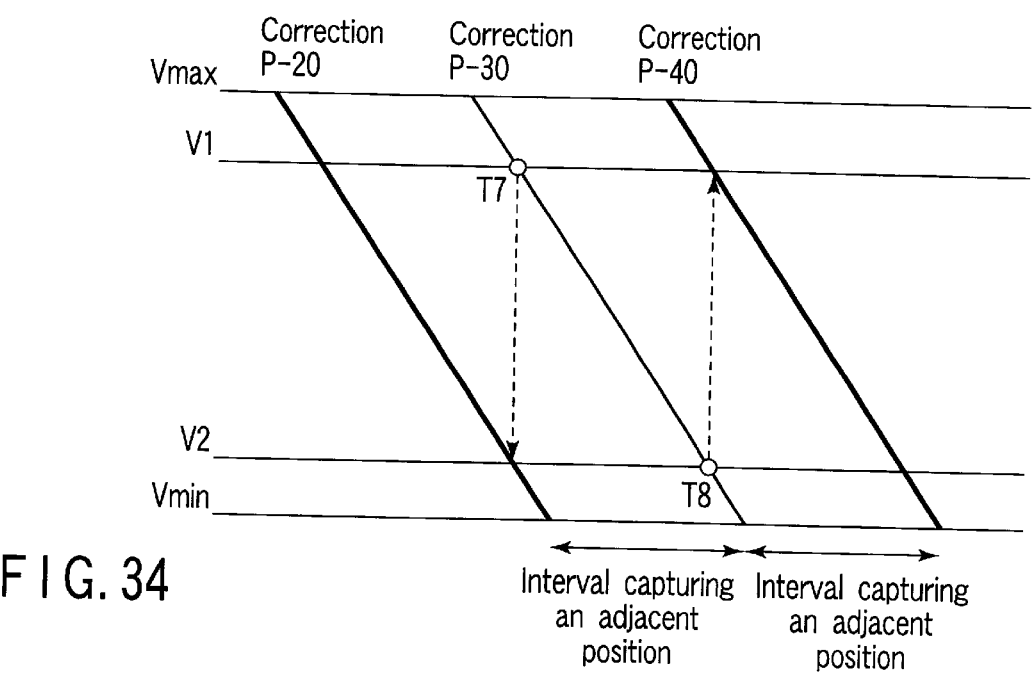
FIG. 34 illustrates a correction width in relation to detection characteristics.

FIG. 34 illustrates a correction amount even when the corrected detection characteristic cannot detect a light beam. When a light beam cannot be detected by using the detection characteristic corrected with the correction level P-30, for example, a correction amount should be increased. In this case, the correction width (amount) should detect at least the position T7 along V1. Also in this case, as large a width as possible effectively shortens the beam detection time within the range capable of detecting T7 like the above-mentioned case. FIG. 34 uses correction widths in increments of correction amount 10 like the correction width from the reference detection characteristic. However, the above-mentioned correction amount may not be the same as the correction amount from the reference detection characteristic.

The following describes a case where the fixed be am Bf scans near the end of the correctable detection range.

Figure 35:
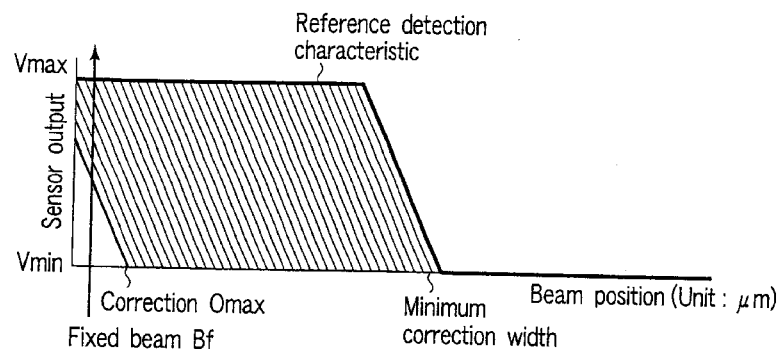
FIG. 35 illustrates detection of a light beam using a minimum correction width.

For example, the fixed beam Bf scans a range detected near correction level Omax as shown in FIG. 35. In this case, if the minimum correction width in FIG. 35 is used for repeating correction, the correction must be repeated gradually toward the sensor SO side from the reference detection characteristic. Accordingly, 50 or more corrections are needed to detect the fixed beam.

Figure 36:
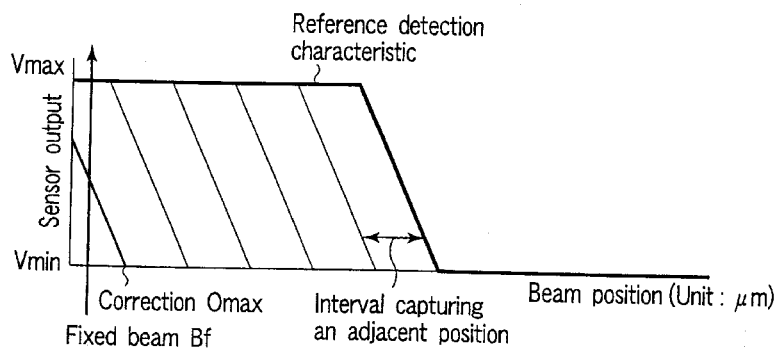
FIG. 36 illustrates detection of a light beam using a correction amount in consideration of an offset.

By contrast, as shown in FIG. 36, the correction is repeated by using the maximum correction width for detecting an adjacent position like the above-mentioned first embodiment. This can detect the fixed beam Bf with the smaller number of repetitions than the correction is repeated with the minimum correction width. For example, the fixed beam Bf can be detected by repeating the correction 50 times on the basis of the minimum correction amount. When a correction amount is increased 10 times greater than the minimum correction amount, repeating the correction five times can detect the fixed beam Bf.

Figure 37:
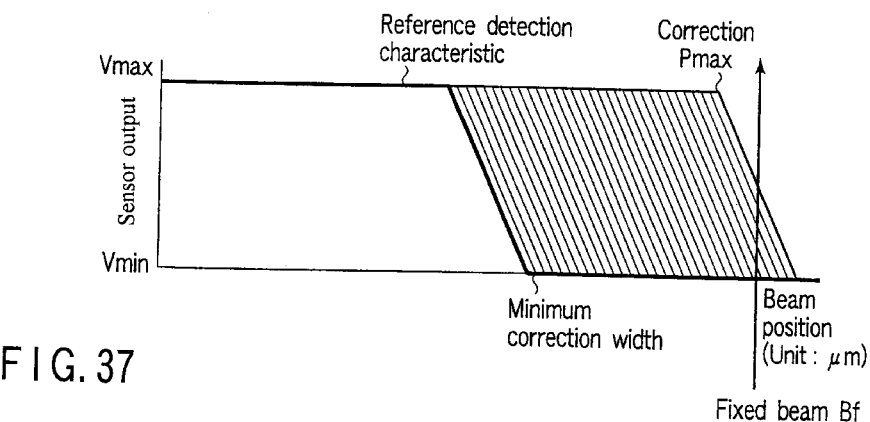
FIG. 37 illustrates detection of a light beam using a minimum correction width.
Figure 38:
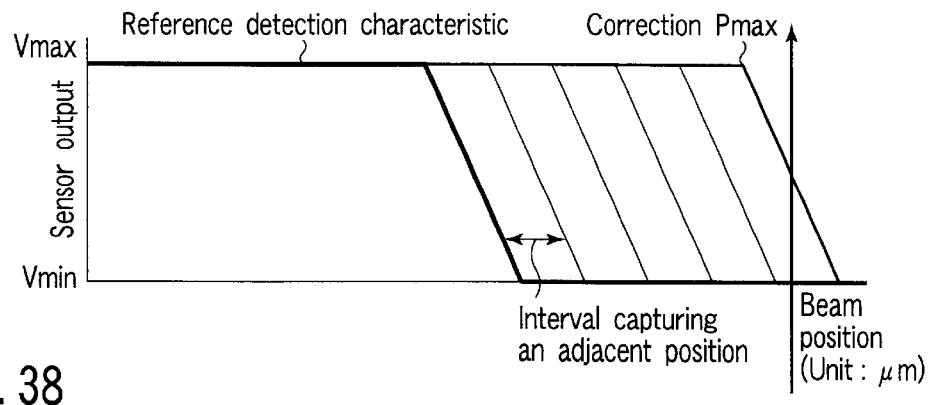
FIG. 38 illustrates detection of a light beam using a correction amount in consideration of an offset.

FIGS. 37 and 38 explain examples of correction control at the sensor SP side. Since the correction control examples in FIGS. 37 and 38 are the same as those in FIGS. 35 and 36, a description is omitted.

According to the first embodiment as mentioned above, the correction is performed by using the maximum correction amount to capture an adjacent position when a light beam position is detected by correcting a sensor output. This method can efficiently determine a correction amount capable of detecting a light beam and shorten the processing time needed for correction.

The above-mentioned image formation apparatus equipped with the light beam scanning apparatus controls light beam positions during a power-on sequence, fast copy, or inter-page correction. Consequently, by shortening the time required for controlling light beam positions as mentioned above, it is possible to shorten the time from the power-on sequence to a standby state, the time until initiation of a fast copy, the time needed for inter-page correction, etc.

The following describes a second embodiment.

The second embodiment describes correction control in consideration of variations in a beam light volume.

In the above-mentioned detection characteristic, the integration output sensitivity (gradient) varies with a beam light volume for scanning the sensors SO and SP. When the beam light volume increases, the integration output sensitivity also increases, causing the detection characteristic gradient to be an acute angle. Accordingly, increasing the beam light volume narrows a detection range of light beams.

When the beam light volume decreases, the integration output sensitivity also decrease, causing the detection characteristic gradient to be obtuse. Accordingly, decreasing the beam light volume widens a detection range of light beams.

The second embodiment describes correction amount control when the light beam detection range narrows due to a change in the beam light volume.

Figure 39:
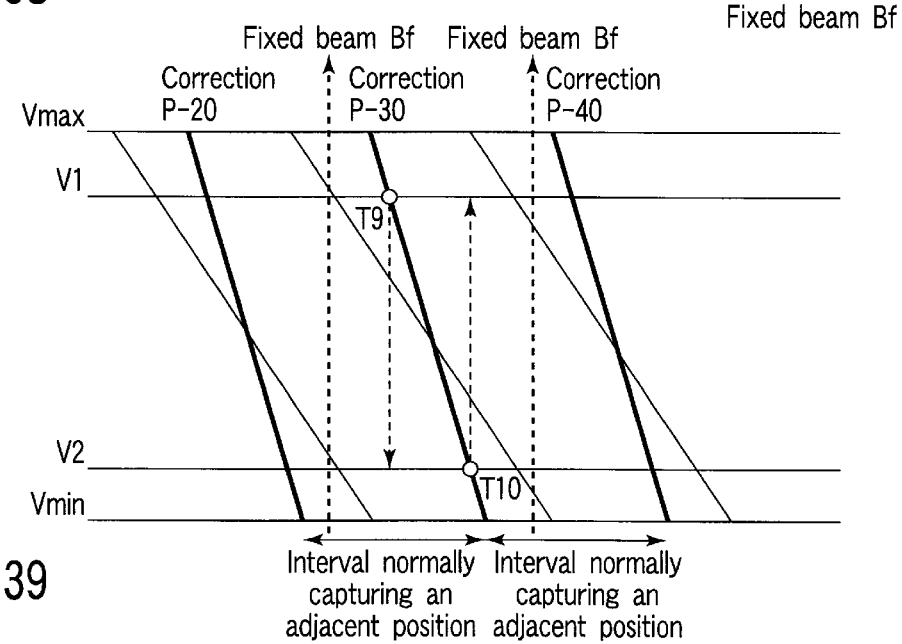
FIG. 39 illustrates a change in detection characteristics when a beam light volume increases.
Figure 40:
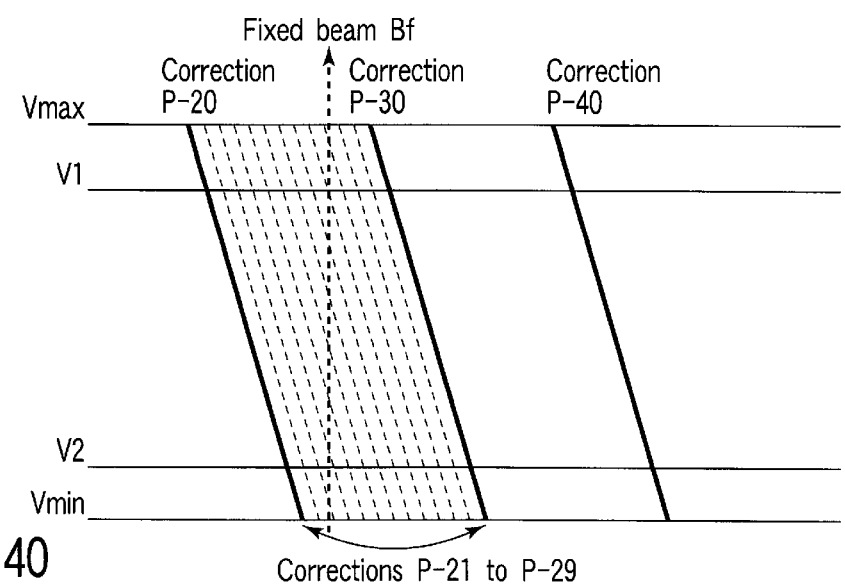
FIG. 40 illustrates a correction amount when no light beam is detected due to a light volume change.

The first embodiment has described correction by varying a correction amount in increments of 10 when the minimum correction amount is 1. Here, it is assumed that a correction amount change due to correction is predetermined in units of 10. Under this condition, when increasing the light volume increases the detection characteristic and narrows the detection range, there can be a scanning position incapable of detecting a light beam. When a correction width is predetermined (in units of correction level P-10) as shown in FIG. 39, for example, it is impossible to detect a fixed beam b or c indicated by a dotted line. When special attention is paid to the detection characteristic at the correction level P-30 in FIG. 39, it just detects a light beam scanning between T9 and T10.

Further, the detection range for the correction level P-40 or P-20 does not contain a scanning position for the fixed beam b or c. Consequently, the scanning position for the fixed beam b is undetectable because that position exists between the detection range for the correction level P-30 and the detection range for the correction level P-20. Likewise, the scanning position for the fixed beam c is undetectable because that position exists between the detection range for the correction level P-30 and the detection range for the correction level P-20.

For example, the main control section 51 is preset so as to change a correction amount (correction width) in units of 10. In this case, when a light beam is detected above V1 at the correction level P-30, the main control section 51 changes the correction amount to the correction level P-20. When a light beam is detected below V2 at the correction level P-20, the main control section 51 re-changes the correction amount to the correction level P-30. Namely, when the light beam scanning position is above V1 at the correction level P-30 and below V2 at the correction level P-20, the light beam scanning position cannot be detected due to repetition of corrections at the correction levels P-30 and P-20.

When a light beam scanning position cannot be detected by using the preset correction width, the second embodiment performs correction by further fining the correction width. When the same correction amounts are determined, the main control section 51 assumes that the current correction width skips the scanning position and cannot detect it. In this case, the main control section 51 determines a correction amount by further fining the correction width. When the scanning position cannot be detected between P-30 and P-20, for example, the correction width is assumed to be the P-1 interval (minimum correction width). The main control section 51 performs correction between the correction levels P-29 and P-21. It may be preferable to perform correction by using the middle correction amount (correction level P-25) between the correction amount before skipping (correction level P-30) the correction amount after skipping (correction level P-20). Namely, when the correction amount before skipping is at the correction level P-30 and the correction amount after skipping is at the correction level P-20, for example, it may be preferable to perform correction by using the correction level P-25.

Figure 41:
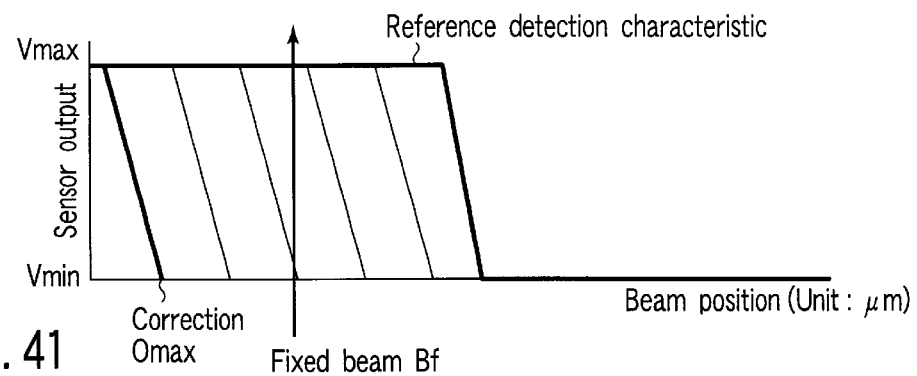
FIG. 41 illustrates a correction amount when a beam light volume increases.
Figure 42:
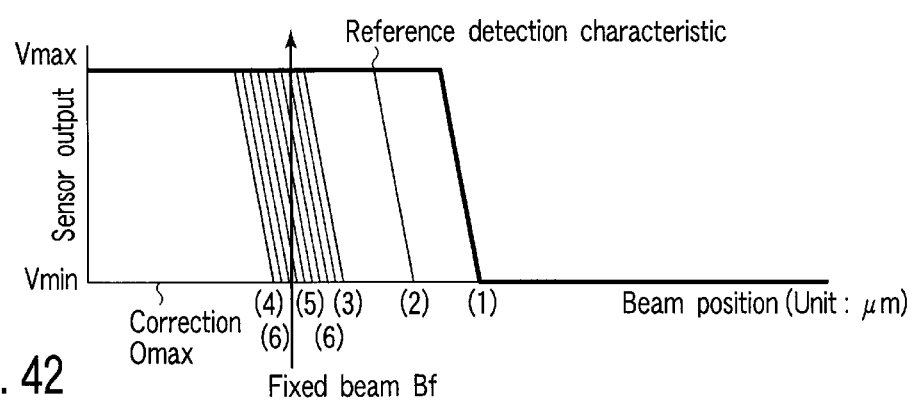
FIG. 42 shows an example of setting a correction amount until a light beam is detected.

FIGS. 41 and 42 illustrate operation examples according to the second embodiment. As shown in FIG. 41, when the fixed beam Bf cannot be detected by using the preset correction width, the main control section 51 performs correction by changing the correction width. Namely, as shown in FIG. 42, the main control section 51 first performs correction based on each predetermined correction width from the basic detection characteristic (correction levels O-10, O-20, and O-30). The light beam is not detected according to the detection characteristic at the correction level O-30 and is assumed to be below V1. The main control section 51 determines the correction level O-20. However, the correction at the correction level O-20 is already performed. The main control section 51 then uses a middle correction amount between the correction levels O-20 and O-30 and performs correction at the correction level O-25. When the light beam cannot be detected at the correction level O-25, the main control section 51 further performs correction by using a middle correction amount between the correction levels O-25 and O-30 or between O-25 and O-20.

When the light beam scanning position cannot be detected according to the correction in units of predetermined correction widths, the correction is performed by using a finer correction width than the predetermined correction width. This adjusts the correction amount for detecting a light beam scanning position.

Accordingly, the correction amount can be determined efficiently. In addition, a light beam scanning position can be reliably detected independently of sensitivity changes in integration output from the processing circuit due to variations in the beam light volume, etc.

The following describes a third embodiment.

The third embodiment can efficiently determine a correction amount when the correction amount for light beam detection approximates to the most recent correction amount. Namely, the third embodiment determines a correction amount based on the previous correction amount in addition to the controls described in the first and second embodiments.

Figure 43:
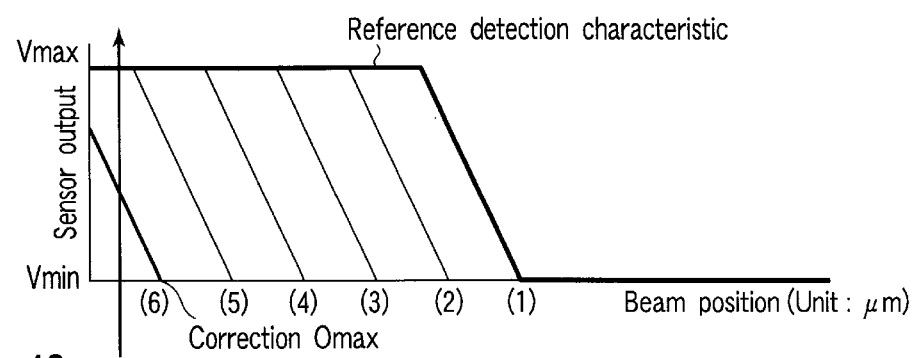
FIG. 43 shows a sequence of setting a correction amount until a light beam is detected.
Figure 44:
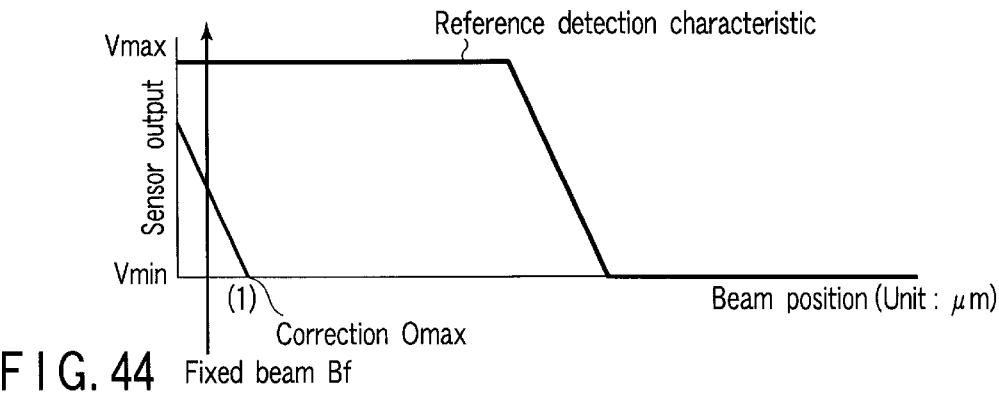
FIG. 44 shows a sequence of setting a correction amount until a light beam is detected.
Figure 45:
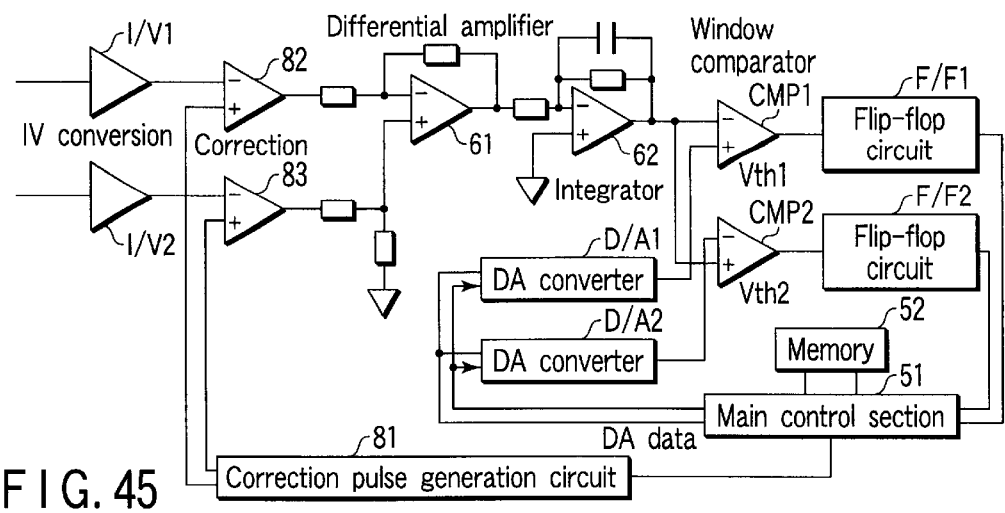
FIG. 45 shows a configuration example of a processing circuit for setting a correction amount using memory.
Figure 52:
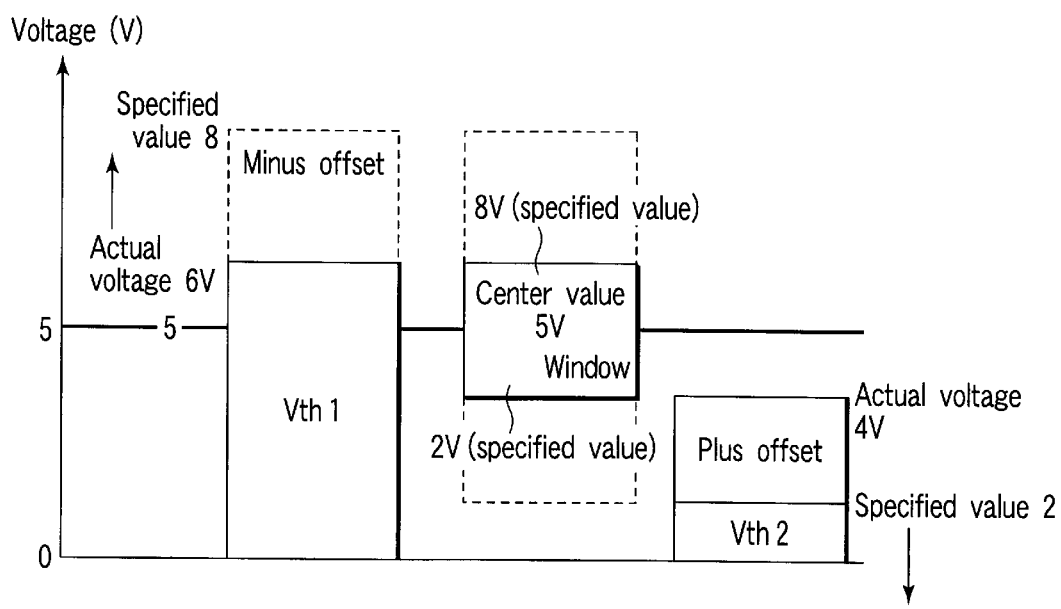
FIG. 52 illustrates a case where an output value from the integrator is determined in consideration of effects of offset voltages.
Figure 61:
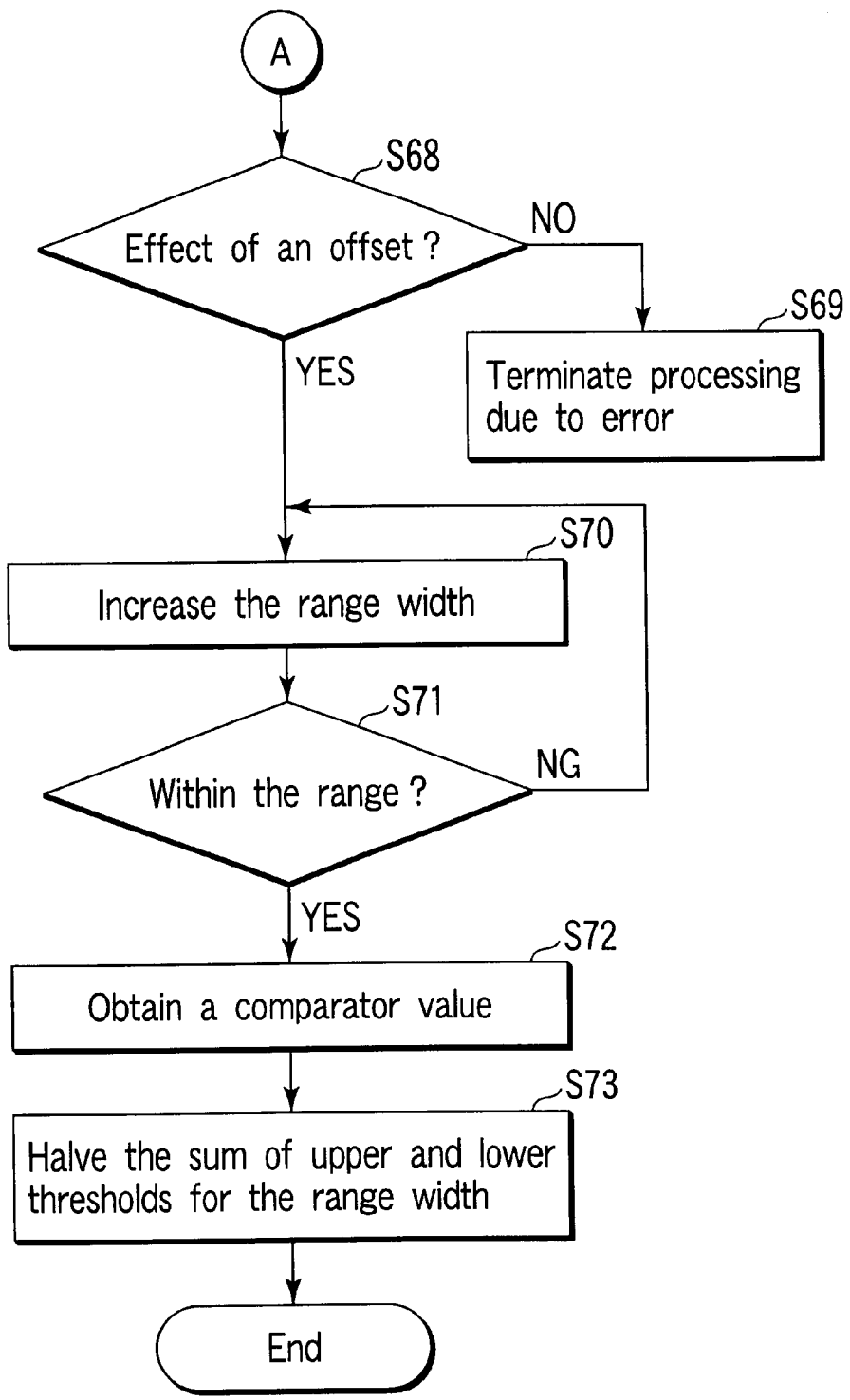
FIG. 61 is a flowchart exemplifying an algorithm for detecting a light beam scanning position by using the comparator.

FIG. 43 explains an operation example according to the first or second embodiment. FIG. 44 explains an operation example according to the fourth embodiment. FIG. 45 shows a configuration example of the processing circuit 40 used for the third embodiment. The configuration of the processing circuit 40 in FIG. 45 is similar to that of the processing circuit 40 in FIG. 18. The mutually corresponding parts in FIGS. 45 and 18 are designated by the same reference numerals and a detailed description is omitted for simplicity. FIG. 45 shows that memory 52 in FIG. 52 is connected to the main control section 51.

FIG. 43 shows that the fixed beam Bf scans a position near the maximum correction amount. In this case, the first or second embodiment needs to repeat corrections from the reference detection characteristic for determining an intended correction amount even if a large correction interval is provided. In the example of FIG. 43, the fixed beam Bf is positioned near the maximum correction amount. It is necessary to repeat the correction five times from the reference detection characteristic for detecting the fixed beam Bf.

Normally, the scanning position for the fixed beam Bf does not vary excessively. Accordingly, it is efficient to determine the correction amount based on the previous correction amount. As shown in FIG. 45, the third embodiment stores the previous correction amount in the memory 52 connected to the main control section 51. When performing correction, the main control section 51 first reads the previous correction amount stored in the memory 52, and then performs correction based on the stored correction amount. When the scanning position does not vary excessively like the fixed beam Bf, it is possible to fast and efficiently determine a correction amount for detecting the light beam scanning position.

The following describes a fourth embodiment.

Figure 46:
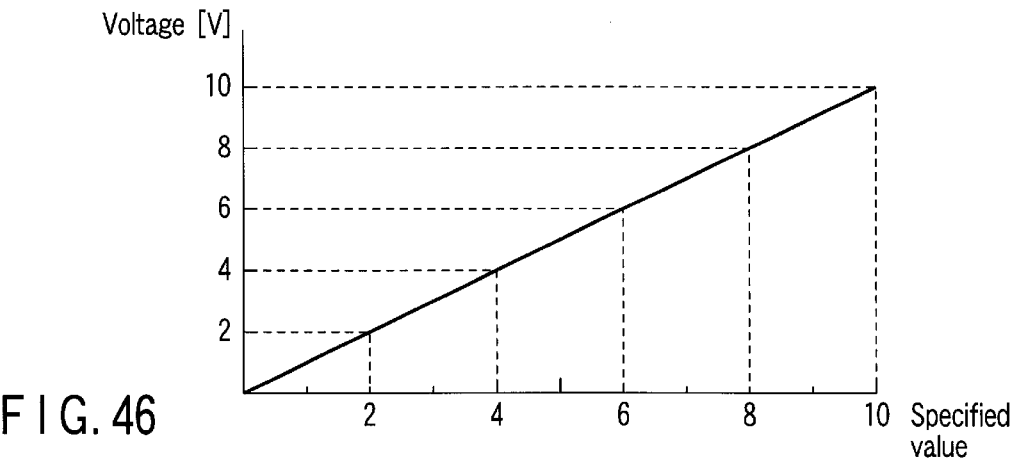
FIG. 46 shows the relation between a value specified by the CPU and an actual voltage value in a comparator.

The window comparators CMP1 and CMP2 in FIG. 45 have the configuration similar to that in FIG. 18 and a description is omitted. FIG. 46 shows an ideal relationship among actual voltages (Vth1 and Vth2) and values (Th1 and Th2) specified to the window comparators CMP1 and CMP2 from the CPU 51. As mentioned above, the CPU 51 specifies Th1 and Th2 so that these values become Th1>Th2.

Figure 47:
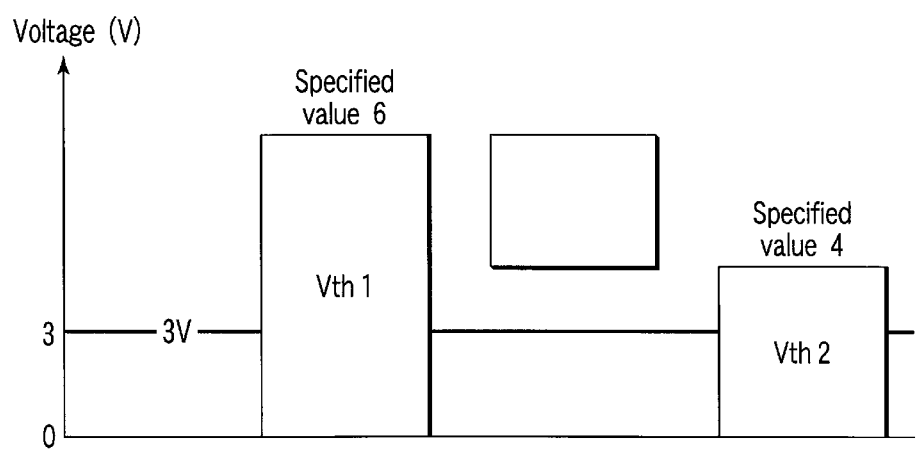
FIG. 47 shows a case where an output value from an integrator is below a window generated by the comparator.
Figure 48:
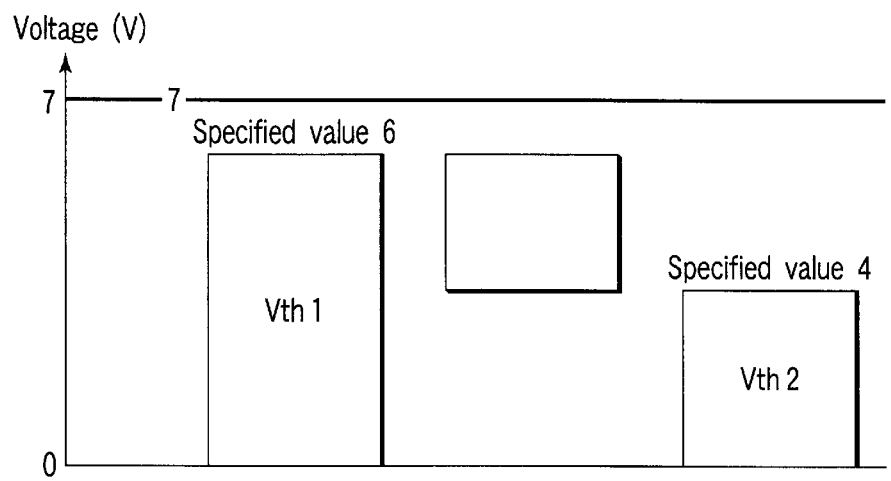
FIG. 48 shows a case where an output value from the integrator is above a window generated by the comparator.
Figure 49:
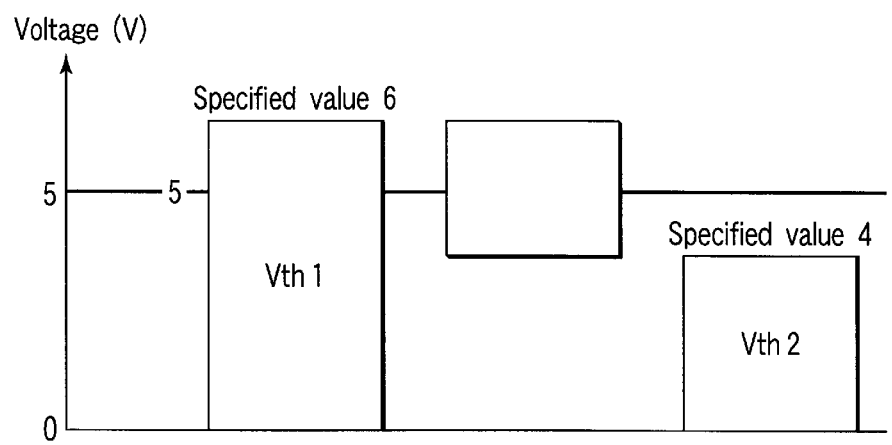
FIG. 49 shows a case where an output value from the integrator is within a window generated by the comparator.

When Th1 is 6 and Th2 is 4 as shown in FIGS. 47, 48, and 49, ideally Vth1 becomes 6 V and Vth2 becomes 4 V. In this case, a window (range) generated by the window comparators CMP1 and CMP2 ranges from 4 V to 6 V.

When the window comparators CMP1 and CMP2 generate the window from 4 V to 6 V, the integrator 62 may output a value of 3 V which is information indicating a light beam passage position. In this case, the output value from the integrator 62 is below Vth1 (1) and below Vth2 (0). Namely, the window comparator CMP1 outputs 1 when the integration output is below Vth1. The window comparator CMP2 outputs 0 when the integration output is below Vth2. Accordingly, the main control section 51 determines that the output value from the integrator 62 is below the window.

When the integrator 62 outputs a value of 7 V (information indicating a light beam passage position) as shown in FIG. 48, that value is above Vth1 (0) and above Vth2 (1). Namely, the window comparator CMP1 outputs 0 when the integration output is above Vth1. The window comparator CMP2 outputs 1 when the integration output is above Vth2. Accordingly, the main control section 51 determines that the output value from the integrator 62 is above the window.

When the integrator 62 outputs a value of 5 V (information indicating a light beam passage position) as shown in FIG. 49, that value is below Vth1 (1) and above Vth2 (1). Namely, the window comparator CMP1 outputs 1 when the integration output is below Vth1. The window comparator CMP2 outputs 1 when the integration output is above Vth2. Accordingly, the main control section 51 determines that the output value from the integrator 62 enters the window.

The main control section 51 determines whether the integrator 62's output value is above, below, or in the window based on an output value from the window comparators CMP 1 and CMP2. Further, the main control section 51 determines the range of an output from the integrator 62 based on a value issued to the window comparators CMP1 and CMP2. When the ideal relationship is maintained among Th1, Th2, Vth1, and Vth2 as mentioned above, the condition Vth1>Vth2 is true. The window comparators CMP1 and CMP2 can generate a normal window for normal determination.

Figure 50:
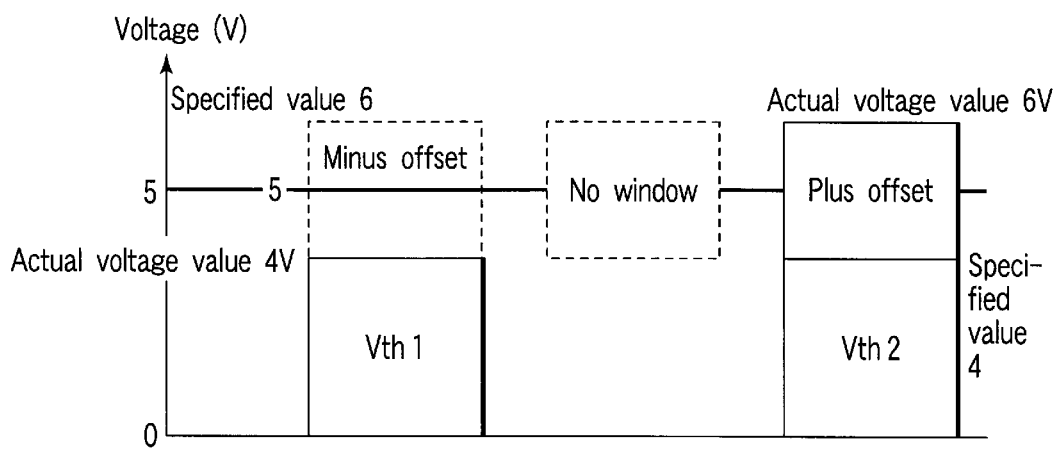
FIG. 50 shows a case where the comparator causes a determination error according to an output value from the integrator.

On an actual circuit, however, the window comparators CMP1 and CMP2 may not generate a window according to the specified value due to an effect of an offset voltage. On an actual circuit, Vth1 may contain a negative offset voltage and Vth2 may contain a positive offset voltage. When Th1 is set to 6 and Th2 is set to 4 as shown in FIG. 50, for example, Vth1 may become 4 V and Vth2 may become 6 V due to an effect of the offset voltage. These voltage values reverse the magnitude relation between Vth1 and Vth2. In this case, the window comparators CMP1 and CMP2 cannot generate a window.

When the reversed magnitude relation between Vth1 and Vth2 disables the window comparators CMP1 and CMP2 from generating a normal window, an output from the integrator 62 may above Vth1 and below Vth2. In this case, the window comparator CMP1 outputs 0 and the window comparator CMP2 also outputs 0. The determination result is Th1>Th2. This is impossible when Vth1 and Vth2 correspond to the specified values Th1 and Th2, respectively.

Namely, the window comparators CMP1 and CMP2 may output an abnormal determination result due to an effect of the offset voltage. Further, when the window comparator malfunctions due to a damage etc., the window comparators CMP1 and CMP2 may output an abnormal determination result.

When the window comparators CMP1 and CMP2 outputs an abnormal determination result, the fourth embodiment determines whether the determination anomaly is caused by the offset or an abnormal circuit operation other than the offset.

Figure 51:
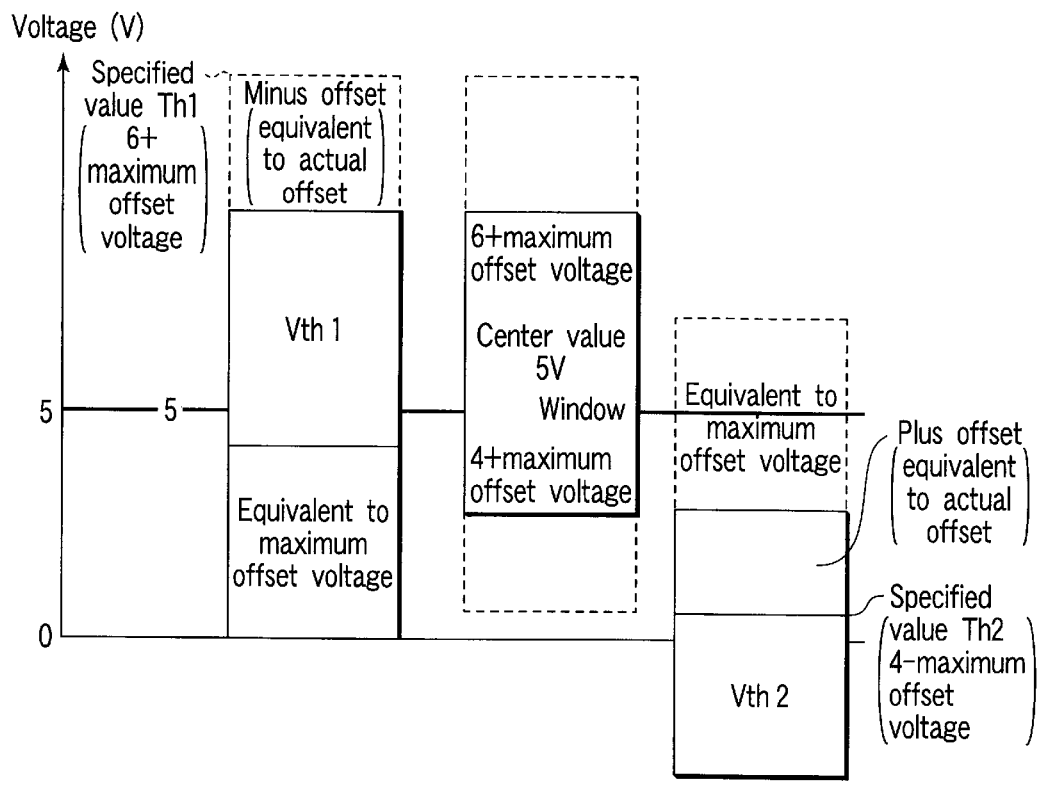
FIG. 51 illustrates a case where the comparator generates a window in consideration of effects of offset voltages.

Whether the determination anomaly is caused by the offset voltage is determined by whether an output from the integrator 62 enters the window generated in consideration of the maximum offset. As shown in FIG. 51, the main control section 51 changes the specified value Th1 to a value by adding the maximum offset amount for the window comparator CMP1 to the initial specified value (6). The main control section 51 changes the specified value Th2 to a value by subtracting the maximum offset amount for the window comparator CMP2 from the initial specified value (4). Based on the specified values Th1 and Th2, the main control section 51 generates a large window ranging from 4 minus the maximum offset voltage to 6 plus the maximum offset voltage. When the generated window contains an output value from the integrator 62, it is determined that an offset effect causes the abnormal determination result. When the generated window does not contain an output value from the integrator 62, it is determined that the circuit malfunction causes an error.

When it is determined that an offset effect causes the abnormal determination result, the main control section 51 performs the following processing without terminating the processing due to the determination error.

When it is determined that an offset effect causes the abnormal determination result, the main control section 51 returns the specified values Th1 and Th2 to the initial specified values. Further, the main control section 51 gradually increases Th1 from the initial specified value and gradually decreases Th2 from the initial specified value. This operation gradually generates and enlarges a window.

By generating the window as mentioned above, the main control section 51 enlarges the window until an output value from the integrator 62 enters in the window generated by the window comparator. When determining that the window contains the output value from the integrator 62, the main control section 51 reads the specified values Th1 and Th2. The main control section 51 adds the read values Th1 and Th2, divides the sum by 2, and determines the result to be a read value.

For example, it is assumed that the specified value Th1 is 8 and the specified value Th2 is 2 as shown in FIG. 52. When the output value from the integrator 62 enters the window, the main control section 51 adds 8 V and 2 V and divides the sum by 2. The result, 5 V, is used as a read value.

The similar processing is available when only one of the window comparators contains an offset voltage. For example, as shown in FIG. 53, an offset voltage is contained in only Vth1 corresponding to the specified value Th1. In this case, the main control section 51 gradually increases the specified value Th1 as shown in FIG. 54. When an output value from the integrator 62 enters the window, the main control section 51 adds the specified values Th1 and Th2, divides the sum by 2, and assumes the result to be a read value. This can reduce an error in the read value approximately to a half of the actual offset even if there is the maximum error due to the offset corresponding to the specified value Th1.

Likewise, FIG. 55 assumes that an offset voltage is contained in only Vth2 corresponding to the specified value Th2. In this case, the main control section 51 gradually decreases the specified value Th2 as shown in FIG. 56. When an output value from the integrator 62 enters the window, the main control section 51 adds the specified values Th1 and Th2, divides the sum by 2, and assumes the result to be a read value. This can reduce an error in the read value approximately to a half of the actual offset even if there is the maximum error due to the offset corresponding to the specified value Th2.

FIG. 57 compares the prior art with the present invention regarding methods of determining comparison results of the window comparators CMP1 and CMP2. When a determination error occurs due to an offset voltage as shown in FIG. 57, the prior art assumes an error and disables the determination though a circuit element does not malfunction. On the contrary, the determination method according to the fourth embodiment can detect a determination error due to an offset voltage and provide a determination result by decreasing an error due to the offset.

For example, the fixed beam Bf is assumed to scan the position in FIG. 58. As shown in FIG. 59, the position is assumed to be below the window at the point of $\alpha=(Vmax+Vmin)/2$. The position is assumed to be above the window at the point of $\beta=(\alpha+Vmin)/2$. The position is assumed to be in the window at the point of $\gamma=(\alpha+\beta)/2$. This shows that y is a value indicating the scanning position of the fixed beam Bf. The light beam scanning apparatus needs to use as small a window as possible in order to strictly detect the scanning position of the fixed beam Bf.

Decreasing the window width increases an offset effect in order to strictly detect a light beam scanning position. Especially when the window width is decreased, the light beam scanning position is detected by using the above-mentioned determination method in order to minimize an error in the offset amount. This provides a detection result with an offset error decreased, making it possible to accurately detect the light beam scanning position.

The following describes processing for determining an output value from the integrator 62 by using the window comparators CMP1 and CMP2 as mentioned above.

FIG. 60 is a flowchart showing an algorithm example when the window comparators CMP1 and CMP2 are used to determine an output value from the integrator 62.

The main control section 51 first initializes the window comparators CMP1 and CMP2. By doting this, the main control section 51 sets an approximate value for identifying an integration output and a window size for the determination (step S61). Based on these settings, the main control section 51 specifies values Th1 and Th2.

The specified values Th1 and Th2 are converted to analog voltages in an A/D converter and are input to the window comparators CMP1 and CMP2. The window comparators CMP1 and CMP2 compare an output value from the integrator 62 with Vth1 and Vth2. The comparison result is supplied to the main control section 51 via an F/F circuit.

The main control section 51 obtains the comparison result from the window comparators CMP1 and CMP2 (step S62). The main control section 51 then determines whether an output value from the window comparators CMP1 and CMP2 is normal (step S63). For example, the determination result is illegal when it is greater than the specified value Th1 and smaller than the specified value Th2. In this case, the main control section 51 assumes a determination error.

When the output value from the window comparators CMP1 and CMP2 is assumed to be normal at the step S63, the main control section 51 determines whether an output value from the integrator 62 exists in the window (range) generated from the window comparators CMP1 and CMP2 (step S64). When determining that the window contains the output value from the integrator 62 (YES at step S64), the main control section 51 stops measuring an output value from the integrator 62.

When determining that the window does not contain the output value from the integrator 62 (NO at step S64), the main control section 51 determines whether the output value from the integrator 62 exists above or below the initialized window (step S65). When the output value is assumed to exist above the window according to this decision, the main control section 51 adjusts Th1 (or Th1 and Th2) above the window (step S66) and returns to step S62. When the output value is assumed to exist below the window according to the decision at step S64, the main control section 51 adjusts Th1 (or Th1 and Th2) below the window (step S67) and returns to step S62.

When a determination error is found at step S63, the main control section 51 determines whether the integration output exists in the window in consideration of the maximum offset. Based on this decision, the main control section 51 determines whether the determination error is caused by an offset effect or other factors (step S68). When the integration output is assumed to exist in the window in consideration of the maximum offset, the main control section 51 determines that the offset effect caused the determination error. When no integration output exists in the window, the main control section 51 determines that factors other than the offset caused the determination error. When factors other than the offset are assumed to cause the determination error, the main control section 51 determines an error and terminates the processing (step S69).

When determining that the offset effect caused the determination error, the main control section 51 once resets Th1 and Th2 to the original values. The main control section 51 widens the window by gradually changing the threshold (Th1 or Th2) until the output value from the integrator 62 enters the window.

When the output value from the integrator 62 enters the window by widening the window, the main control section 51 obtains the specified values Th1 and Th2 (step S72), adds Th1 and Th2, and divides the sum by 2. The main control section 51 uses this computed value as an integration output value indicating the light beam scanning position. The main control section 51 then terminates the processing.

The following describes a fifth embodiment.

The fifth embodiment especially describes control of the movable beam Bm by using the window comparators CMP1 and CMP2 for detecting a light beam scanning position like the fourth embodiment.

Figure 62:
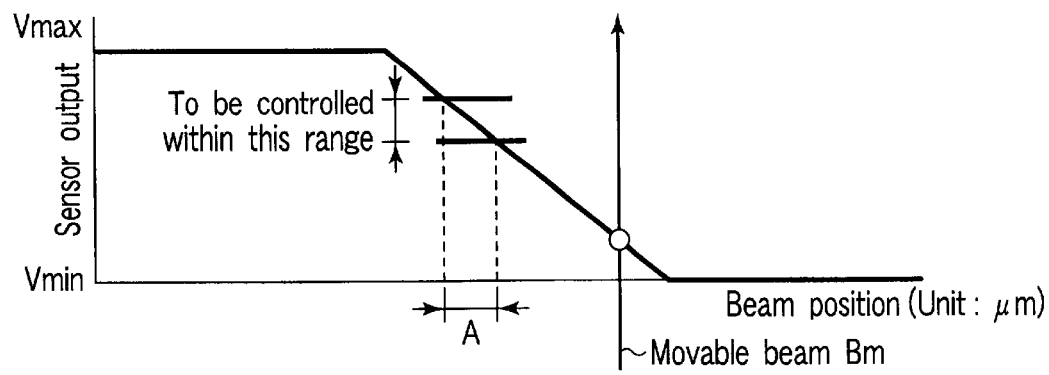
FIG. 62 exemplifies a position to start controlling a movable light beam.
Figure 63:
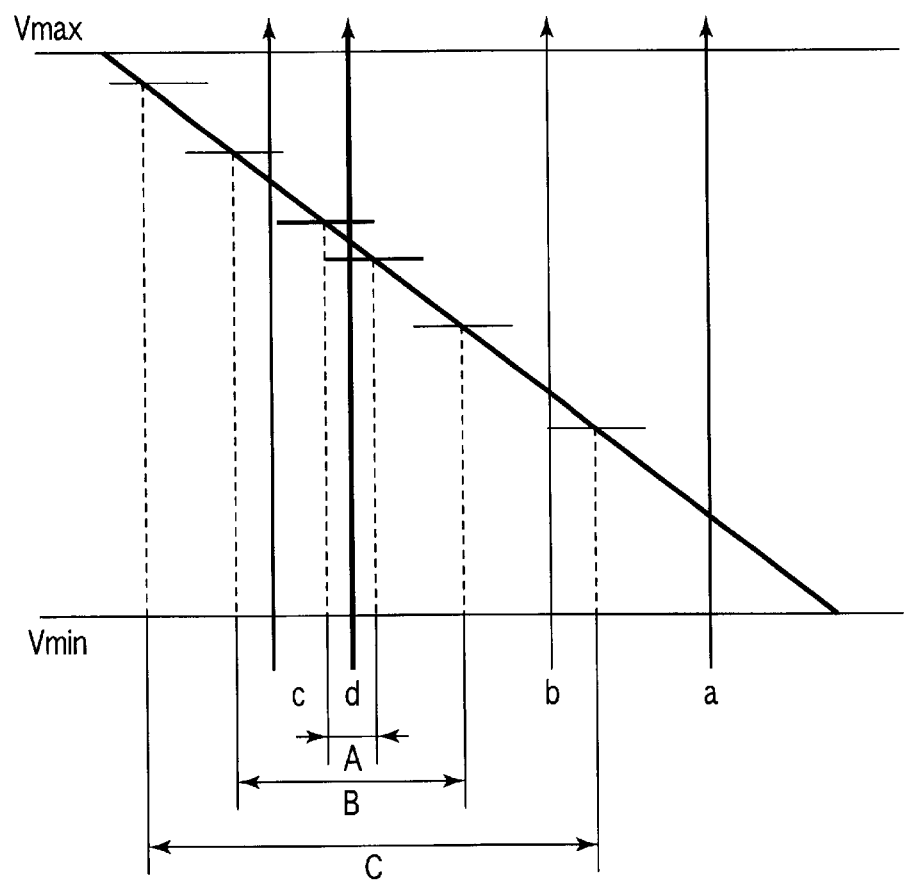
FIG. 63 shows a sequence of controlling a movable light beam position.

For example, the movable beam Bm scans a position a as shown in FIG. 62. The following describes how to restrict the movable beam Bm within a range A to be controlled. When the movable beam Bm is placed at the position a as shown in FIG. 63, the main control section 51 first moves a galvanomirror to adjust the movable beam scanning position within a range B including the target position (range A). As a result, it is assumed that the scanning position of the movable beam Bm can be controlled to the position b.

Then, the main control section 51 restricts the scanning position of the movable beam Bm within a range C which includes the range A and is half of the range B. As a result, the scanning position of the movable beam Bm is controlled to a position c, for example. By adjusting the galvanomirror, the main control section 51 further restricts the scanning position of the movable beam Bm within the range A which is half of the range B. The scanning position of the movable beam Bm is then controlled to a position d. A restriction width is controlled by gradually decreasing it with reference to the target control position.

When a light beam is controlled as mentioned above, a smaller width can more accurately provide a control target.

However, a window generated by the window comparator indicates a control target range. When the window comparator causes an increased offset voltage, no window may be generated like the fourth embodiment. In this case, the fifth embodiment checks if the error is caused by an offset effect like the fourth embodiment. When the offset effect is found, the threshold (window) is increased until the movable beam position can be detected. This can control the movable beam by decreasing an offset effect.

The following describes a sixth embodiment.

The sixth embodiment determines a light beam position by considering light beam fluctuation due to vibration, etc. The sixth embodiment can be implemented in combination with each of the above-mentioned embodiments.

Control is provided based on a position corresponding to an output value from the integrator 62 with reference to a window generated by the window comparator. Conventionally, a plurality of read operations is performed on the assumption that the light beam position may fluctuate due to vibration, etc. Control is provided by assuming the most often detected position to be the beam passage position. A small window means a small setting level difference between two thresholds. When the window is small, an output value from the integrator 62 may not be detected so often in the window even if the beam passage position fluctuates almost at the center of the window. In this case, the determination result less often shows that an integrator output value is positioned in the window. The beam passage position is often determined to be above or below the window.

The sixth embodiment determines whether an average light beam passage position is above, below, or in the window. For example, a point is given to each light beam passage position. The passage position is determined corresponding to an average of these points. For example, when the light beam passes above the window, point +1 is given. When the light beam passes in the window, point 0 is given. When the light beam passes below the window, point −1 is given. This point rating is performed for a plurality of times and an average of these points is found. When the average approximates to 0, the light beam passage position is assumed to be in the window. When the average approximates to 1, the light beam passage position is assumed to be above the window. When the average approximates to −1, the light beam passage position is assumed to be below the window.

This method can find an average beam passage position rather than a frequency of detections. Even if the light beam fluctuates, an approximate center of the fluctuation can be assumed to be the light beam passage position.

Figure 64:
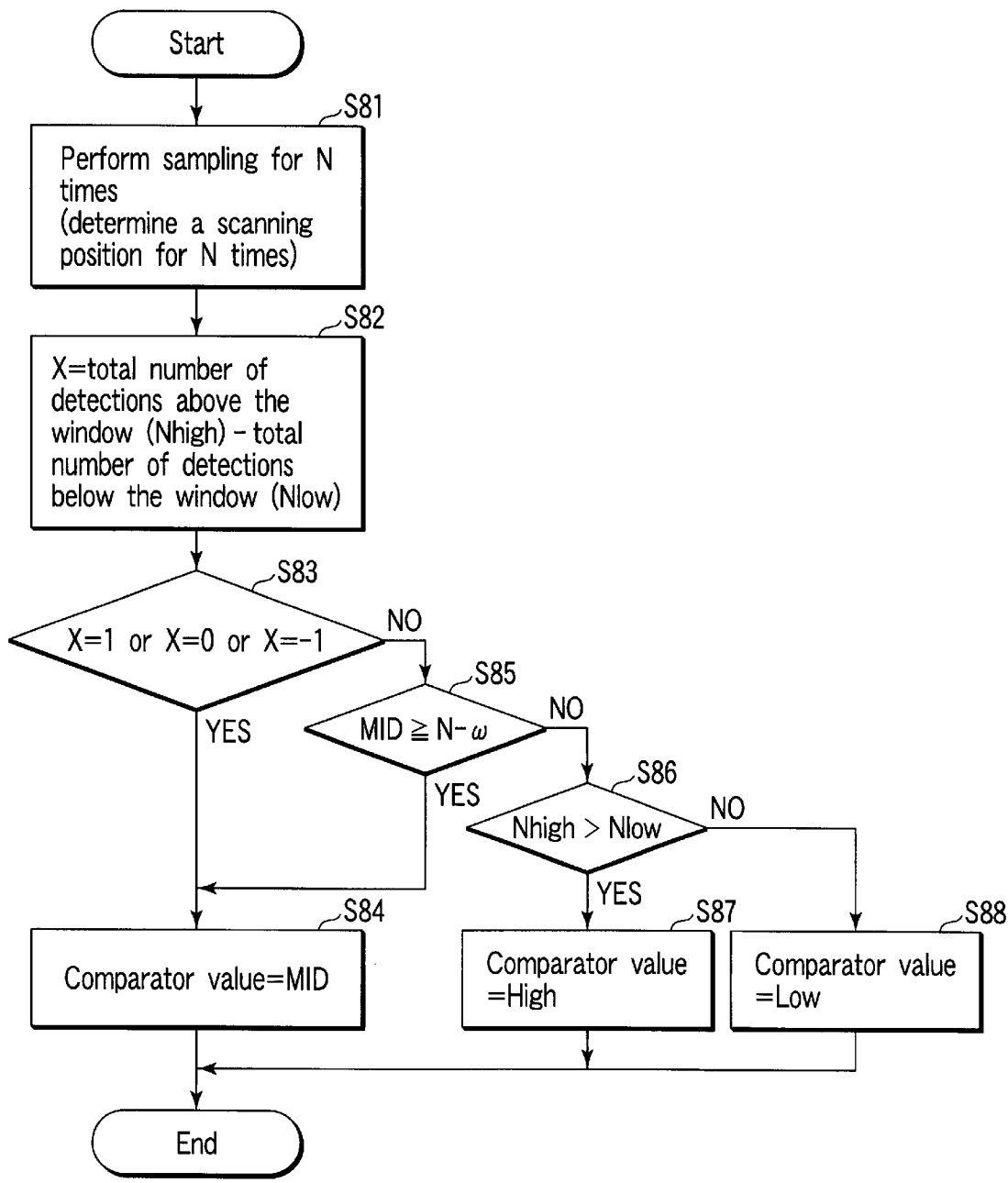
FIG. 64 is a flowchart exemplifying an algorithm for controlling a movable light beam position.

FIG. 64 is a flowchart showing an operation example according to the sixth embodiment.

The main control section 51 samples a light beam scanning position for N times by repeating the above-mentioned steps S61 to S73 for N times (step S81). This sampling accumulates the number of times detected in the window, the number of times detected above the window, and the number of times detected below the window. Accordingly, the sampling for N times yields the number of times in the window, the number of times above the window (Nhigh), and the number of times below the window (Nlow).

After completion of the sampling for N times, the main control section 51 subtracts Nlow from Nhigh to find X based on the sampling result (step S82). The number of times above the window (Nhigh) is greater than the threshold Th1. The number of times below the window (Nlow) is smaller than the threshold Th2. As mentioned above, when the light beam passes above the window, point +1 is given. When the light beam passes in the window, point 0 is given. When the light beam passes below the window, point −1 is given. Then, the sum of these points becomes the value X.

After finding the value X, the main control section 51 determines whether the value X is 1, 0, or −1 (step S83). When the value X is determined to be 1, 0, or −1, the main control section 51 determines that an average light beam scanning position enters the window (MID) generated by the window comparators CMP1 and CMP2 (step S84). When the number of detections above the window (Nhigh) is almost the same as the number of detections below the window (Nlow), an average light beam scanning position is assumed to be in the window generated by the window comparators CMP1 and CMP2.

When the value X is assumed to be neither 1, 0, nor −1 at step S83, the main control section 51 checks if MID equals the number of times N-ω or more out of the sampling for N times, namely if the scanning position enters the window. In this case, ω is the allowable number of times detected outside the window and is predetermined as a value relative to the number of sampling operations.

When MID is detected for the number of times N-ω or more, the main control section 51 determines that an average light beam scanning position is assumed to be in the comparator window (MID) at step S84. In this case, when the number of times detected outside the window is smaller than the number of times detected in the window, an average light beam scanning position is assumed to be in the comparator window.

When MID is not detected for the number of times N-ω or more, the main control section 51 checks if an average light beam scanning position is above or below the window (step S86). Namely, the main control section 51 checks if the number of detections above the window (Nhigh) is greater than the number of detections below the window (Nlow).

When Nhigh is found to be greater than Nlow, the main control section 51 determines that the light beam scanning position is above the window. The main control section 51 provides control to move the light beam scanning position downward (step S87). When Nlow is found to be greater than Nhigh, the main control section 51 determines that the light beam scanning position is below the window. The main control section 51 provides control to move the light beam scanning position upward (step S88).

As mentioned above, the sixth embodiment determines whether an average light beam scanning position is above, in, or below the window generated by the comparator. Even if the light beam scanning position fluctuates due to vibration etc., it is possible to stably detect the position and reliably control the light beam position.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A light beam scanning apparatus comprising:

a light emitting device which outputs a light beam;

a light beam scanning member which allows a light beam output from the light emitting device to scan toward a scanned face so that said light beam scans said scanned face in a main scanning direction;

a pair of sensors which are arranged on said scanned face or a position equivalent thereto, which detect a light beam scanned by said light beam scanning member, and which output an electric signal;

a processing circuit which has a plurality of operational amplifiers, which corrects an output from each of said pair of sensors to obtain corrected electric signals, and which integrates a difference between the corrected electric signals;

a control section which determines the necessity of correction based on a value integrated by the processing circuit, which determines a scanning position of said light beam according to a value integrated by said processing circuit when the necessity of correction is not determined, and which sets a correction amount based on a value integrated by said processing circuit and an offset amount present in each operational amplifier in said processing circuit when the necessity of correction is determined; and a correction signal generation circuit which outputs a correction signal to said processing circuit so as to correct an electric signal output from each of said pair of sensors based on a correction amount set in the control section, wherein said control section sets a correction amount for each specified correction width based on a value integrated by said processing circuit and an offset amount present in each operational amplifier in said processing circuit and further sets a correction amount by using a finer correction width than said specified correction width when said specified correction width cannot detect a passage position of said light beam.

2. The light beam scanning apparatus according to claim 1, wherein said control section sets a correction amount for each correction width half a previous correction width when said specified correction width cannot detect a passage position of said light beam.

3. A light beam scanning apparatus comprising:

a light emitting device which outputs a light beam;

a light beam scanning member which allows a light beam output from the light emitting device to scan toward a scanned face so that said light beam scans said scanned face in a main scanning direction;

a pair of sensors which are arranged on said scanned face or a position equivalent thereto, which detect a light beam scanned by said light beam scanning member, and which output an electric signal;

a processing circuit which has a plurality of operational amplifiers, which corrects an output from each of said pair of sensors to obtain corrected electric signals, and which integrates a difference between the corrected electric signals;

a control section which determines the necessity of correction based on a value integrated by the processing circuit, which determines a scanning position of said light beam according to a value integrated by said processing circuit when the necessity of correction is not determined, and which sets a correction amount based on a value integrated by said processing circuit and an offset amount present in each operational amplifier in said processing circuit when the necessity of correction is determined;

a correction signal generation circuit which outputs a correction signal to said processing circuit so as to correct an electric signal output from each of said pair of sensors based on a correction amount set in the control section; and a memory which stores a correction amount, wherein said control section sets a correction amount based on a value integrated by said processing circuit, an offset amount present in said processing circuit, and a previous correction amount stored in said memory.

4. A light beam scanning apparatus comprising:

a light emitting device which outputs a light beam;

a light beam scanning member which allows a light beam output from this light emitting device to scan toward a scanned face so that said light beam scans said scanned face in a main scanning direction;

a pair of sensors which are arranged on said scanned face or a position equivalent thereto, detect a light beam scanned by said light beam scanning member, and output an electric signal;

an integrator circuit which integrates a difference between electric signals output from each of said pair of sensors;

a first comparator circuit which compares a value integrated in this integrator circuit with a first threshold;

a second comparator circuit which compares a value integrated in said integrator circuit with a second threshold smaller than said first threshold; and a decision section which specifies first and second thresholds to said first and second comparator circuits, uses said first and second comparator circuits to repeat comparison among said integrator circuit's output value and said first and second thresholds for a plurality of times, and determines magnitude relation among said integrator circuit's average output value and said first and second thresholds based on the number of times for determining said integrator circuit's output value to be greater than said first threshold, the number of times for determining said integrator circuit's output value to be between said first and second thresholds, and the number of times for determining said integrator circuit's output value to be smaller than said second threshold.

5. The light beam scanning apparatus according to claim 4, further comprising:

an optical member which changes a passage position on said scanned face for a light beam output from said light emitting device, wherein said control section controls a passage position of said light beam by driving said optical member based on magnitude relation among said first and second thresholds and said integrator circuit's average output value.

6. The light beam scanning apparatus according to claim 4, wherein said control section determines said integrator circuit's average output value to be between said first and second thresholds when a difference between the number of times for determining an integrator circuit's output value to be greater than said first threshold and the number of times for determining an integrator circuit's output value to be smaller than said second threshold is less than or equal to a specified value.

7. An image forming apparatus having an image support to form a latent image on a scanned face where a light beam is scanned based on image information, and image formation means for forming an image formed on the image support onto an image formation medium, said image formation apparatus comprising:

a light emitting device which outputs a light beam;

a light beam scanning member which allows a light beam output from the light emitting device to scan said light beam toward said scanned face so that said light beam scans said scanned face on said image support in a main scanning direction;

a pair of sensors which are arranged on said scanned face or a position equivalent thereto, which detect a light beam scanned by said light beam scanning member, and which output an electric signal;

a processing circuit which has a plurality of operational amplifiers, which corrects an output from each of said pair of sensors to obtain corrected electric signals, and which integrates a difference between the corrected electric signals;

a control section which determines the necessity of correction based on a value integrated by the processing circuit, which determines a scanning position of said light beam according to a value integrated by said processing circuit when the necessity of correction is not determined, and which sets a correction amount based on a value integrated by said processing circuit and an offset amount present in each operational amplifier in said processing circuit when the necessity of correction is determined; and a correction signal generation circuit which outputs a correction signal to said processing circuit so as to correct an electric signal output from each of said pair of sensors based on a correction amount set in the control section, wherein said control section sets a correction amount for each specified correction width based on a value integrated by said processing circuit and an offset amount present in each operational amplifier in said processing circuit and further sets a correction amount by using a finer correction width than said specified correction width when said specified correction width cannot detect a passage position of said light beam.

8. The light beam scanning apparatus according to claim 7, wherein said control section sets a correction amount for each correction width half a previous correction width when said specified correction width cannot detect a passage position of said light beam.

9. An image forming apparatus having an image support to form a latent image on a scanned face where a light beam is scanned based on image information, and image formation means for forming an image formed on the image support onto image formation medium, said image formation apparatus comprising:

a light emitting device which outputs a light beam;

a light beam scanning member which allows a light beam output from the light emitting device to scan said light beam toward said scanned face so that said light beam scans said scanned face on said image support in a main scanning direction;

a pair of sensors which are arranged on said scanned face or a position equivalent thereto, which detect a light beam scanned by said light beam scanning member, and which output an electric signal;

a processing circuit which has a plurality of operational amplifiers, which corrects an output from each of said pair of sensors to obtain corrected electric signals, and which integrates a difference between the corrected electric signals;

a control section which determines the necessity of correction based on a value integrated by the processing circuit, which determines a scanning position of said light beam according to a value integrated by said processing circuit when the necessity of correction is not determined, and which sets a correction amount based on a value integrated by said processing circuit and an offset amount present in each operational amplifier in said processing circuit when the necessity of correction is determined;

a correction signal generation circuit which outputs a correction signal to said processing circuit so as to correct an electric signal output from each of said pair of sensors based on a correction amount set in the control section; and a memory which stores a correction amount, wherein said control section sets a correction amount based on a value integrated by said processing circuit, an offset amount present in said processing circuit, and a previous correction amount stored in said memory.

10. An image formation apparatus having an image support to form a latent image on a scanned face where a light beam is scanned based on image information and image formation means for forming an image formed on this image support onto an image formation medium, said image formation apparatus comprising:

a light emitting device which outputs a light beam;

a light beam scanning member which allows a light beam output from this light emitting device to scan toward a scanned face so that said light beam scans said scanned face in a main scanning direction;

a pair of sensors which are arranged on said scanned face or a position equivalent thereto, detect a light beam scanned by said light beam scanning member, and output an electric signal;

an integrator circuit which integrates a difference between electric signals output from each of said pair of sensors;

a first comparator circuit which compares a value integrated in this integrator circuit with a first threshold;

a second comparator circuit which compares a value integrated in said integrator circuit with a second threshold smaller than said first threshold; and a decision section which specifies first and second thresholds to said first and second comparator circuits, uses said first and second comparator circuits to repeat comparison among said integrator circuit's output value and said first and second thresholds for a plurality of times, and determines magnitude relation among said integrator circuit's average output value and said first and second thresholds based on the number of times for determining said integrator circuit's output value to be greater than said first threshold, the number of times for determining said integrator circuit's output value to be between said first and second thresholds, and the number of times for determining said integrator circuit's output value to be smaller than said second threshold.

11. The image formation apparatus according to claim 10, further comprising:

an optical member which changes a passage position on said scanned face for a light beam output from said light emitting device, wherein said control section controls a passage position of said light beam by driving said optical member based on magnitude relation among said first and second thresholds and said integrator circuit's average output value.

12. The image formation apparatus according to claim 10, wherein said control section determines said integrator circuit's average output value to be between said first and second thresholds when a difference between the number of times for determining an integrator circuit's output value to be greater than said first threshold and the number of times for determining an integrator circuit's output value to be smaller than said second threshold is less than or equal to a specified value.

13. A light beam scanning apparatus comprising:

light emitting means for outputting a light beam;

light beam scanning means for allowing a light beam output from the light emitting means to scan toward a scanned face so that said light beam scans said scanned face in a main scanning direction;

a pair of detection means, arranged on said scanned face or a position equivalent thereto, for detecting a light beam scanned by said light beam scanning means and outputting an electric signal;

processing means having a plurality of operational amplifiers for correcting an output from each of said pair of detection means to obtain. corrected electric signals, and for integrating a difference between the corrected electric signals;

control means for determining the necessity of correction based on a value integrated by said processing means, determining a scanning position of said light beam according to a value integrated by said processing means when the necessity of correction is not determined, and setting a correction amount based on a value integrated by said processing means and an offset amount present in said operational amplifier in said processing means when the necessity of correction is determined; and correction signal generation means for outputting a correction signal to said processing means so as to correct an electric signal output from each of said pair of detection means based on a correction amount set in said control means, wherein said control means sets a correction amount for each specified correction width based on a value integrated by said processing means and an offset amount present in each operational amplifier in said processing means and further sets a correction amount by using a finer correction width than said specified correction width when said specified correction width cannot detect a passage position of said light beam.

14. The light beam scanning apparatus according to claim 13, wherein said control means sets a correction amount for each correction width half a previous correction width when said specified correction width cannot detect a passage position of said light beam.

15. A light beam scanning apparatus comprising:

light emitting means for outputting a light beam;

light beam scanning means for allowing a light beam output from the light emitting means to scan toward a scanned face so that said light beam scans said scanned face in a main scanning direction;

a pair of detection means, arranged on said scanned face or a position equivalent thereto, for detecting a light beam scanned by said light beam scanning means and outputting an electric signal;

processing means having a plurality of operational amplifiers for correcting an output from each of said pair of detection means to obtain corrected electric signals, and for integrating a difference between the corrected electric signals;

control means for determining the necessity of correction based on a value integrated by the processing means, determining a scanning position of said light beam according to a value integrated by said processing means when the necessity of correction is not determined, and setting a correction amount based on a value integrated by said processing means and an offset amount present in each operational amplifier in said processing means when the necessity of correction is determined;

correction signal generation means for outputting a correction signal to said processing means so as to correct an electric signal output from each of said pair of detection means based on a correction amount set in said control means; and storage means for storing a correction amount, wherein said control means sets a correction amount based on a value integrated by said processing means, an offset amount present in each operational amplifier in said processing means, and a previous correction amount stored in said storage means.

16. A light beam scanning apparatus comprising:

light emitting means for outputting a light beam;

light beam scanning means for allowing a light beam output from this light emitting means to scan toward a scanned face so that said light beam scans said scanned face in a main scanning direction;

a pair of detection means, arranged on said scanned face or a position equivalent thereto, for detecting a light beam scanned by said light beam scanning means and outputting an electric signal;

integration means for integrating a difference between electric signals output from each of said pair of detection means;

first comparison means for comparing a value integrated in this integration means with a first threshold;

second comparison means for comparing a value integrated in said integration means with a second threshold smaller than said first threshold; and decision means for specifying first and second thresholds to said first and second comparator means, using said first and second comparison means to repeat comparison among said integration means' output value and said first and second thresholds for a plurality of times, and determining magnitude relation among said integration means' average output value and said first and second thresholds based on the number of times for determining said integration means' output value to be greater than said first threshold, the number of times for determining said integration means' output value to be between said first and second thresholds, and the number of times for determining said integration means' output value to be smaller than said second threshold.

17. The light beam scanning apparatus according to claim 16, further comprising:
  passage position change means for changing a passage position on said scanned face for a light beam output from said light emitting means, wherein
  said control means controls a passage position of said light beam by driving said passage position change means based on magnitude relation among said first and second thresholds and said integration means' average output value.

18. The light beam scanning apparatus according to claim 16, wherein
  said control means determines said integration means' average output value to be between said first and second thresholds when a difference between the number of times for determining integration means' output value to be greater than said first threshold and the number of times for determining integration means' output value to be smaller than said second threshold is less than or equal to a specified value.

19. A method of detecting a light beam passage position comprising:
  generating a light beam;
  allowing a generated light beam to scan toward a scanned face so that said light beam scans said scanned face in a main scanning direction;
  converting a light beam scanning said scanned face to an electric signal by using a pair of sensors arranged on said scanned face or a position equivalent thereto;
  correcting an electric signal converted from each of said plurality of sensors based on a correction signal and integrating a difference between the corrected electric signals by using a processing circuit having a plurality of operational amplifiers;
  determining the necessity of correction based on the integrated value, determining a scanning position of said light beam according to a value integrated by said processing circuit when the necessity of correction is not determined, and setting a correction amount based, on a value integrated by said processing circuit and an offset amount present in each operational amplifier in said processing circuit when the necessity of correction is determined; and
  outputting a correction signal to said processing circuit so as to correct an electric signal output from each of said pair of sensors based on the set correction amount,
  when setting said correction amount, setting a correction amount for each specified correction width based on a value integrated by said processing circuit and an offset amount present in each operational amplifier in said processing circuit and further setting a correction amount by using a finer correction width than said specified correction width when said specified correction width cannot detect a passage position of said light beam.

20. The method of detecting a light beam passage position according to claim wherein when setting said correction amount, setting a correction amount for each correction width half a previous correction width when said correction width cannot detect a passage position of said light beam.

21. A method of detecting a light beam passage position comprising:
  generating a light beam;
  allowing a generated light beam to scan toward a scanned face so that said light beam scans said scanned face in a main scanning direction;
  converting a light beam scanning said scanned face to an electric signal by using a pair of sensors arranged on said scanned face or a position equivalent thereto;
  correcting an electric signal converted from each of said plurality of sensors based on a correction signal and integrating a difference between the corrected electric signals by using a processing circuit having a plurality of operational amplifiers;
  determining the necessity of correction based on the integrated value, determining a scanning position of said light beam according to a value integrated by said processing circuit when the necessity of correction is not determined, and setting a correction amount based on a value integrated by said processing circuit and an offset amount present in each operational amplifier in said processing circuit when the necessity of correction is determined;
  outputting a correction signal to said processing circuit so as to correct an electric signal output from each of said pair of sensors based on the set correction amount; and
  storing a previous correction amount in a memory; and
  when setting said correction amount, setting a correction amount based on a value integrated by said processing circuit, an offset amount present in said processing circuit, and a previous correction amount stored in said memory.

22. A method of detecting a light beam passage position comprising:
  generating a light beam;
  allowing a generated light beam to scan toward a scanned face so that said light beam scans said scanned face in a main scanning direction;
  converting a light beam scanning said scanned face to an electric signal by using a pair of sensors arranged on said scanned face or a position equivalent thereto;
  integrating a difference between electric signals converted by each of said pair of sensors by using an integrator circuit;
  comparing the integrated value with a first threshold by using a first comparator circuit;
  comparing said integrated value with a second threshold smaller than said first threshold by using a second comparator circuit; and
  specifying first and second thresholds, repeating comparison among said values integrated by said first and second comparator circuits and said first and second thresholds for a plurality of times, and determining magnitude relation among an average value of said integrated values and said first and second thresholds based on the number of times for determining said integrated value to be greater than said first threshold, the number of times for determining said integrated value to be between said first and second thresholds, and the number of times for determining said integrated value to be smaller than said second threshold.

23. The method of detecting a light beam passage position according to claim 22, further comprising:
  when determining magnitude relation among said first and second thresholds and an average value of said integrated values, controlling a passage position of said light beam by driving said passage position change means for changing a passage position of said light beam on said scanned face based on this magnitude relation.

24. The method of detecting a light beam passage position according to claim 22, further comprising:

determining an average value of said integrated values to be between said first and second thresholds when a difference between the number of times for determining a value to be greater than said first threshold and the number of times for determining a value to be smaller than said second threshold is less than or equal to a specified value.

25. A light beam scanning apparatus comprising:

a light emitting device which outputs a light beam;

a light beam scanning member which allows the light beam output from the light emitting device to scan toward a scanned face so that said light beam scans said scanned face in a main scanning direction;

a light beam passage position detection section configured so that its output continuously varies in accordance with a change of a position where the light beam passes through when the passage position of the light beam passes through in a direction orthogonal to the main scanning direction is within a predetermined detection range;

a determination section which determines whether or not the passage position of the light beam scanned by the light beam scanning member on the scanned face in a direction orthogonal to the scanning direction is within the predetermined detection range;

a detection range correction section which shifts the detection range of the light beam passage position detection section; and a control section which causes the detection range correction section to shift the detection range of the light beam passage position detection section such that the light beam passage position detection section detects the passage position of the light beam when the determination section has determined that the light beam does not scan within the detection range.

26. The light beam scanning apparatus according to claim 25, wherein when the light beam does not pass within the detection range of the light beam passage position detection section, the control section repeatedly causes the detection range correction section to shift the detection range of the light beam passage position detection section.

27. The light beam scanning apparatus according to claim 26, wherein said control section has a memory for storing information concerning a history of the shifts of the detection range of the light beam passage position detection section by the detection range correction section.

28. The light beam scanning apparatus according to claim 27, wherein the light beam passage position detection section has second and third detection ranges which sandwich a first detection range, and when the light beam passes through one of the second and third detection ranges, the light beam passage position detection section outputs an output value corresponding to the detection range through which the light beam has passed;

when the determination section has determined that the light beam has passed through a portion other than the first detection range, it determines where to shift the first detection range in accordance with the output from the light beam passage position detection section; and the control section causes the detection range correction section to shift the first detection range in accordance with the determination by the determination section.

29. A light beam scanning apparatus comprising:

a circuit whose output continuously varies in accordance with a change of a passage position of a light beam;

a setting section which sets a first threshold and a second threshold different from the first threshold;

a first comparator circuit which compares an output value of the circuit with the first threshold;

a second comparator circuit which compares the output value of the circuit with the second threshold;

a determination section which determines the output value of the circuit based on the comparison results by the first and second comparator circuits;

a change section which changes the first and second thresholds preset by the setting section; and a control section which, when the output value of the circuit cannot be determined based on the comparison results of the first and second comparator circuits, causes the change section to change the preset first and second thresholds in accordance with the first and second thresholds at the time of the output value of the circuit being undeterminable, causes the first and second comparator circuits to compare again, and causes the determination section to determine the output value of the circuit.

30. The light beam scanning apparatus according to claim 29, further comprising a deciding section which decides a center value of the first and second thresholds as an output value of the circuit, wherein when the determination section cannot determine the output value of the circuit based on the comparison results of the first and second comparator circuits, the control section gradually broadens the first and second thresholds and causes the deciding section to decide the center value of the first and second thresholds at the time of the output value of the circuit could be determined by the determination section as an output value of the circuit.

31. The light beam scanning apparatus according to claim 29, further comprising:

an optical member which changes the passage position on a scanned face for the light beam, wherein said control section controls the passage position of said light beam by driving said optical member based on said circuit's output value determined by magnitude relation between said first and second thresholds.

32. A light beam scanning apparatus comprising:

a circuit whose output continuously varies in accordance with a shift of a passage position of a light beam;

a setting section which sets a first threshold and a second threshold different from the first threshold;

a first comparator circuit which compares an output value of the circuit with the first threshold;

a second comparator circuit which compares the output value of the circuit with the second threshold;

a control section which causes the first and second comparator circuits to repeatedly execute comparison processing between the output value of the circuit and the first and second thresholds for a plurality of times; and a deciding section which, when the comparison processing by the first and second comparison circuits are executed a plurality of times, decides an average output value of the circuit in accordance with the comparison results between the first threshold and the output value of the circuit and those between the second threshold and the output value of the circuit.

33. The light beam scanning apparatus according to claim 32, further comprising:

an optical member which changes the passage position on a scanned face for the light beam output, wherein
said control section controls the passage position of said light beam by driving said optical member based on magnitude relation among said first and second thresholds and the average output value of the circuit.

34. The light beam scanning apparatus according to claim 32, wherein when a difference between the number of times a circuit's output value is determined to be greater than the larger one of said first and second thresholds, and the number of times a circuit's output value is determined to be smaller than the smaller one of said first and second thresholds is less than or equal to a specified value according to the results of said plurality of times of comparison processing by the first and second comparator circuits executed by the control section, the deciding section decides that an average output value of the circuit is between the first and second thresholds.

35. An image formation apparatus having an image support to form a latent image on a scanned face where a light beam is scanned based on image information and an image formation means for forming an image formed on this image support onto an image formation medium, said image formation apparatus comprising:

a light emitting device which outputs a light beam;

a light beam scanning member which allows the light beam output from the light emitting device to scan toward a scanned face, so that said light beam scans said scanned face in a main scanning direction;

a light beam passage position detection section configured so that its output continuously varies in accordance with a change of a passage position of the light beam when the passage position of the light beam in a direction orthogonal to the main scanning direction is within a predetermined detection range;

a determination section which determines whether or not the passage position of the light beam scanned by the light beam scanning member on the scanned face in a direction orthogonal to the scanning direction is within the predetermined detection range;

a detection range correction section which shifts the detection range of the light beam passage position detection section; and a control section which causes the detection range correction section to shift the detection range of the light beam passage position detection section such that the light beam passage position detection section detects the passage position of the light beam when the determination section has determined that the light beam does not scan within the detection range.

36. The image formation apparatus according to claim 35, wherein when the light beam does not pass within the detection range of the light beam passage position detection section, the control section repeatedly causes the detection range correction section to shift the detection range of the light beam passage position detection section.

37. The image formation apparatus according to claim 36, wherein said control section has a memory for storing information concerning a history of the shifts of the detection range of the light beam passage position detection section by the detection range correction section.

38. The image formation apparatus according to claim 37, wherein the light beam passage position detection section has second and third detection ranges which sandwich a first detection range, and when the light beam passes through one of the second and third detection ranges, the light beam passage position detection section outputs an output corresponding to the detection range through which the light beam has passed;

when the determination section has determined that the light beam has passed through a portion other than the first detection range, it determines where to shift the first detection range in accordance with the output from the light beam passage position detection section; and the control section causes the detection range correction section to shift the first detection range in accordance with the determination by the determination section.

39. An image formation apparatus having an image support to form a latent image on a scanned face where a light beam is scanned based on image information and an image formation means for forming an image formed on this image support onto an image formation medium, said image formation apparatus comprising:

a circuit whose output continuously varies in accordance with a change of a passage position of a light beam;

a setting section which sets a first threshold and a second threshold different from the first threshold;

a first comparator circuit which compares an output value of the circuit with the first threshold;

a second comparator circuit which compares the output value of the circuit with the second threshold;

a determination section which determines the output value of the circuit based on the comparison results by the first and second comparator circuits;

a change section which changes the first and second thresholds preset by the setting section; and a control section which, when the output value of the circuit cannot be determined based on the comparison results by the first and second comparator circuits, causes the change section to change the preset first and second thresholds in accordance with the first and second thresholds at the time of the output value of the circuit being undeterminable, causes the first and second comparator circuits to compare again, and causes the determination section to determine the output value of the circuit.

40. The image formation apparatus according to claim 39, further comprising a deciding section which decides a center value of the first and second thresholds as an output value of the circuit, wherein when the determination section. cannot determine the output value of the circuit based on the comparison results of the first and second comparator circuits, the control section gradually broadens the first and second thresholds and causes the deciding section to decide the center value of the first and second thresholds at the time the output value of the circuit was determined by the determination section as an output value of the circuit.

41. The image formation apparatus according to claim 39, further comprising:

an optical member which changes the passage position on said scanned face for the light beam, wherein said control section controls the passage position of said light beam by driving said optical member based on the output value of the circuit determined by magnitude relation between said first and second thresholds.

42. An image formation apparatus having an image support to form a latent image on a scanned face where a light beam is scanned based on image information and an image formation means for forming an image formed on this image support onto an image formation medium, said image formation apparatus comprising:

a circuit whose output continuously varies in accordance with a shift of a passage position of a light beam;

a setting section which sets a first threshold and a second threshold different from the first threshold;

a first comparator circuit which compares an output value of the circuit with the first threshold;

a second comparator circuit which compares the output value of the circuit with the second threshold;

a control section which causes the first and second comparator circuits to repeatedly execute comparison processing between the output value of the circuit and the first and second thresholds for a plurality of times; and a deciding section which, when the comparison processing by the first and second comparison circuits are executed a plurality of times, decides an average output value of the circuit in accordance with the comparison results between the first threshold and the output value of the circuit and those between the second threshold and the output value of the circuit.

43. The image formation apparatus according to claim 42, further comprising:

an optical member which changes the passage position on said scanned face for the light beam, wherein said control section controls the passage position of said light beam by driving said optical member based on magnitude relation among said first and second thresholds and the average output value of said circuit.

44. The image formation apparatus according to claim 42, wherein when a difference between the number of times a circuit's output value is determined to be greater than the larger one of said first and second thresholds, and the number of times a circuit's output value is determined to be smaller than the smaller one of said first and second thresholds is less than or equal to a specified value according to the results of said plurality of times of comparison processing by the first and second comparator circuits executed by the control section, the deciding section decides that an average output value of the circuit is between the first and second thresholds.

45. A light beam scanning apparatus comprising:

light emitting means for outputting the light beam;

light beam scanning means for allowing a light beam output from the light emitting means to scan toward a scanned face, so that said light beam scans said scanned face in a main scanning direction;

light beam passage position detection means configured so that its output continuously varies in accordance with a change of a passage position of the light beam when the passage position of the light beam in a direction orthogonal to the main scanning direction is within a predetermined detection range;

determination means for determining whether or not the passage position of the light beam scanned by the light beam scanning means on the scanned face in a direction orthogonal to the scanning direction is within the range detected by the light beam passage position detection means;

detection range correction means for shifting the detection range of the light beam passage position detection means; and control means for causing the detection range correction means to shift the detection range of the light beam passage position detection means such that the light beam passage position detection means detects the passage position of the light beam when the determination means has determined that the light beam does not scan within the detection range.

46. The light beam scanning apparatus according to claim 45, wherein when the light beam does not pass within the detection range of the light beam passage position detection means, the control means repeatedly causes the detection range correction means to shift the detection range of the light beam passage position detection means.

47. The light beam scanning apparatus according to claim 46, wherein said control means has a memory for storing information concerning a history of the shifts of the detection range of the light beam passage position detection means by the detection range correction means.

48. The light beam scanning apparatus according to claim 46, wherein the light beam passage position detection means has second and third detection ranges which sandwich a first detection range, and when the light beam passes through one of the second and third detection ranges, the light beam passage position detection means outputs an output value corresponding to the detection range through which the light beam has passed;

when the determination means has determined that the light beam has passed through a portion other than the first detection range, it determines where to shift the first detection range in accordance with the output from the light beam passage position detection means; and the control means causes the detection range correction means to shift the first detection range in accordance with the determination by the determination means.

49. A light beam scanning apparatus comprising:

output means whose output continuously varies in accordance with a change of a passage position of a light beam;

setting means for setting a first threshold and a second threshold;

first comparator means for comparing an output value of the output means with the first threshold;

second comparator means for comparing the output value of the output means with the second threshold;

determination means for determining the output value of the output means based on the comparison results by the first and second comparator means;

change means for changing the first and second thresholds set by the setting means; and control means for, when the output value of the output means cannot be determined based on the comparison results by the first and second comparator means, causing the change means to change the set first and second thresholds in accordance with the first and second thresholds at the time of the output value of the output means being undeterminable, causing the first and second comparator means to compare again, and causing the determination means to determine the output value of the output means.

50. The light beam scanning apparatus according to claim 49, further comprising:

deciding means for deciding a center value of the first and second thresholds as an output value of the output means, wherein when the determination means cannot determine the output value of the output means based on the comparison results of the first and second comparator means, the control means gradually broadens the first and second thresholds and causes the deciding means to decide the center value of the first and second thresholds when the output value of the output means was determined by the determination means as an output value of the output means.

51. The light beam scanning apparatus according to claim 49, further comprising:

passage position change means for changing the passage position on said scanned face for the light beam, wherein said control means controls the passage position of said light beam by driving said passage position change means based on said output means' output value determined by magnitude relation between said first and second thresholds.

52. A light beam scanning apparatus comprising:

output means whose output continuously varies in accordance with a shift of a passage position of a light beam;

setting means for setting a first threshold and a second threshold different from the first threshold;

first comparator means for comparing an output value of the output means with the first threshold;

second comparator means for comparing the output value of the output means with the second threshold;

control means for causing the first and second comparator means to repeatedly execute comparison processing between the output value of the output means and the first and second thresholds for a plurality of times; and deciding means for, when the comparison processing by the first and second comparison means are executed a plurality of times, deciding an average output value of the output means in accordance with the comparison results between the first threshold and the output value of the output means and those between the second threshold and the output value of the output means.

53. The light beam scanning apparatus according to claim 52, further comprising:

passage position change means for changing the passage position on said scanned face for the light beam, wherein said control means controls the passage position of said light beam by driving said passage position change means based on magnitude relation among said first and second thresholds and said output means average output value.

54. The light beam scanning apparatus according to claim 52, wherein when a difference between the number of times a circuit's output value is determined to be greater than the larger one of said first and second thresholds, and the number of times a circuit's output value is determined to be smaller than the smaller one of said first and second thresholds is less than or equal to a specified value in accordance with the results of said plurality of times of comparison processing by the first and second comparator means executed by the control means, the deciding means decides that an average output value of the output means is between the first and second thresholds.

55. A light beam scanning method comprising:

emitting a light beam;

allowing the emitted light beam to scan toward a scanned face so that said light beam scans said scanned face in a main scanning direction;

allowing a light beam passage position detection section to detect the light beam, the light beam passage position detection section being configured so that its output continuously varies in accordance with a change of a passage position of the light beam when the passage position of the light beam in a direction orthogonal to the main scanning direction is within a predetermined detection range;

determining whether or not the passage position of the light beam scanned on the scanned face in a direction orthogonal to the scanning direction is within the detection range of the light beam passage position detection section;

shifting the detection range of the light beam passage position detection section when it is determined that the light beam does not scan within the detection range of the light beam passage position detection section.

56. The light beam scanning method according to claim 55, further comprising:

repeating shifting the detection range of the light beam passage position detection section when the light beam does not pass within the detection range of the light beam passage position detection section.

57. The light beam scanning method according to claim 56, further comprising:

storing information concerning a history of the shifts of the detection range of the light beam passage position detection section when the detection range of the light beam passage position detection section is shifted.

58. The light beam scanning method according to claim 57, wherein the light beam passage position detection section has second and third detection ranges which sandwich a first detection range, said light beam scanning method further comprising:

determining where to shift the first detection range in accordance with the output from the light beam passage position detection section when the light beam passes through one of the second and third detection ranges; and shifting the first detection range in accordance with the determination.

59. A method of detecting a light beam passage position comprising:

setting a first threshold and a second threshold different from the first threshold;

allowing a first comparator circuit to compare an output value of a circuit whose output value continuously varies in accordance with a change of a passage position of the light beam with the first threshold;

allowing a second comparator circuit to compare the output value of the circuit with the second threshold;

determining the output value of the circuit based on the comparison results by the first and second comparator circuits;

changing set first and second threshold values, when the output value of the circuit cannot be determined based on the comparison results by the first and second comparator circuits, in accordance with the first and second thresholds at the time of the output value of the circuit being undeterminable; and determining the output value of the circuit by re-performing comparison processing by the first and second comparator circuits when the first and second thresholds are changed.

60. The method of detecting a light beam passage position according to claim 59, further comprising:

changing said first and second thresholds so that the difference between the thresholds gradually becomes broader when the output value of the circuit cannot be determined based on the comparison results of the first and second comparator circuits; and determining the center value between the first and second thresholds when the output value of the circuit could be determined as an output value of the circuit.

61. The method of detecting a light beam passage position according to claim 59, further comprising:

passage position change means; and when determining said output value according to magnitude relation between said first and second thresholds, controlling a passage position of said light beam by driving said passage position change means for changing a passage position of said light beam on said scanned face based on said output value.

62. A method of detecting a light beam passage position comprising:

setting a first threshold and a second threshold different from the first threshold;

allowing a first comparator circuit to compare an output value of a circuit whose output continuously varies in accordance with a shift of a passage position of a light beam with the first threshold;

allowing a second comparator circuit to compare the output value of the circuit with the second threshold;

allowing the first and second comparator circuits to repeatedly execute comparison processing between the output value of the circuit and the first and second thresholds for a plurality of times; and deciding an average output value of the output values of the circuit in accordance with the comparison results between the first threshold and the output value of the circuit and those between the second threshold and the output value of the circuit, when the comparison processing by the first and second comparison circuits are executed a plurality of times.

63. The method of detecting a light beam passage position according to claim 62, further comprising:

when determining magnitude relation among said first and second thresholds and an average value of said output values, controlling a passage position of said light beam by driving said passage position change means for changing a passage position of said light beam on said scanned face based on this magnitude relation.

64. The method of detecting a light beam passage position according to claim 62, further comprising:

determining an average value of said output values to be between said first and second thresholds when a difference between the number of times a value is determined to be greater than the greater one of the first and second thresholds, and the number of times a value is determined to be smaller than the smaller one of the first and second thresholds is less than or equal to a specified value according to the comparison results of said plurality of comparison processing by the first and second comparator circuits.

* * * * *